(12) United States Patent
Thompson, III et al.

(10) Patent No.: US 10,994,261 B2
(45) Date of Patent: May 4, 2021

(54) POLYAMINE PHOSPHORUS DENDRIMER MATERIALS FOR CARBON DIOXIDE CAPTURE

(71) Applicant: Research Triangle Institute, Research Triangle Park, NC (US)

(72) Inventors: Samuel John Thompson, III, Durham, NC (US); Mustapha Soukri, Durham, NC (US)

(73) Assignee: RESEARCH TRIANGLE INSTITUTE, Research Triangle Park, NC (US)

( * ) Notice: Subject to any disclaimer, the term of this patent is extended or adjusted under 35 U.S.C. 154(b) by 295 days.

(21) Appl. No.: 16/250,598

(22) Filed: Jan. 17, 2019

(65) Prior Publication Data

US 2019/0224647 A1 Jul. 25, 2019

Related U.S. Application Data

(60) Provisional application No. 62/619,066, filed on Jan. 18, 2018.

(51) Int. Cl.
*B01J 20/32* (2006.01)
*B01D 53/14* (2006.01)
(Continued)

(52) U.S. Cl.
CPC ............ *B01J 20/321* (2013.01); *B01D 53/02* (2013.01); *B01D 53/1475* (2013.01);
(Continued)

(58) Field of Classification Search
CPC .. B01J 20/321; B01J 20/3212; B01J 20/3268; B01D 53/1475; B01D 2257/504;
(Continued)

(56) References Cited

U.S. PATENT DOCUMENTS 5,474,767 A 12/1995 Tremont
7,763,684 B2 7/2010 Dozol et al.
(Continued)

FOREIGN PATENT DOCUMENTS

WO 2016011032 A1 1/2016

OTHER PUBLICATIONS

Riegert et al., "Diversified Strategies for the Synthesis of Bifunctional Dendrimeric Structures", European Journal of Organic Chemistry 2013, 5414-5422. (Year: 2013).*

(Continued)

*Primary Examiner* — Anita Nassiri-Motlagh
(74) *Attorney, Agent, or Firm* — Olive Law Group PLLC; Nathan P. Letts

(57) ABSTRACT

The present disclosure provides novel solid sorbents synthesized by the reaction of polyamines with polyaldehyde phosphorous dendrimer (P-dendrimer) compounds. The sorbents are highly stable and exhibit rapid reaction kinetics with carbon dioxide, making the sorbents applicable for carbon capture, and can be easily regenerated for further use. The material is stable to aqueous and organic media, as well as strong acid and bases. The sorbent maintains full capacity over extended use. The material can be used for $CO_2$ capture from pure $CO_2$ streams, mixed gas streams, simulated flue gas, and ambient air. Additionally, the material can be adhered to surfaces for reversible $CO_2$ capture applications outside of bulk particle-based processes.

24 Claims, 25 Drawing Sheets

Figure 1:
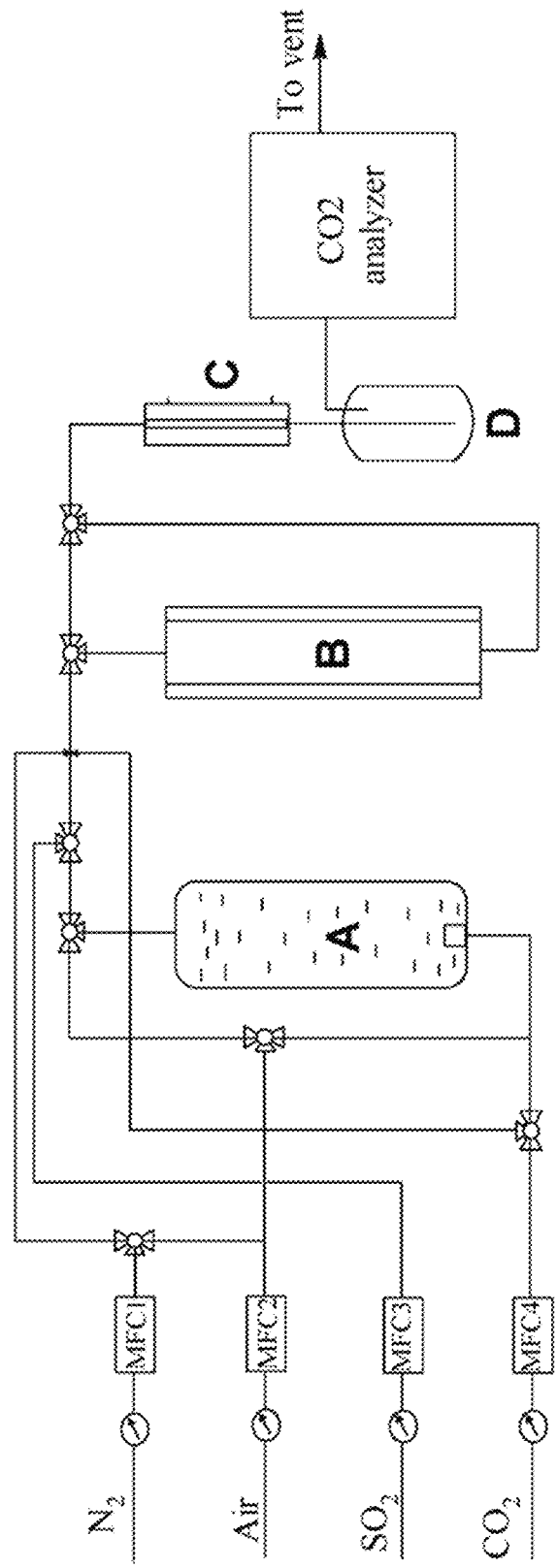

Packed-bed reactor (PBR) illustration. A, B, C, and D are humidifier, packed bed reactor, vapor condenser, and water collector, respectively

(51) Int. Cl.
| | |
|---|---|
| C08G 83/00 | (2006.01) |
| C08K 5/5399 | (2006.01) |
| C08J 7/00 | (2006.01) |
| B01D 53/02 | (2006.01) |
| C08L 1/12 | (2006.01) |
| C08L 79/02 | (2006.01) |
| B01J 20/34 | (2006.01) |

(52) U.S. Cl.
CPC ....... B01J 20/3212 (2013.01); B01J 20/3268 (2013.01); C08G 83/003 (2013.01); C08J 7/00 (2013.01); C08K 5/5399 (2013.01); C08L 1/12 (2013.01); C08L 79/02 (2013.01); *B01D 2253/202* (2013.01); *B01D 2253/25* (2013.01); *B01D 2257/504* (2013.01); *B01D 2258/0233* (2013.01); *B01D 2258/0283* (2013.01); *B01D 2258/0291* (2013.01); *B01D 2258/06* (2013.01); *B01D 2259/4009* (2013.01); *B01J 20/3483* (2013.01)

(58) Field of Classification Search
CPC .......... B01D 2253/25; B01D 2258/029; C08G 83/003; C08K 5/5399; C08L 1/12; C08L 79/02
USPC ........................................................ 423/220
See application file for complete search history.

(56) References Cited

U.S. PATENT DOCUMENTS

| 8,500,854 | B1 | 8/2013 | Pennline et al. |
| 9,707,313 | B2 | 7/2017 | Artzi et al. |
| 2004/0121122 | A1 | 6/2004 | Reynolds et al. |
| 2006/0052532 | A1 | 3/2006 | Rademann |
| 2010/0263534 | A1 | 10/2010 | Chuang |
| 2017/0197198 | A1 | 7/2017 | Soukri et al. |

OTHER PUBLICATIONS

Aaron, Douglas and Tsouris, Costas. 2005. "Separation of CO2 from Flue Gas: A Review." Separation Science and Technology. vol. 40. 321-348.
An, Jihyun and Rosi, Nathaniel L. 2010. "Tuning MOF Co2 Adsorption Properties via Cation Exchange." JAGS. vol. 132. 5578-5579.
Dendrimer. Wikipedia. Accessed Jan. 11, 2018 (nine (9) pages).
Drese, Jeffrey H. et al. 2009. "Synthesis-Structure-Property Relationships for Hyperbranched Aminosilica CO2 Adsorbents." Advanced Functional Materials. vol. 19. 3821-3832.
Hicks, Jason C. et al. 2008. "Designing Adsorbents for CO2 Capture from Flue Gas-Hyperbranched Aminosilicas Capable of Capturing CO2 Reversibly." Supporting Information. JACS. vol. 130. 2902-2903.
Hicks, Jason C. et al. 2008. "Designing Adsorbents for CO2 Capture from Flue Gas-Hyperbranched Aminosilicas Capable of Capturing CO2 Reversibly." JACS. vol. 130. 2902-2903.
Huang, Helen Y. and Yang, Ralph T. 2003. "Amine-Grafted MCM-48 and Silica Xerogel as Superior Sorbents for Acidic Gas Removal from Natural Gas." Industrial & Engineering Chemistry Research. vol. 42. 2427-2433.
Khalilpour, Rajab et al. 2014. "Membrane-based carbon capture from flue gas: a review." Journal of Cleaner Production. vol. 103. 1-15.
Liang, Zhijian et al. 2008. "Stepwise growth of melamine-based dendrimers into mesopores and their CO2 adsorption properties." Microporous and Mesoporous Materials. vol. 111. 536-543.
Majoral, Jean-Pierre and Caminade, Anne-Marie. 2003. "What to do with Phosphorus in Dendrimer Chemistry." vol. 223. 111-160.
Muhammad, Raeesh et al. 2016. "Aminal linked inorganic-organic hybrid nanoporous materials (HNMs) for CO2 capture and H2 storage applications." RSC Advances. vol. 6. 17100-17105.
Quang, Dang Viet et al. 2016. "Investigation of CO2 adsorption performance and fluidization behavior of mesoporous silica supported polyethyleneimine." Powder Technology. vol. 301. 449-462.
Riegert, David et al. 2016. "Silica Functionalized by Bifunctional Dendrimers: Hybrid Nanomaterials for Trapping CO2." European Journal of Inorganic Chemistry. vol. 19. 3103-3110.
Riegert, David et al. 2016. "Silica Functionalized by Bifunctional Dendrimers: Hybrid Nanomaterials for Trapping CO2." Supporting Information. Eur. J. Inorganic Chemistry. vol. 19. 3103-3110.
Sanz-Perez, Eloy S. et al. 2016. "Direct Capture of CO2 from Ambient Air." Chem. Rev. American Chemical Society.
Satyapal, Sunita et al. 2001. "Performance and Properties of a Solid Amine Sorbent for Carbon Dioxide Removal in Space Life Support Applications." Energy & Fuels. vol. 15. 250-255.
Songolzadeh, Mohammad et al. 2014. "Carbon Dioxide Separation from Flue Gases: A Technological Review Emphasizing Reduction in Greenhouse Gas Emissions." The Scientific World Journal. vol. 2014. 1-34.
Thompson, Samuel J. et al. 2018. "Phosphorous dendrimer bound polyethyleneimine as solid sorbents for post-combustion CO2 capture." Chemical Engineering Journal. vol. 350. 1056-1065.
New Aspects in Phosphorous Chemistry II. vol. Ed. J-P. Majoral. in Topics in Current Chemistry. 223. Ed. A. de Meijere et al. Springer-Verlag Berlin Heidelberg 2003. (two-hundred and sixty-seven (267) pages). Particularly, Majoral & Caminade What to do with Phosphorus in Dendrimer Chemistry, pp. 113-159.
Wang, Dongxiang et al. 2012. "Development of Carbon-Based "Molecular Basket" Sorbent for CO2 Capture." Industria & Engineering Chemistry Research. vol. 51. 3048-3057.
Xu, Xiaochun et al. 2002. "Novel Polyethylenimine-Modified Mesoporous Molecular Sieve of MCM-41 Type as High-Capacity Adsorbent for CO2 Capture." Energy & Fuels. vol. 16. 1463-1469.
Zhang, Wenbin et al. 2014. "Capturing CO2 from ambient air using a polyethyleneimine-silica adsorbent in fluidized beds." Chemical Engineering Science. vol. 116. 306-316.

* cited by examiner

Fig 1. Packed-bed reactor (PBR) illustration. A, B, C, and D are humidifier, packed bed reactor, vapor condenser, and water collector, respectively Fig. 8. *P*-dendrimer solid sorbents for CO$_2$ capture.

Figure 11:
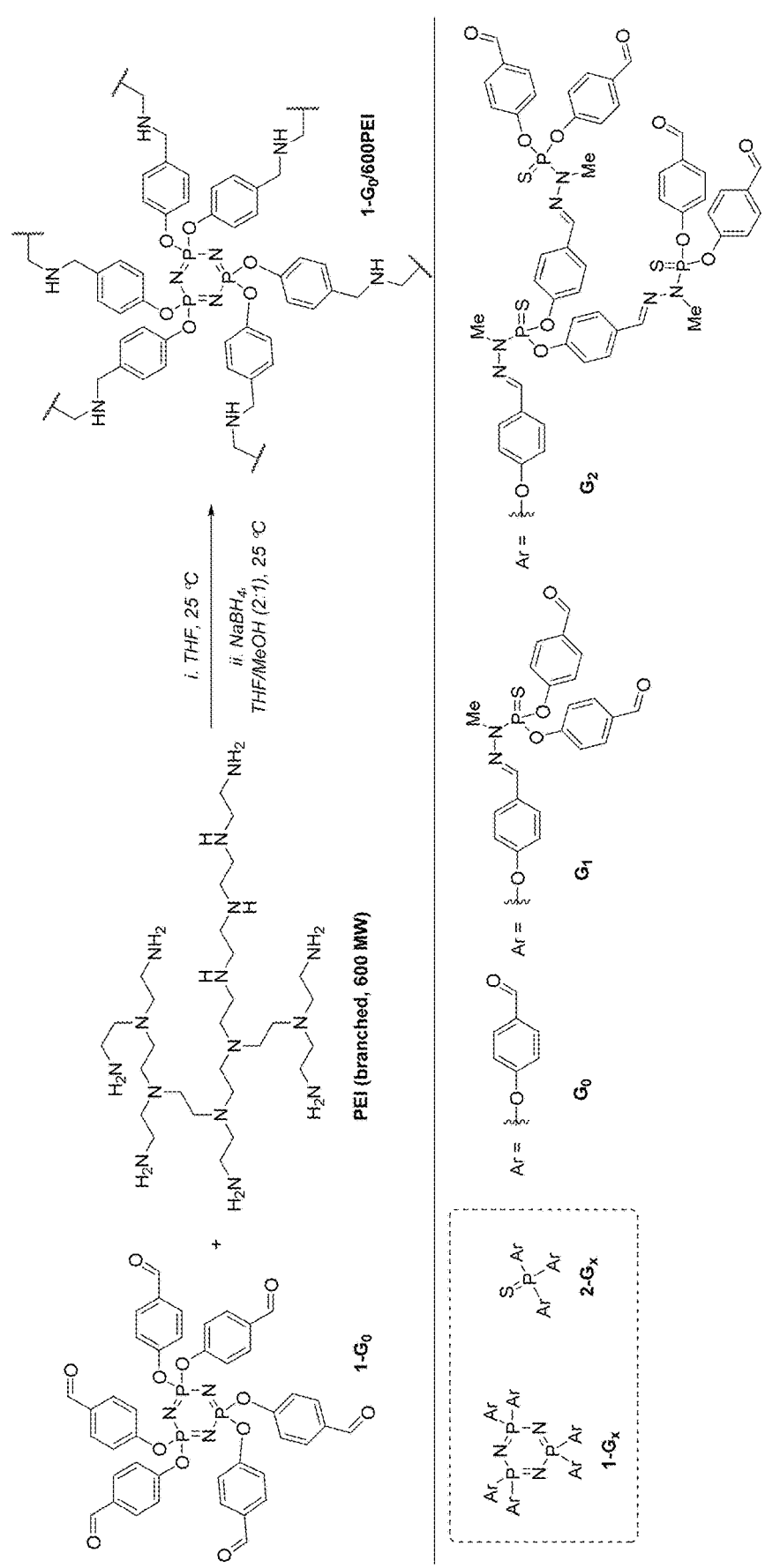

Fig. 11. *P*-dendrimers used to produce solid amine sorbents with PEI.

ND PHOSPHORUS DENDRIMER
POLYAMINE PHOSPHORUS DENDRIMER MATERIALS FOR CARBON DIOXIDE CAPTURE

CROSS REFERENCE TO RELATED APPLICATIONS

This application claims the benefit of U.S. Provisional Appn. No. 62/619,066 filed 18 Jan. 2018, Thomson and Soukri, entitled "Polyamine Phosphorus Dendrimer Materials for Carbon Dioxide Capture", which is hereby incorporated by reference in its entirety.

STATEMENT REGARDING FEDERALLY SPONSORED RESEARCH OR DEVELOPMENT

This invention was made with government support under DE-FE0026432 awarded by Department of Energy. The government has certain rights in the invention.

1. FIELD

The present disclosure provides novel solid sorbents synthesized by the reaction of polyamines with polyaldehyde phosphorus dendrimer (P-dendrimer) compounds. The sorbents are highly stable and exhibit rapid reaction kinetics with carbon dioxide, making the sorbents applicable for carbon capture, and can be easily regenerated for further use. The material is stable to aqueous and organic media, as well as strong acid and bases. The sorbent maintains full capacity over extended use. The material can be used for $CO_2$ capture from pure $CO_2$ streams, mixed gas streams, flue gas, and ambient air. Additionally, the material can be adhered to surfaces for reversible $CO_2$ capture applications outside of bulk particle-based processes.

2. BACKGROUND

2.1. Introduction

Measures to reduce the release of carbon dioxide ($CO_2$) from small and large-scale emission sources are being undertaken on a world-wide scale. Capturing $CO_2$ from large industrial facilities, which contribute up to 60% of the global emission, is of the upmost importance to effectively combat climate change (A. Samanta, et al., *Ind. Eng. Chem. Res.* 2012, 51 (4), 1438-1463.). Over the past few decades, significant advances have been achieved in technologies for Carbon Capture and Sequestration (CS S). Specifically, materials composed of amine compounds have been proven effective for adsorbing $CO_2$ from concentrated post-combustion streams (e.g. flue gas) and have been successfully implemented at large scales (Q. Wang, et al., *Energy Environ. Sci.* 2010, 4 (1), 42-55; E. E. Ünveren, E. E.; et al., *Petroleum* 2017, 3 (1), 37-50; P. Luis *Desalination* 2016, 380, 93-99).

To bring CSS technologies to a practical state, current $CO_2$ capturing materials still require decreased synthetic costs, improved stabilities, and high capacities (D. Y. C. Leung et al., *Renew. Sustain. Energy Rev.* 2014, 39, 426-443). Solid amine sorbents have the potential to address these key challenges, benefiting from many favorable properties, including but not limited to: low heat capacities, decreased regeneration temperature requirements, and favorable reaction kinetics with $CO_2$. Solid amine sorbents majorly adsorb $CO_2$ via a chemisorption mode, meaning the binding of gaseous $CO_2$ as a carbamate. The chemisorption binding of $CO_2$ from humidified gas conditions, like that of flue gas, promote bicarbonate and carbamate formation leading to increased sorption capacities (R. A. Khatri, R. A.; et al., *Energy Fuels* 2006, 20 (4), 1514-1520; F. Zheng et al., *Ind. Eng. Chem. Res.* 2005, 44 (9), 3099-3105). Moisture-containing gas streams, however, pose a significant threat to many of the reported high capacity solid amine sorbents due to the mobilization and leaching of the amine-component from the material (X. Xu et al., *Ind. Eng. Chem. Res.* 2005, 44 (21), 8113-8119).

Adsorbing and maintaining high capacities of $CO_2$ under simulated flue gas conditions (humid gas, oxygen presence, adsorption temperatures of 50-75° C., etc.) has proven challenging for many reported solid amine sorbents, however, many recent advances have been reported over the past decade. In 2005, Scaroni and coworkers impregnated a large pore-volume support (MCM-41) with 50 wt % loading of polyethyleneimine (PEI), achieving 13.5 wt % of $CO_2$ from simulated flue gas while adsorbing at 75° C. (X. Xu et al., *Ind. Eng. Chem. Res.* 2005, 44 (21), 8113-8119). The impregnation approach has led to many capable materials, such as nanoporous SBA-15 loaded with 50 wt % PEI providing 14.0 wt % capacity at 75° C. from Ma and coworkers, along with TEPA dispersed in Y-type zeolites giving 18.7 wt % at 60° C. from Su and coworkers (X. Ma et al. *J. Am. Chem. Soc.* 2009, 131 (16), 5777-5783; F. Su et al., *Energy Fuels* 2010, 24 (2), 1441-1448). In 2005, Gray and coworkers reacted ethylenediamine (EDA) and tetraethylenepentamine (TEPA) with acrylonitrile inside PMMA beads to reach 27.6 wt % adsorption at 65° C. (M. L. Gray et al., In Fourth Annual Conference on Carbon Capture & Sequestration, 2005.). In 2009, Jones and coworkers advanced their hyperbranched aminosilica (HAS) sorbent, derived from the polymerization of aziridine grafted with a silica support, to reach 17.6 wt % capacity at 75° C. (J. H. Drese et al., *Adv. Funct. Mater.* 2009, 19 (23), 3821-3832). The HAS sorbent was extremely stable under cycling conditions and had fast reaction kinetics. Gray and coworkers in 2009 supported PEI on silicon dioxide and polystyrene supports, yielding capacities up to 16.1 wt % (M. L. Gray et al., *Energy Fuels* 2009, 23 (10), 4840-4844). Then in 2011, Qi and coworkers supported TEPA and PEI on mesoporous silica capsules which reached capacities up to 34.9 wt % at 75° C. and showed great stability over cycle testing (G. Qi et al., *Energy Environ. Sci.* 2011, 4 (2), 444-452).

3. SUMMARY OF THE DISCLOSURE

The present disclosure provides in embodiment 1, a polyamine phosphorus dendrimer (P-dendrimer) having the formula I

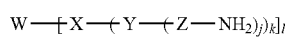

I wherein W is a phosphorus based dendrimer core; X is a polyfunctional aromatic linker; Y may be present or absent and if present is a polyfunctional amino phosphoryl group linked to a polyfunctional aromatic linker; Z is an diamino alkyl group, a polyalkyl amino group, a polyethyleneimine, or a polypropyleneimine; j and k are numerical values corresponding to the branch point multiplicity and whose values independently range from 1 to 10; and l is a numerical value corresponding to the branch point multiplicity and whose values ranges from 2 to 10.

In embodiment 2, the disclosure provides the P-dendrimer of embodiment 1, wherein W is a phosphazene, thiophosphoryl, or a cyclophosphazatetraene group;
X is

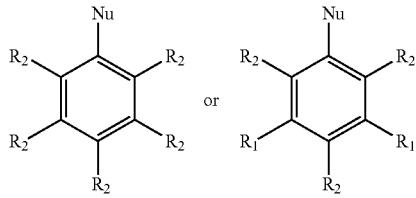

wherein Nu is —OH, —SH, or —NH$_2$; each R$_1$ is independently —CHO, —CN, —COOMe, COOEt, COOH, CH$_2$OH, CONH$_2$, or COCH$_3$; each R$_2$ is independently H, Me, Et or halogen;
Y is

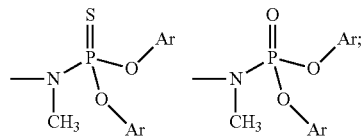

Z is

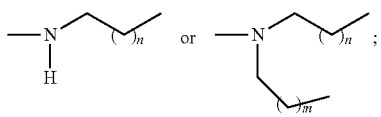

and each n or m if present is independently an integer from 1-6.

In embodiment 3, the disclosure provides the polyamine P-dendrimer of embodiments 1 or 2, having a CO$_2$ capacity of greater than 2 weight percent. Alternatively, the polyamine P-dendrimer may have a CO$_2$ capacity of greater than 5 weight percent. In a preferred embodiment, the polyamine P-dendrimer has a CO$_2$ capacity of greater than 10 weight percent.

In embodiment 4, the disclosure provides a composite material which comprises a solid support and a surface coated with the polyamine P-dendrimer of any of embodiments 1-3.

In embodiment 5, the disclosure provides the composite material of embodiment 4, wherein the solid support may be a polymeric material, carbon, glass, or a metal support. The polymeric material may also be natural or a synthetic polymer such as cellulose acetate, a silk protein, a soy protein, or a starch. Alternatively, the synthetic polymer may be petroleum pitch, polyacrylonitrile, polyamide, polyethylene, polypropylene, polystyrene, polyvinyl chloride or a mixture thereof.

In embodiment 6, the polyamine P-dendrimer of any of embodiments 1-3 or the composite materials of embodiments 4 or 5 are retain their CO$_2$ capacity for at least 50 cycles of absorption and regeneration; at least 100 cycles of absorption and regeneration; at least 200 cycles of absorption and regeneration; at least 500 cycles of absorption and regeneration; at least 1000 cycles of absorption and regeneration; or at least 2500 cycles of absorption and regeneration.

In embodiment 7, the disclosure provides a method of removing CO$_2$ from a gaseous fluid stream which comprises contacting the gaseous fluid stream with the polyamine P-dendrimer of any of embodiments 1-3 or the composite materials of embodiments 4 or 5.

In embodiment 8, the disclosure provides a method of adsorbing, separating, storing or sequestering carbon dioxide (CO$_2$), comprising contacting the polyamine P-dendrimer of any of embodiments 1-3 or composite materials of embodiments 4 or 5 with a gaseous fluid stream comprising carbon dioxide (CO$_2$).

In embodiment 9, the disclosure provides a method of removing CO$_2$ from a gaseous fluid stream with comprises (a) contacting the gaseous fluid stream with a polyamine phosphorus dendrimer (P-dendrimer) having the formula I

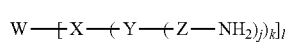

at a temperature in the range of about 20° C. to about 90° C.; wherein W is a phosphorus based dendrimer core; X is a polyfunctional aromatic linker; Y may be present or absent and if present is a polyfunctional amino phosphoryl group linked to a polyfunctional aromatic linker; Z is an diamino alkyl group, a polyalkyl amino group, a polyethyleneimine, or a polypropyleneimine; j and k are numerical values corresponding to the branch point multiplicity and whose values independently range from 1 to 10; and l is a numerical value corresponding to the branch point multiplicity and whose values ranges from 2 to 10. In some embodiments the method may be practiced in a temperature range of about 20° C. to about 80° C.; about 20° C. to about 40° C.; about 25° C. to about 85° C.; about 30° C. to about 90° C.; about 30° C. to about 50° C.; or about 40° C. to about 70° C.

In embodiment 10, the disclosure provides the method of embodiment 9, wherein the gaseous fluid stream is a flue gas. The flue gas may be from a natural gas power plant, a coal-fired power plant, a cement plant or another industrial process. The flue gas may have a CO$_2$ content of about 3 mole % to about 45 mole % CO$_2$. For example, flue gas from natural gas power plants might have 3-6 mole % CO$_2$, from coal-fired power plant may have 10-15 mole % CO$_2$, or from cement plants 15-30 mole % CO$_2$.

In embodiment 11, the disclosure provides the method of embodiment 9, wherein the gaseous fluid stream is a post-combustion gaseous fluid stream.

In embodiment 12, the disclosure provides the method of embodiment 9, wherein the gaseous fluid stream is ambient air.

In embodiment 13, the disclosure provides the method of embodiment 12, wherein the gaseous fluid stream has a CO$_2$ content of about 350 to about 450 parts per million (PPM) CO$_2$. Alternatively, the gaseous fluid stream has a CO$_2$ content of about 375 to about 425 PPM. In other embodiments, the gaseous fluid stream may have a CO$_2$ content of about 500 to about 3000 PPM CO$_2$; about 800 to about 2500 PPM CO$_2$; about 1000 to about 2000 PPM CO$_2$; about 800 to about 1500 PPM CO$_2$; or about 1200 to about 1800 PPM CO$_2$.

In embodiment 14, the disclosure provides the method of any of embodiments 9-13 further comprising regenerating the polyamine P-dendrimer of formula I by heating the polyamine P-dendrimer to a temperature in the range of about 50° C. to about 150° C. In some embodiments, the regeneration may be in a temperature range of about 50° C.

to about 70° C.; about 60° C. to about 80° C.; about 70° C. to about 90° C.; about 80° C. to about 100° C.; about 90° C. to about 110° C.; about 100° C. to about 120° C.; about 110° C. to about 130° C.; about 120° C. to about 140° C.; or about 130° C. to about 150° C. The temperature for sorbent regeneration may be about 30° C. to about 60° C. above the temperature for $CO_2$ absorbing. That is, if the $CO_2$ is absorbed at 25° C., the sorbent will be regenerated at a temperature of about 55° C. to about 85° C. If the $CO_2$ is absorbed at 70° C., the sorbent will be regenerated at a temperature of about 100° C. to about 150° C.

In embodiment 15, the disclosure provides a process for the capture and removal of $CO_2$ from a $CO_2$-containing stream with the process comprising: (a) providing a housing having dispersed therein a sorbent comprising the polyamine P-dendrimer of any of embodiments 1-3 or composite materials of embodiments 4 or 5; (b) passing a $CO_2$-containing stream through the housing such that the $CO_2$-containing stream contacts the sorbent; (c) flushing the housing with steam to cause the sorbent to desorb an $CO_2$ retained therein as a result of contact of the sorbent with the $CO_2$-containing stream; and (d) flushing the housing with air to remove the steam from the housing.

In embodiment 16, the disclosure provides a method of making a polyamine phosphorus dendrimer (P-dendrimer) having the formula I

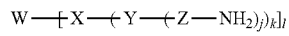

wherein W is a phosphorus based dendrimer core; X is a polyfunctional aromatic linker; Y may be present or absent and if present is a polyfunctional amino phosphoryl group linked to a polyfunctional aromatic linker; Z is an diamino alkyl group, a polyalkyl amino group, a polyethyleneimine, or a polypropyleneimine; j and k are numerical values corresponding to the branch point multiplicity and whose values independently range from 1 to 10; and l is a numerical value corresponding to the branch point multiplicity and whose values ranges from 2 to 10; which method comprises: (a) reacting a phosphoryl chloride starting material for the phosphorus based dendrimer core with a nucleophilic aldehyde starting material for the polyfunctional aromatic linker so as to form a polyphosphoryl ester aldehyde compound; (b) condensing the polyphosphoryl ester aldehyde compound with an polyalkyl amine to form a polyalkyl imine polyphosphoryl ester; and (c) reducing the a polyalkyl imine polyphosphoryl ester to form the polyamine phosphorus dendrimer (P-dendrimer).

4. BRIEF DESCRIPTION OF THE FIGURES

FIG. 1. Packed-bed reactor (PBR) Illustration. A, B, C, and D are humidifier, packed bed reactor, vapor condenser, and water collector, respectively FIG. 2. Selected examples of P-dendrimers used to produce solid polyamine sorbents.

Figure 3:
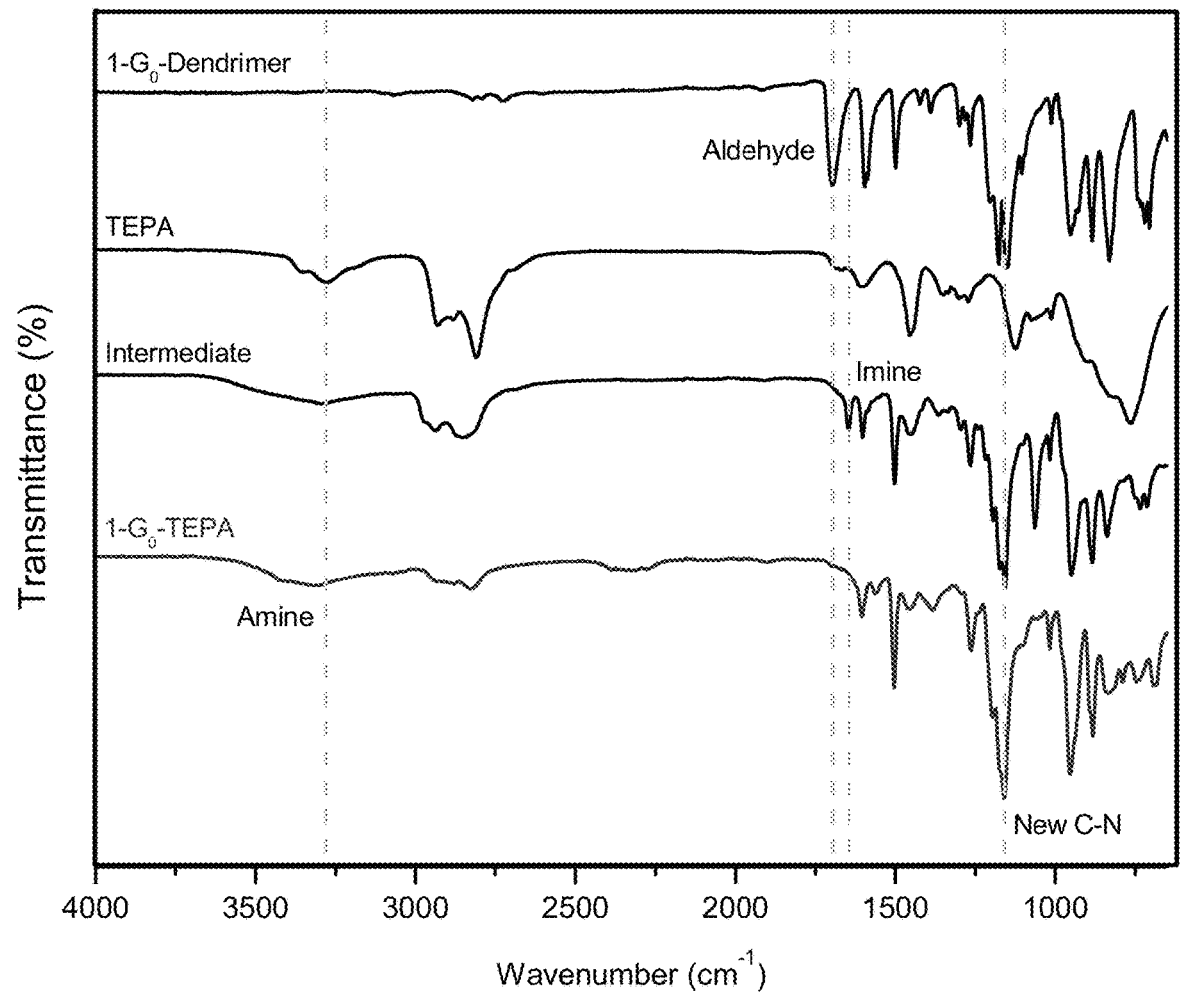

FIG. 3. Infrared spectra comparison of solid sorbent with the starting materials and reaction intermediate.

Figure 4:
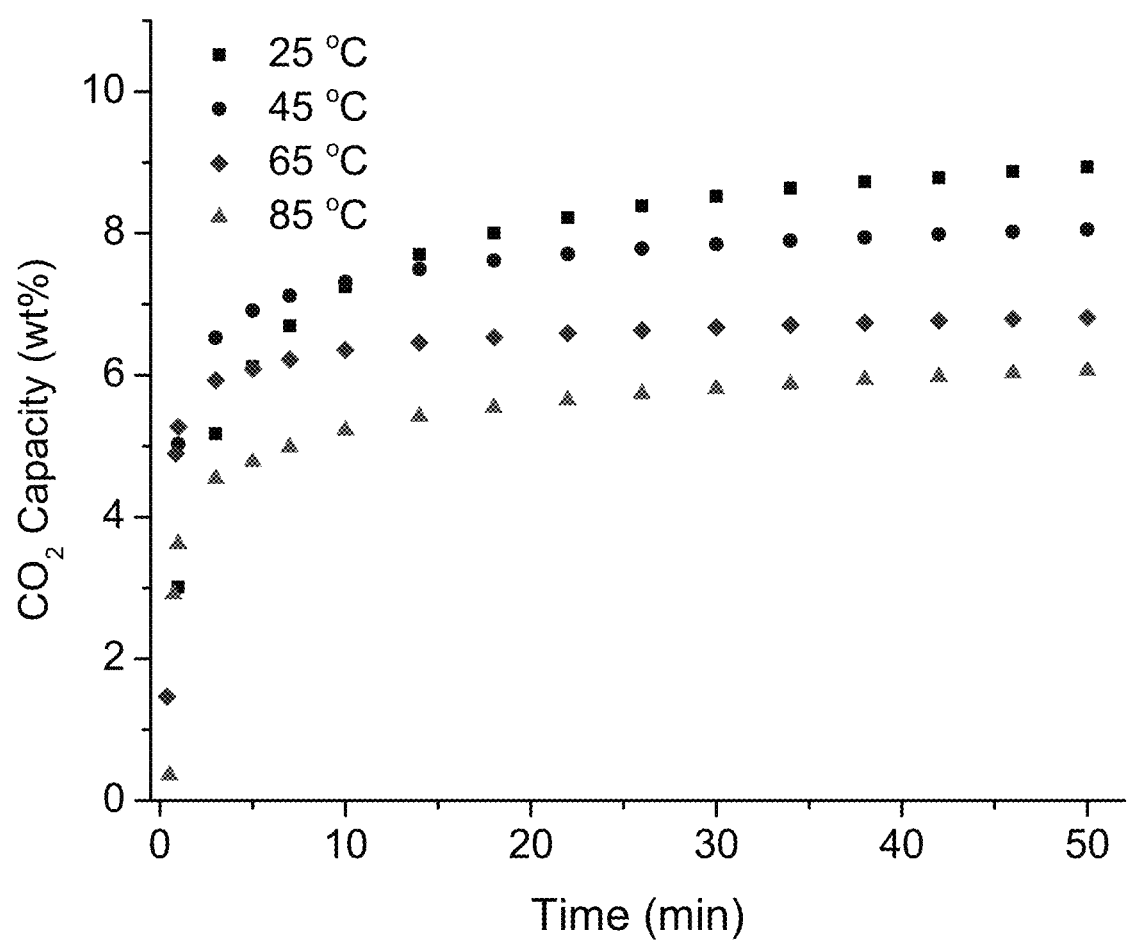

FIG. 4. Thermogravimetric analysis (TGA) curves displaying the temperature effect on 1-$G_0$-TEPA sorbent capacity.

Figure 5A:
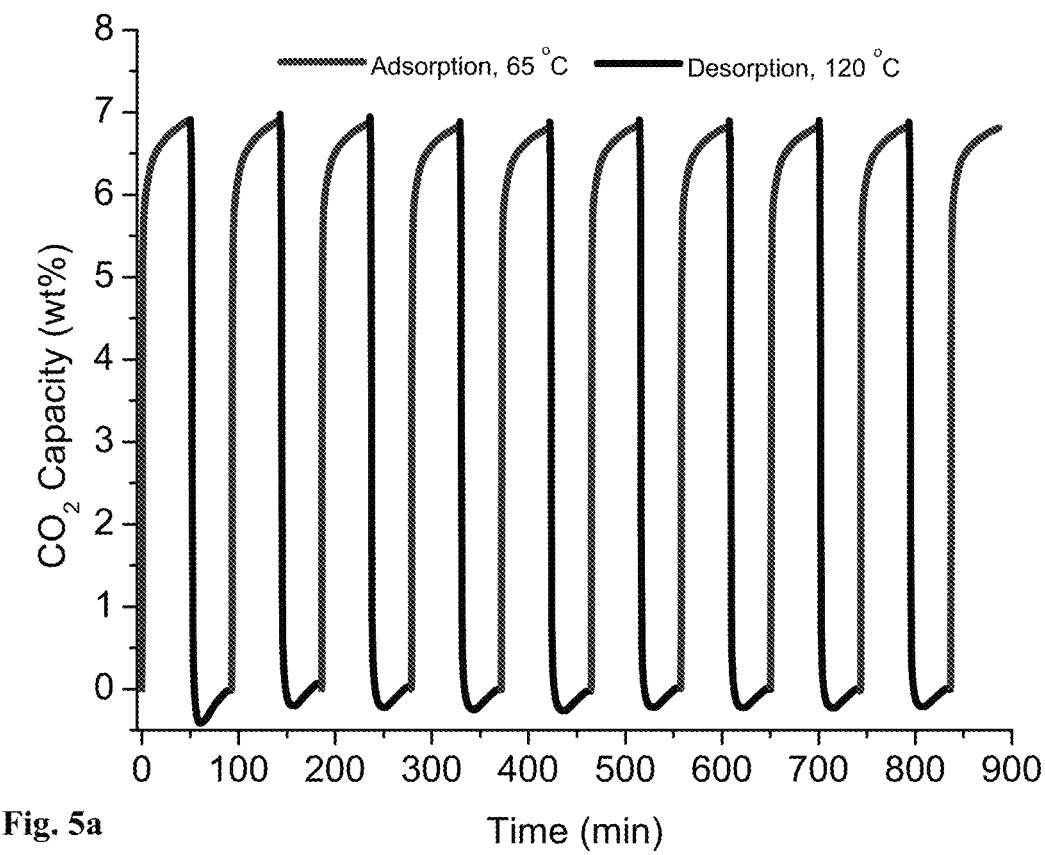
Figure 5B:
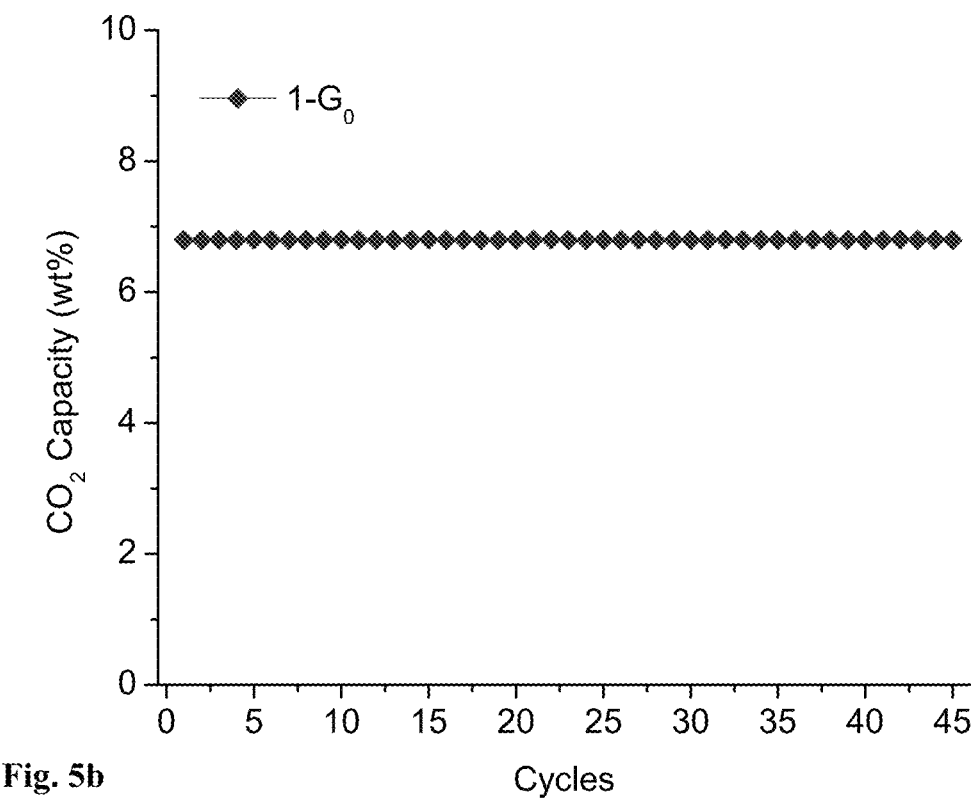

FIG. 5a-5b. FIG. 5a) TGA $CO_2$ adsorption/desorption over 10 cycles for 1-$G_0$-TEPA from a pure $CO_2$ stream. FIG. 5b) Average capacity over 45 adsorption/desorption cycles of 1-$G_0$-TEPA from a pure $CO_2$ stream.

Figure 6A:
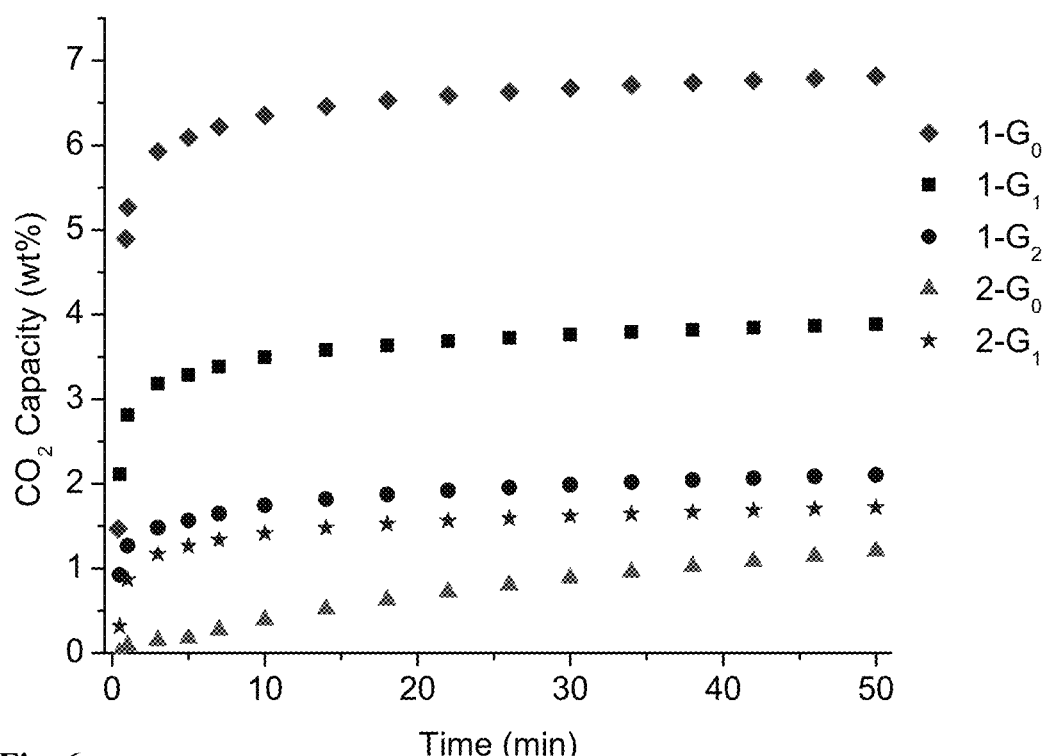
Figure 6B:
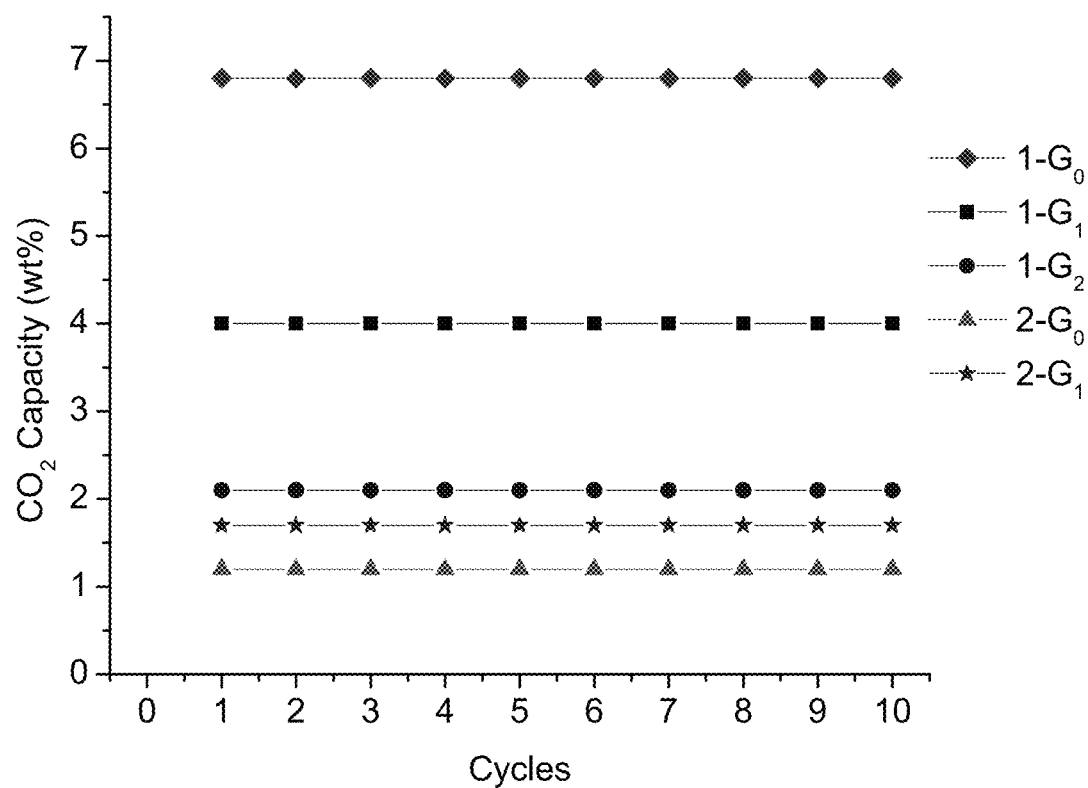

FIG. 6a-6b. P-dendrimer generation and geometric effect on sorbent $CO_2$ capacity over FIG. 6a) 50 minutes and FIG. 6b) 10 repeated cycles.

Figure 7:
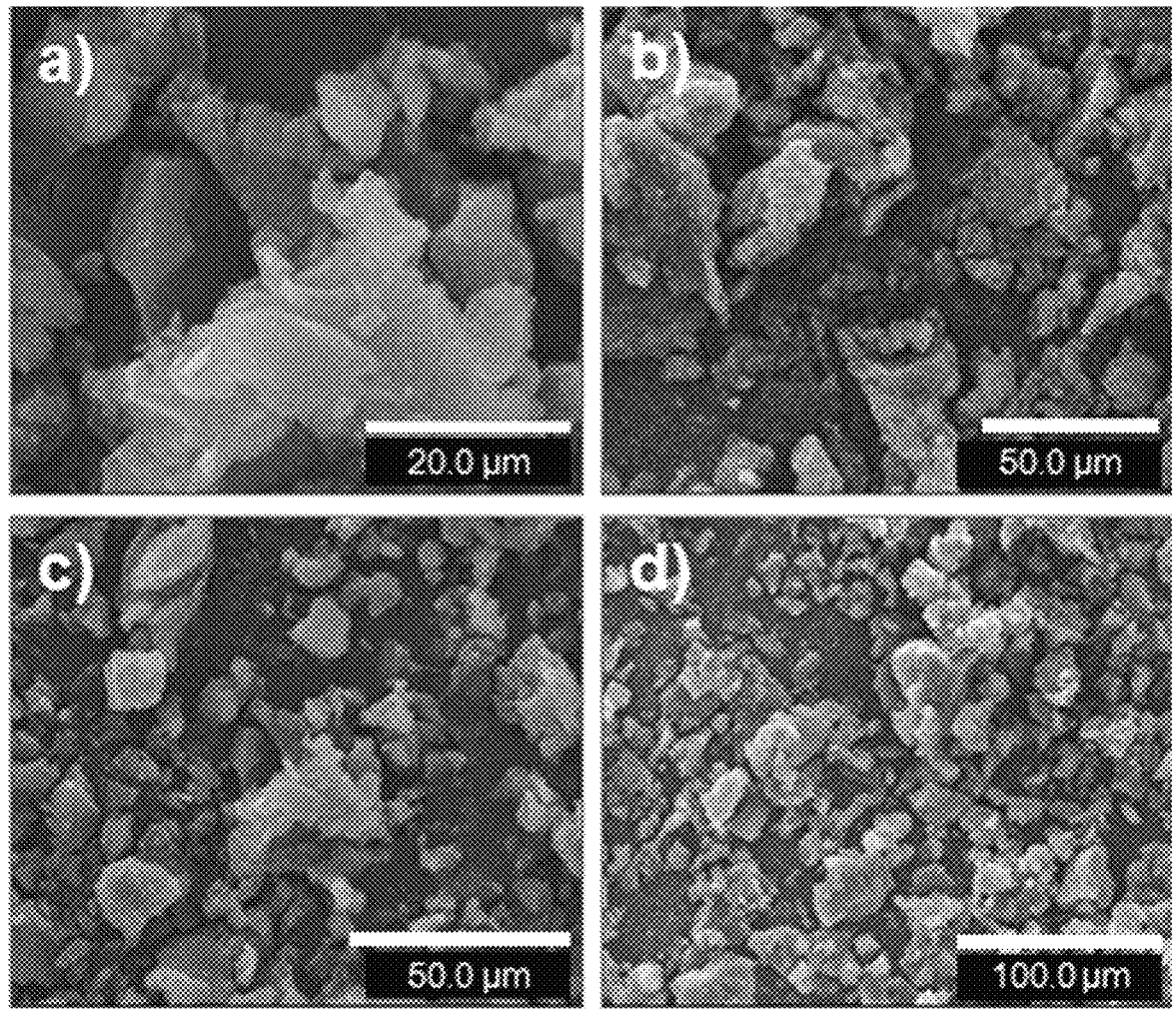

FIG. 7. Scanning electron microscopy images. Panel a) 1-$G_0$-TEPA (20 µm), Panel b) 1-$G_0$-TEPA (50 µm), Panel c) 1-$G_1$-TEPA (50 µm), and Panel d) 1-$G_2$-TEPA (100 µm).

Figure 8:
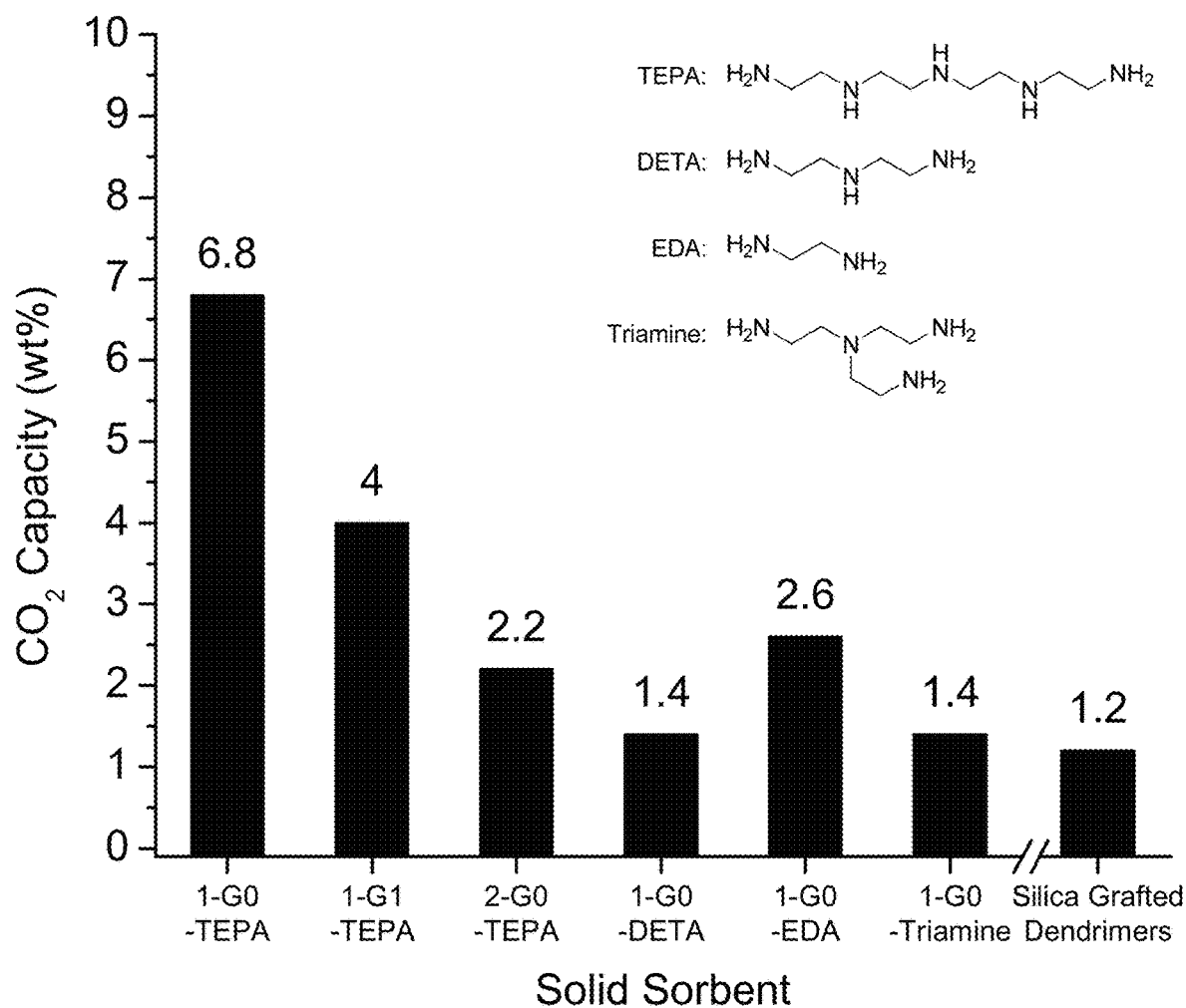

FIG. 8. P-dendrimer solid sorbents for $CO_2$ capture.

Figure 9:
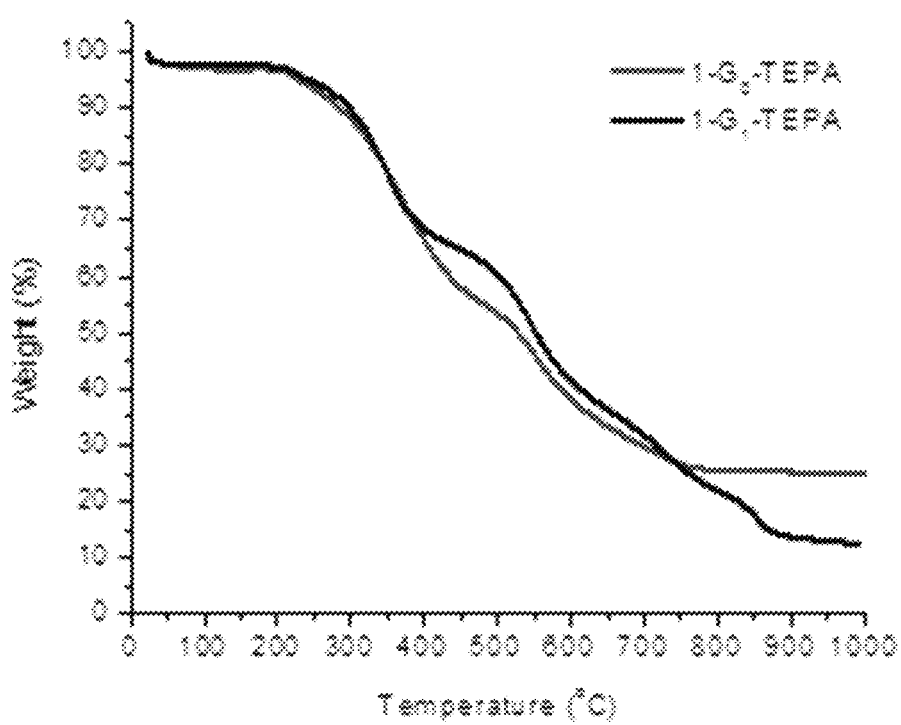

FIG. 9. TGA curves under air of a) 1-$G_0$-TEPA and b) 1-$G_1$-TEPA heated at a rate of 5° C. per min from 25 to 1000° C.

Figure 10:
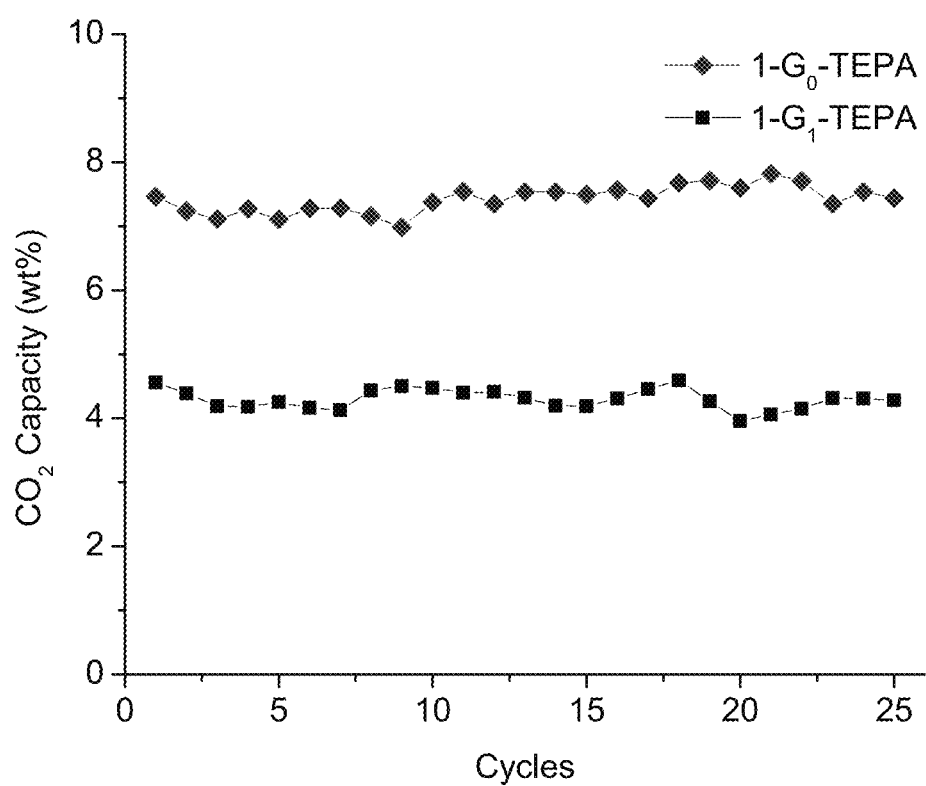

FIG. 10. Flue gas capture by 1-$G_0$-TEPA and 1-$G_1$-TEPA P-dendrimer solid sorbents.

FIG. 11. P-dendrimers used to produce solid amine sorbents with PEI.

Figure 12:
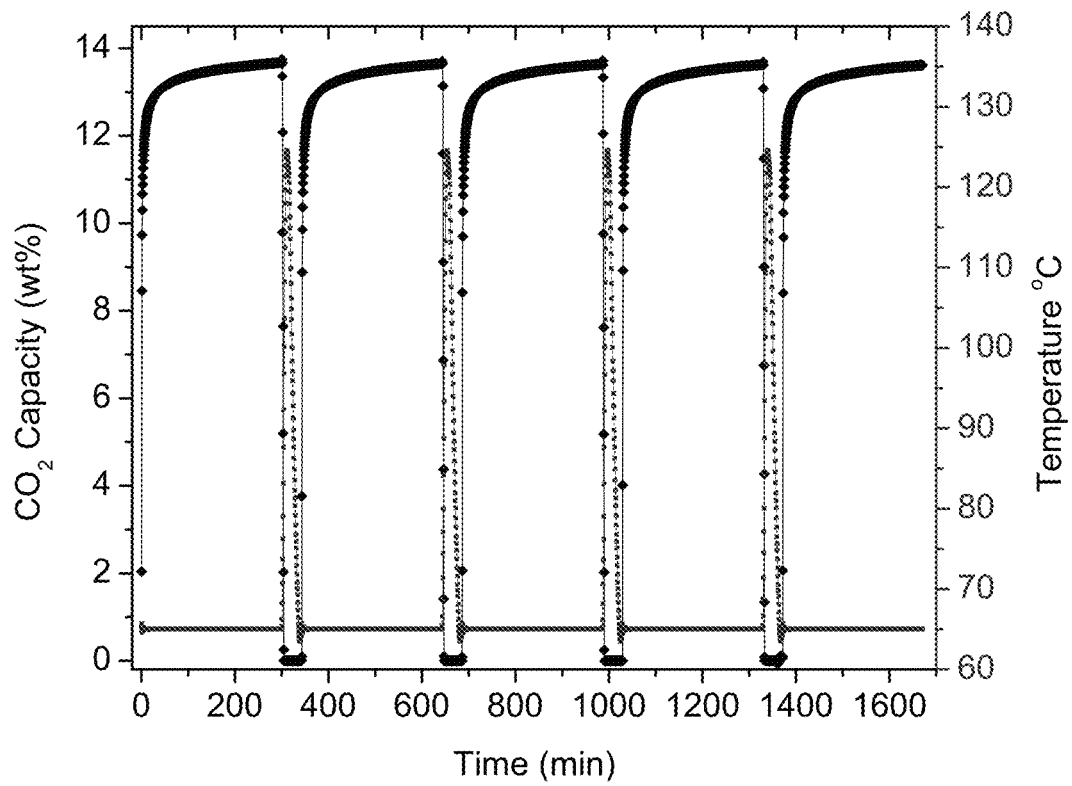

FIG. 12. Saturation of 1-$G_0$/600PEI with $CO_2$ and cyclic adsorption/desorption studies.

Figure 13:
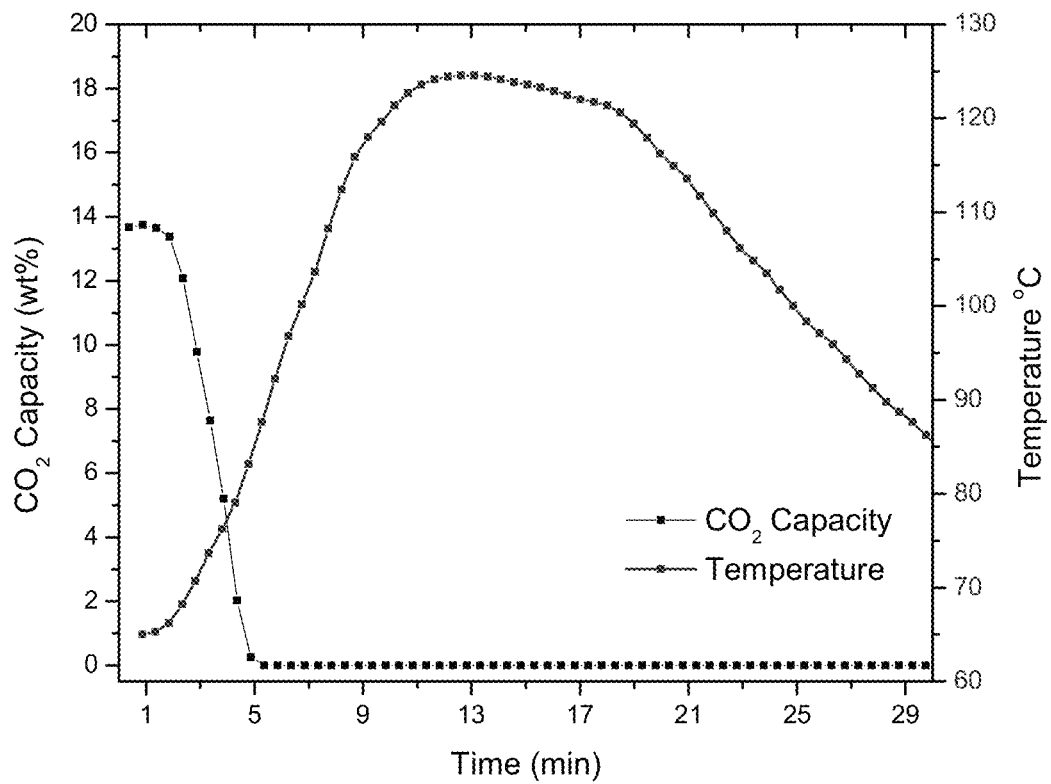

FIG. 13. Rapid desorption from 1-$G_0$/600PEI following thermal heating of the material.

Figure 14:
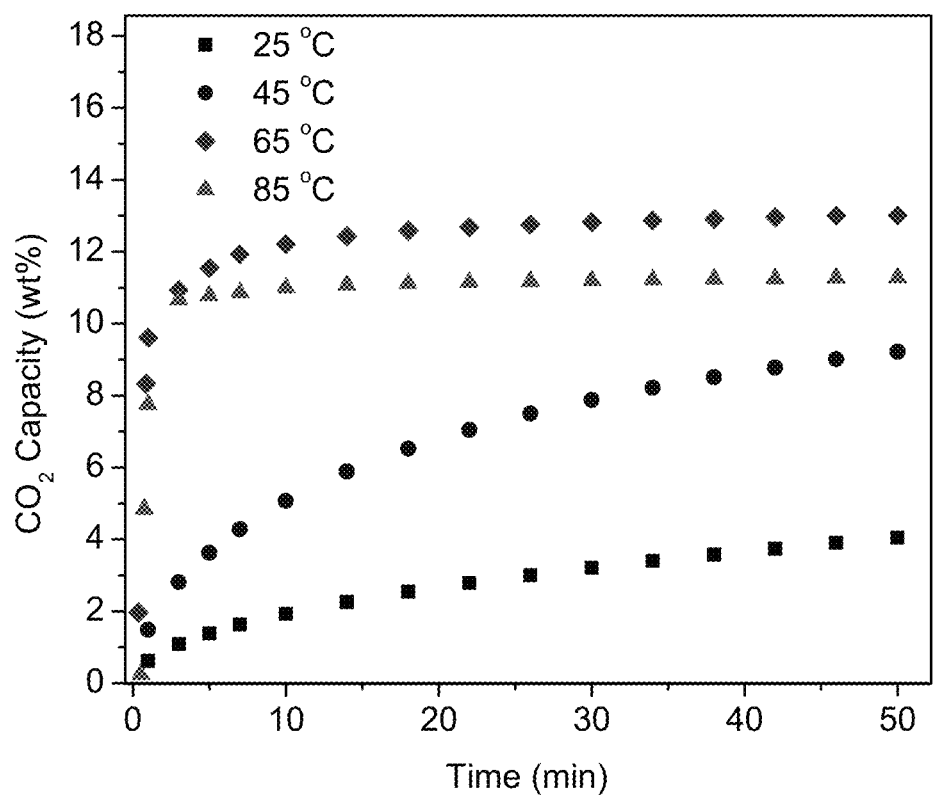

FIG. 14. Temperature effect on the adsorption of $CO_2$ by 1-$G_0$/600PEI.

Figure 15:
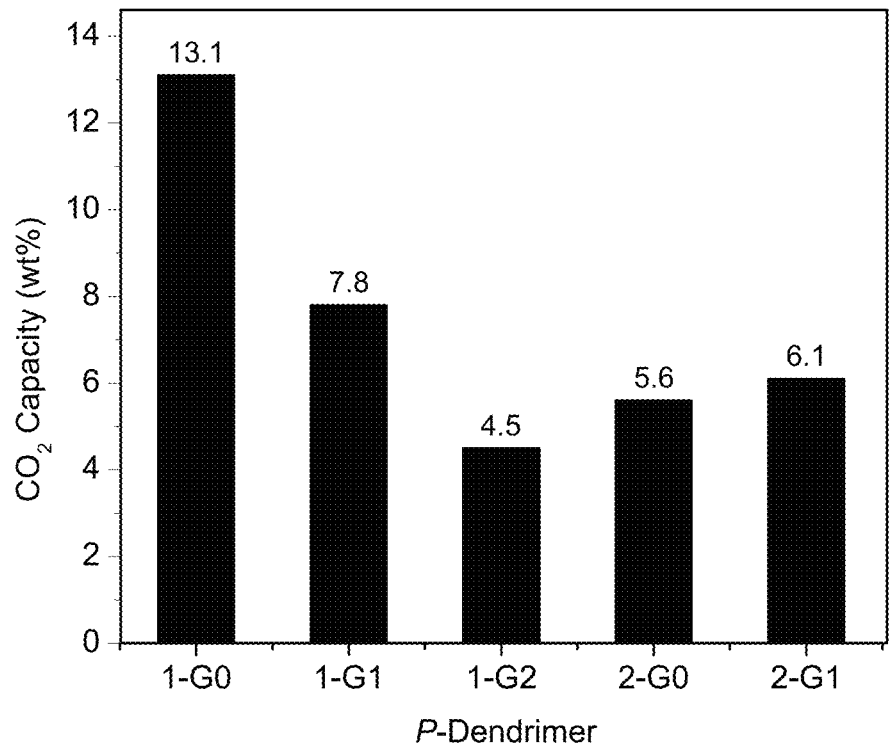

FIG. 15. Sorbent capacities from 600 MW PEI combined with various P-dendrimers.

Figure 16:
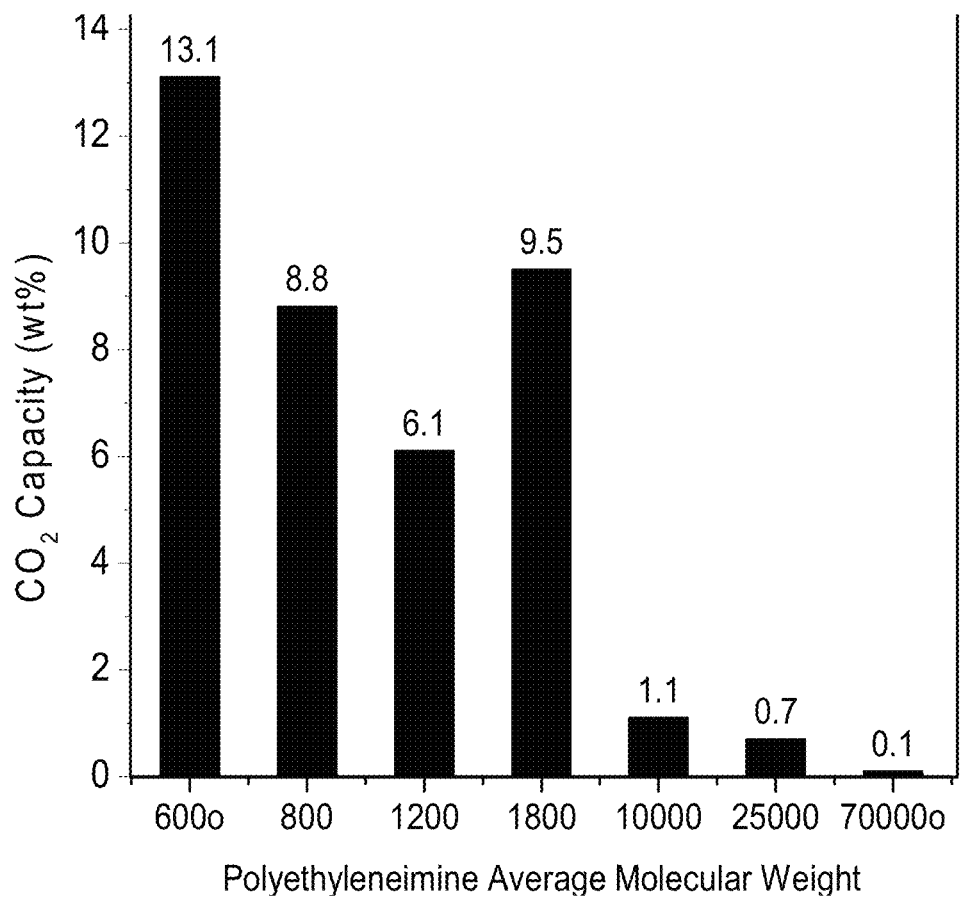

FIG. 16. Sorbent capacities from 1-$G_0$ combined with polyethyleneimines.

Figure 17:
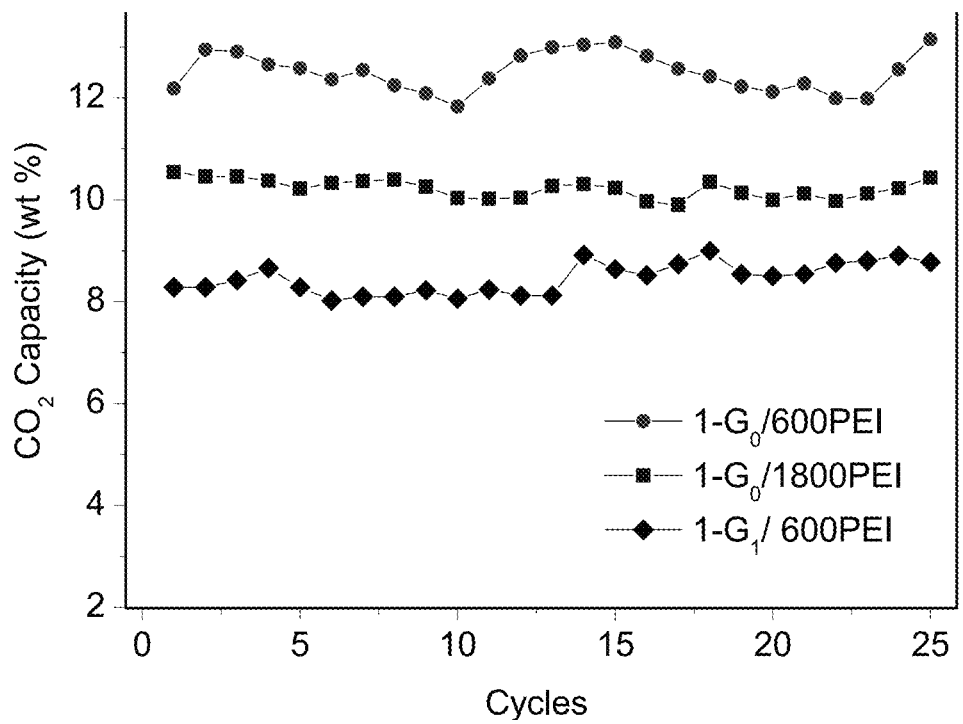

FIG. 17. $CO_2$ Capacities of 1-$G_0$/600PEI, 1-$G_0$/1800PEI and 1-$G_1$/600PEI under simulated flue gas conditions.

Figure 18:
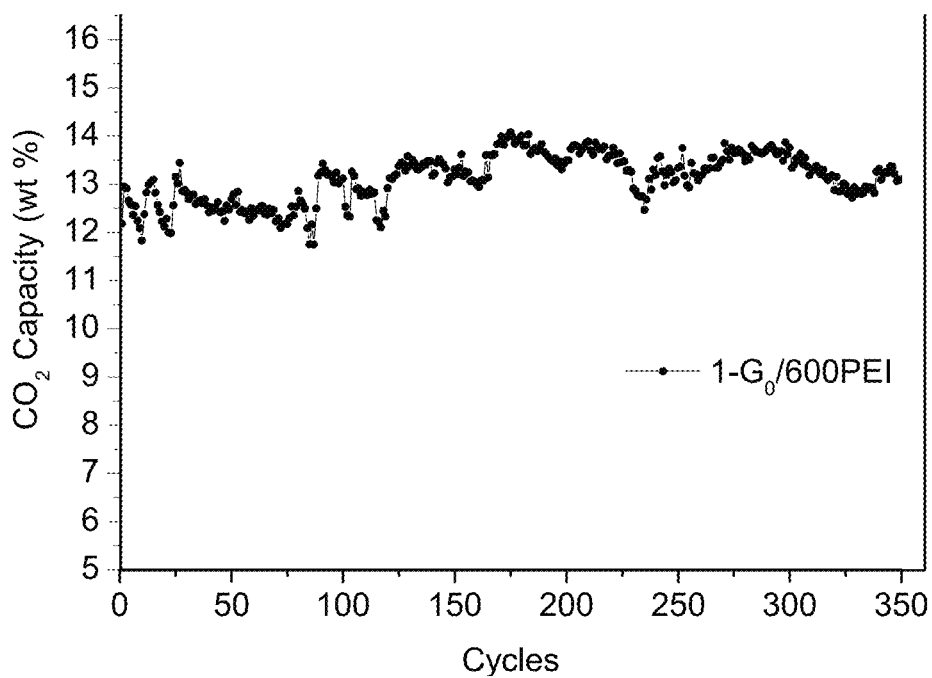

FIG. 18. Long-term cyclic adsorption/desorption testing of 1-$G_0$/600PEI with simulated flue gas.

Figure 19:
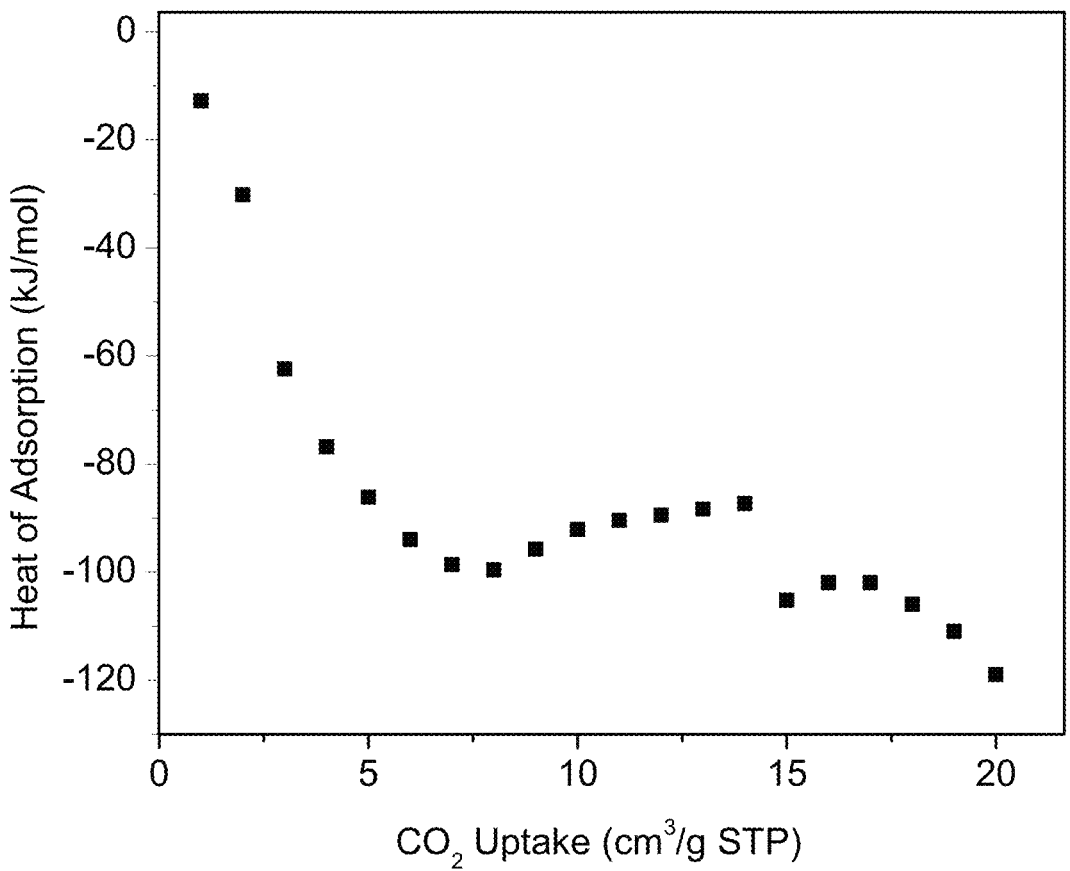

FIG. 19. Heat of adsorption values of 1-$G_0$/600PEI.

Figure 20:
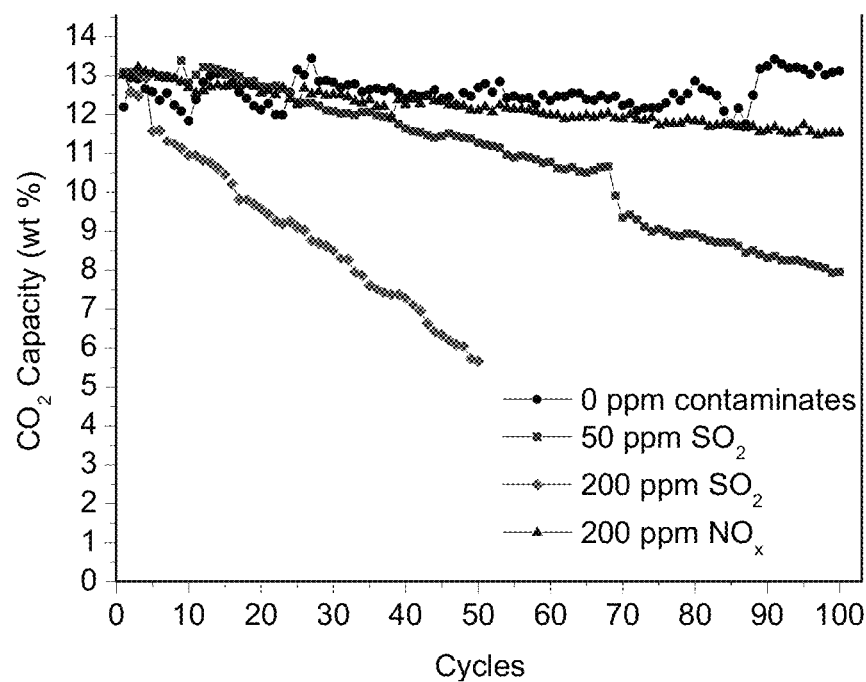

FIG. 20. Effects of $SO_2$ and $NO_x$ (90:1, $NO:NO_2$) on 1-$G_0$/600PEI.

Figure 21:
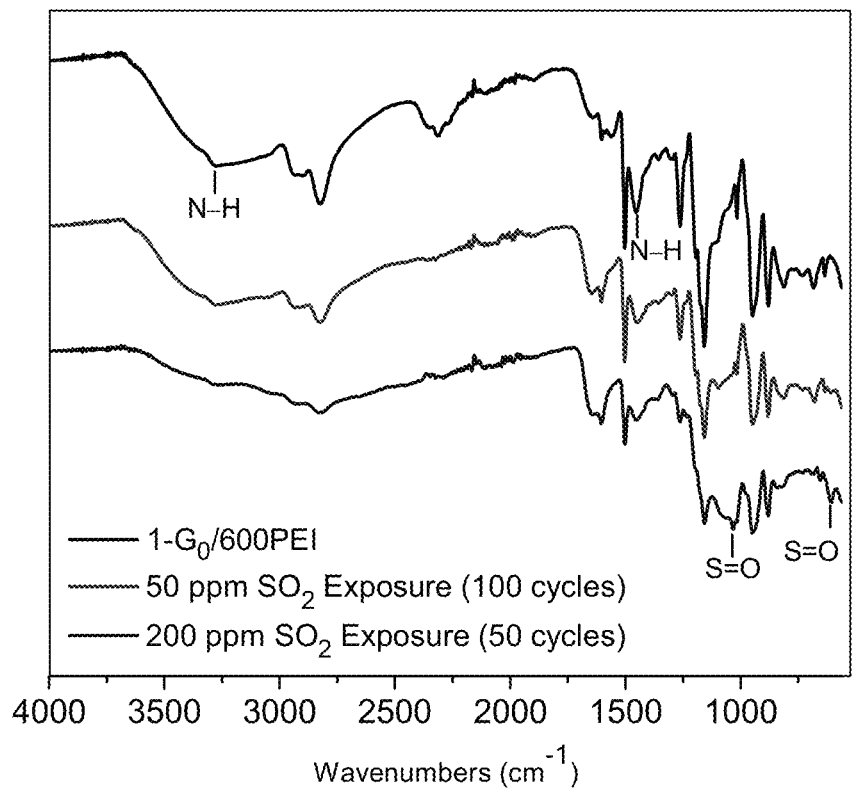

FIG. 21. Evidence of sulfonamide incorporation into P-dendrimer solid sorbent via Infrared Spectroscopy.

Figure 22:
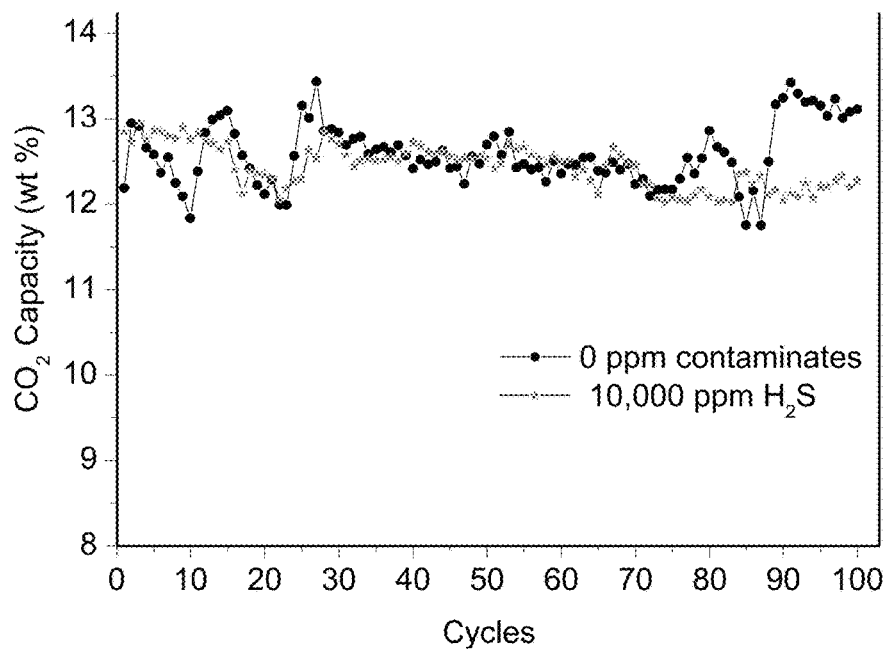

FIG. 22. Efficient removal of $CO_2$ from sour gas.

Figure 23:
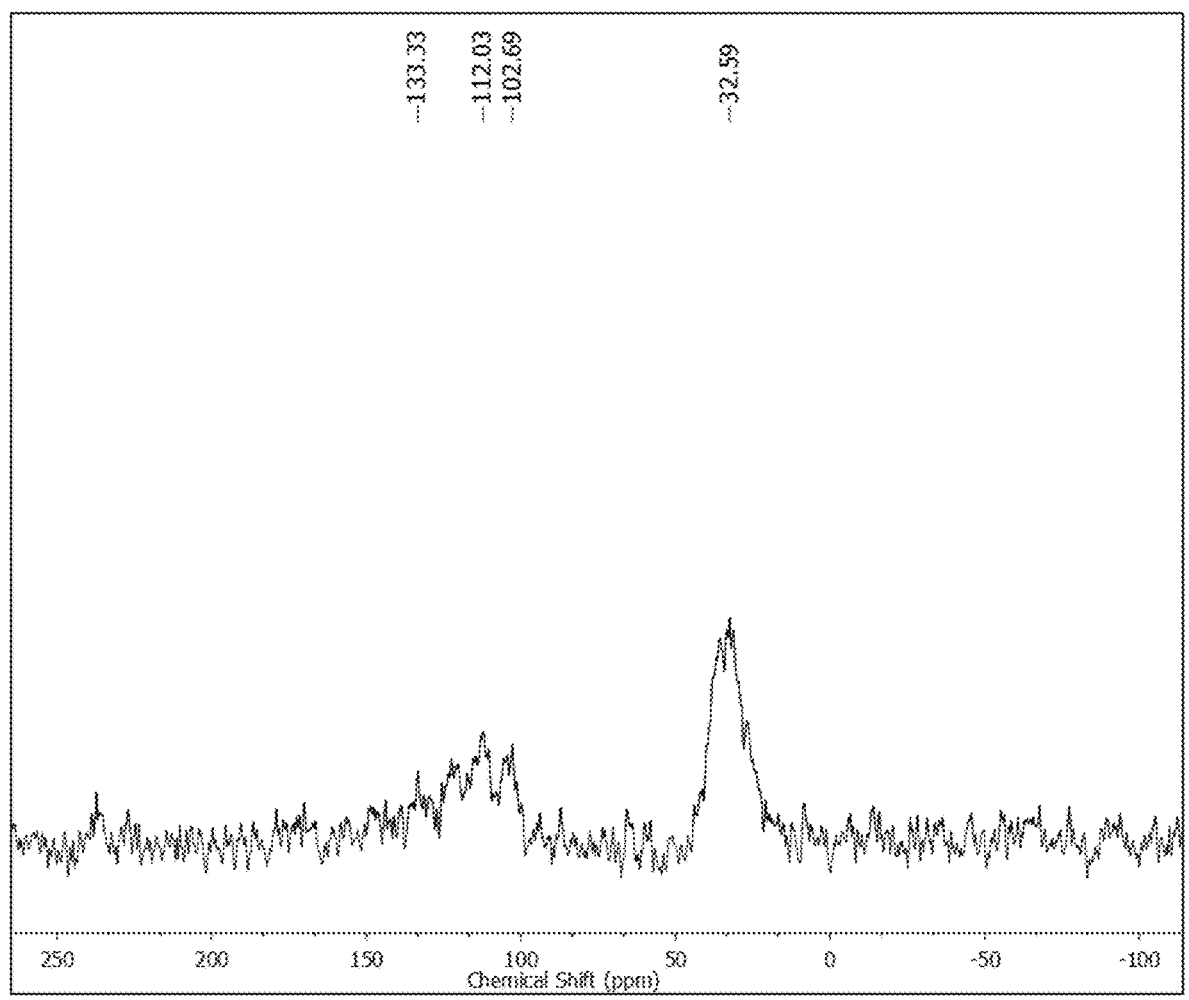

FIG. 23. Solid State $^{13}C$ CP/MAS spectrum of 1-$G_0$/600PEI.

Figure 24:
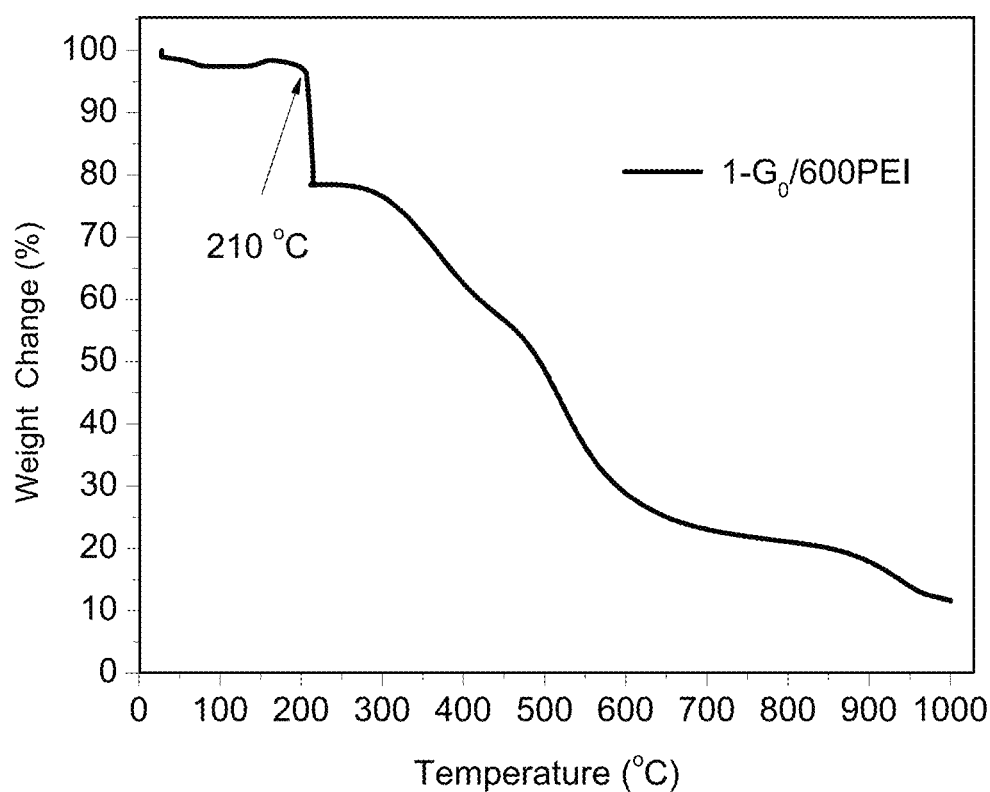

FIG. 24. Thermogravimetric stability analysis of 1-$G_0$/600PEI.

Figure 25:
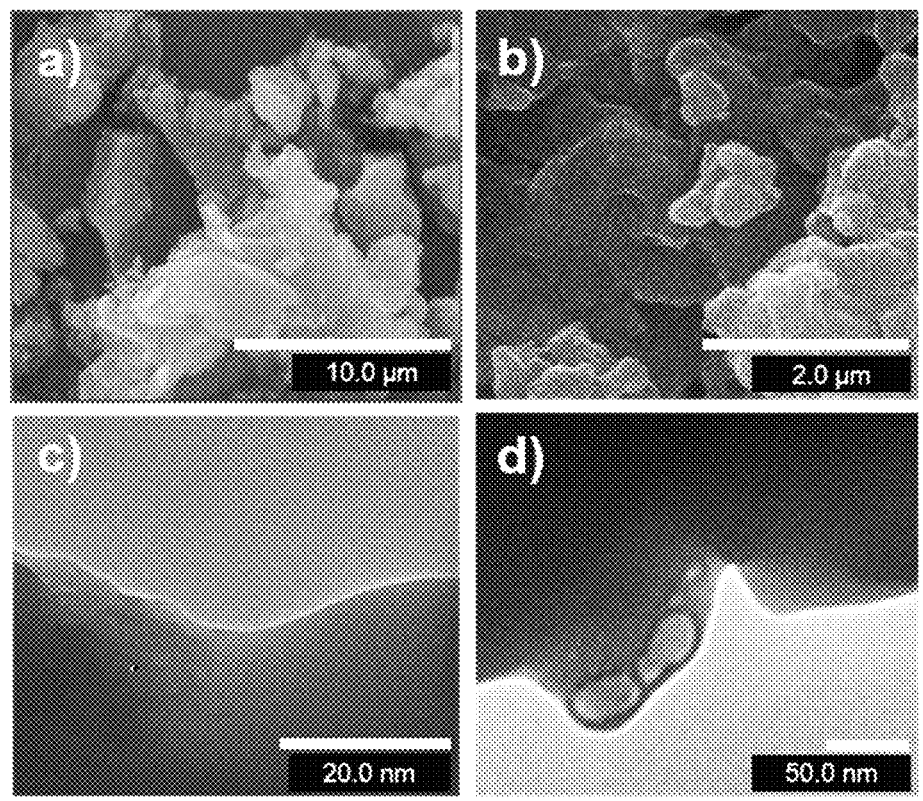

FIG. 25. SEM images (Panels a and b) showing clusters of 1-$G_0$/600PEI and TEM images (Panels c and d) with micropores.

Figure 26:
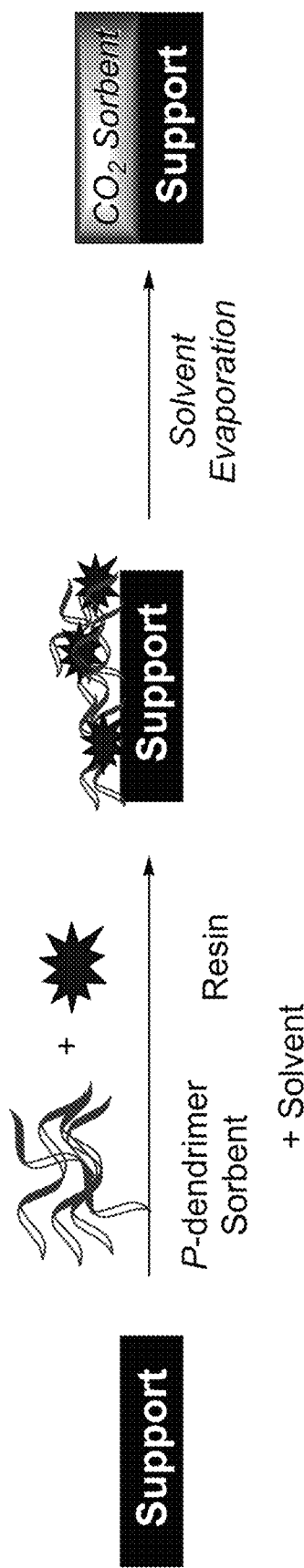

FIG. 26. PEI cross-linked P-dendrimer sorbent coated onto support surface.

Figure 27:
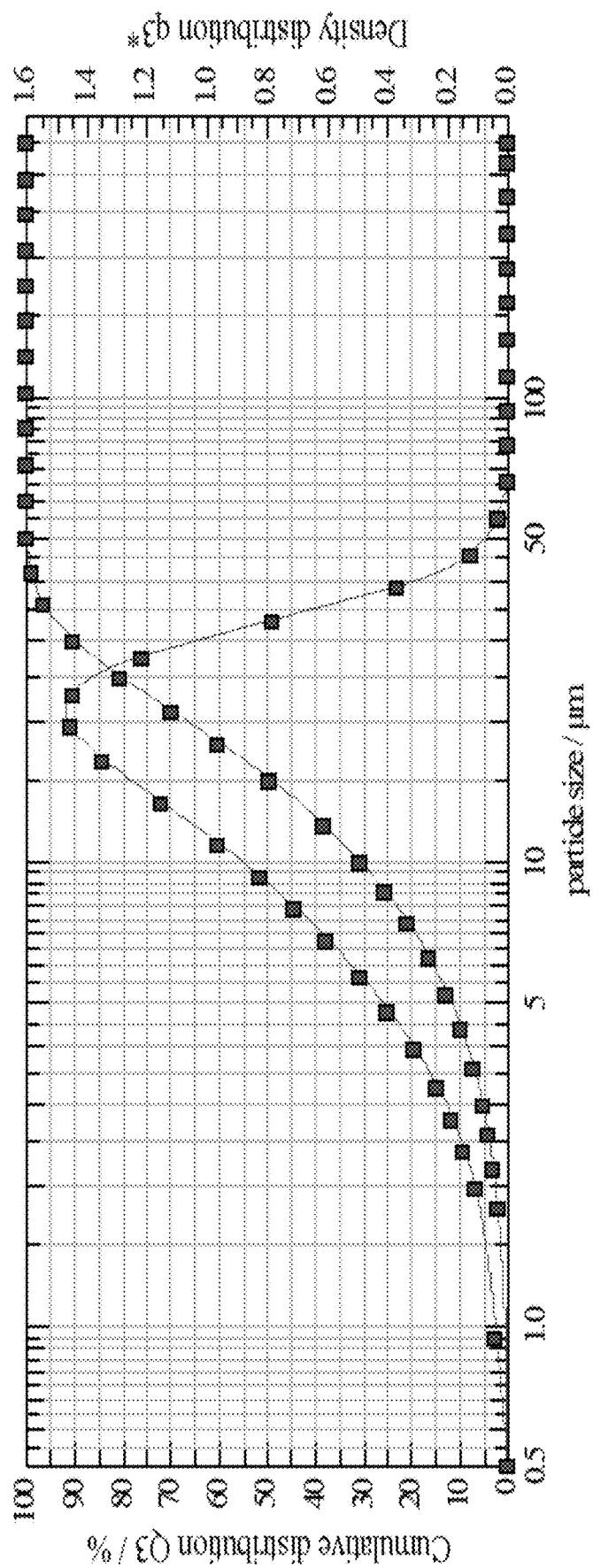

FIG. 27. Polymer size distribution for the composite materials.

Figure 28:
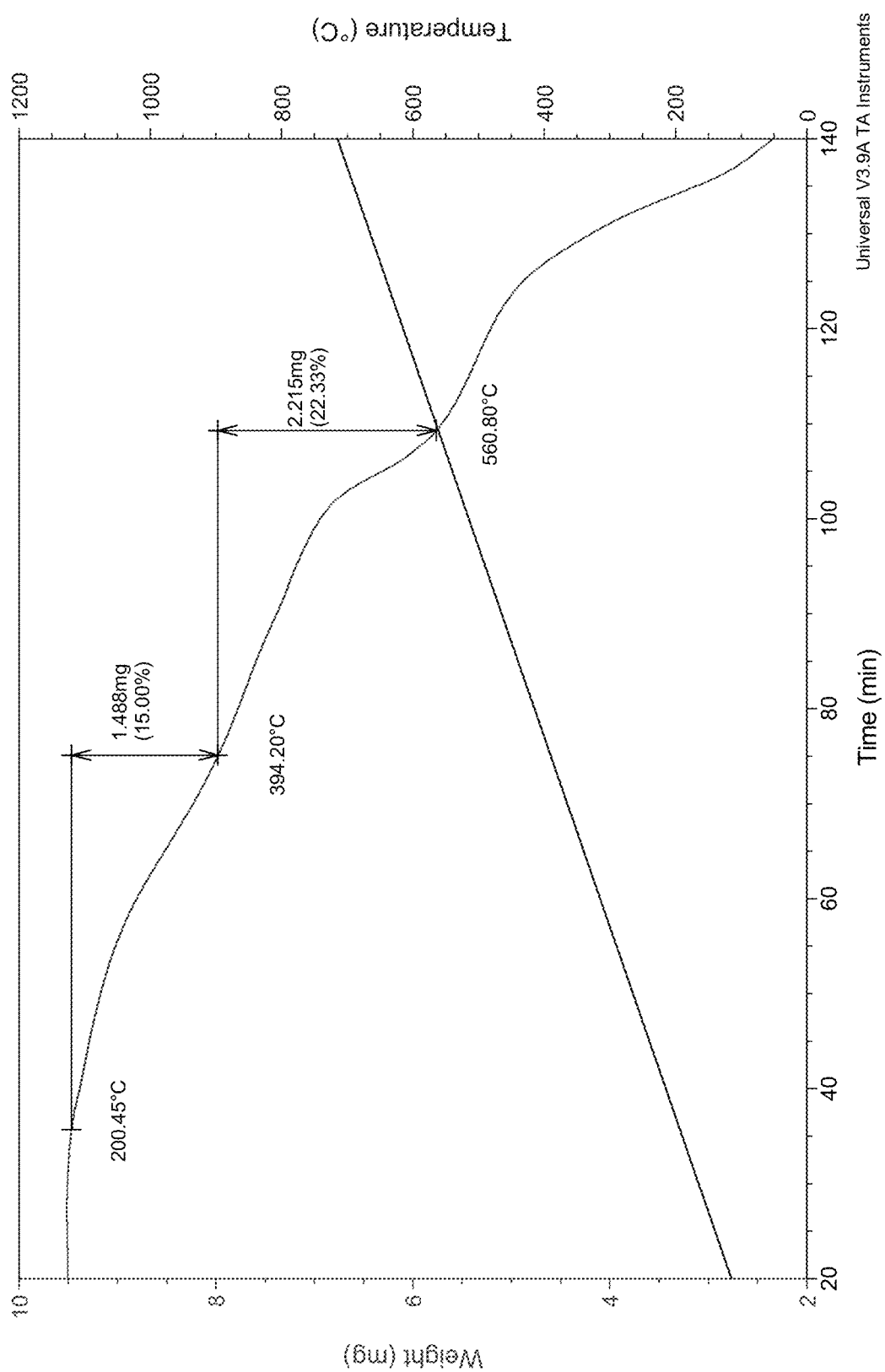

FIG. 28. TGA for the composite material.

Figure 29A:
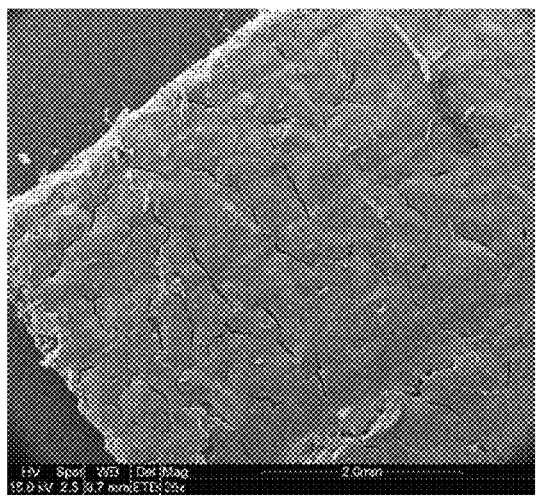
Figure 29B:
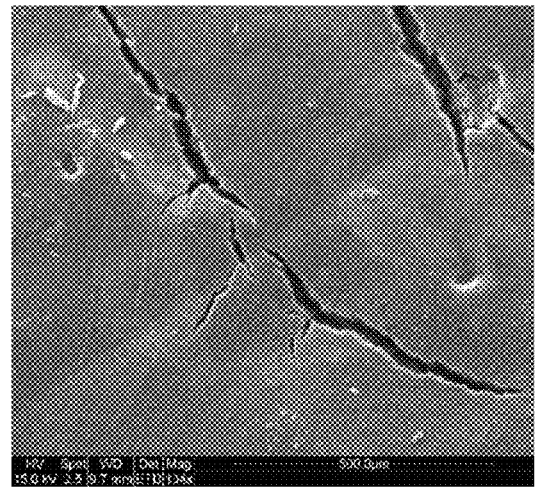
Figure 29C:
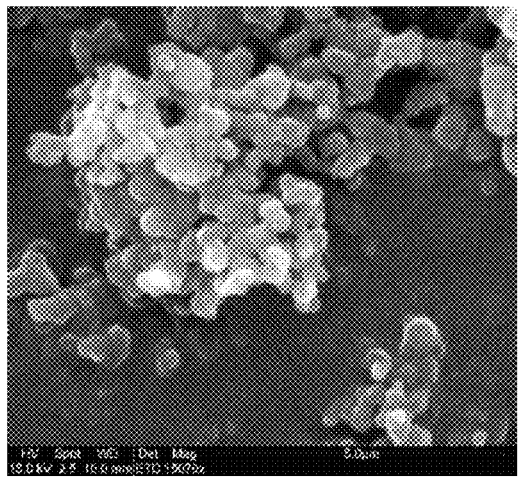
Figure 29D:
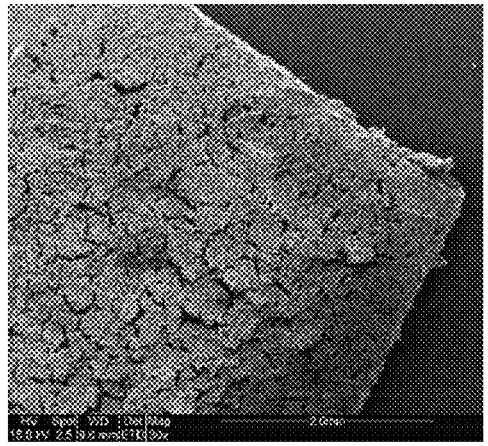
Figure 29E:
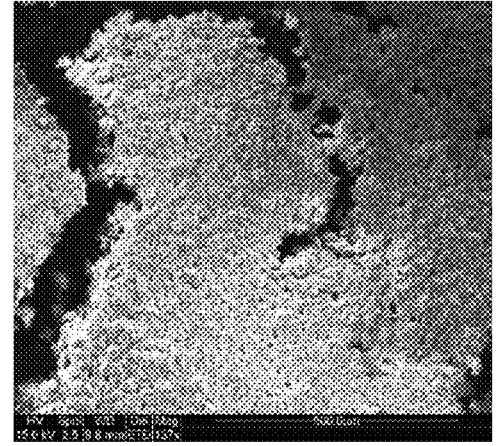
Figure 29F:
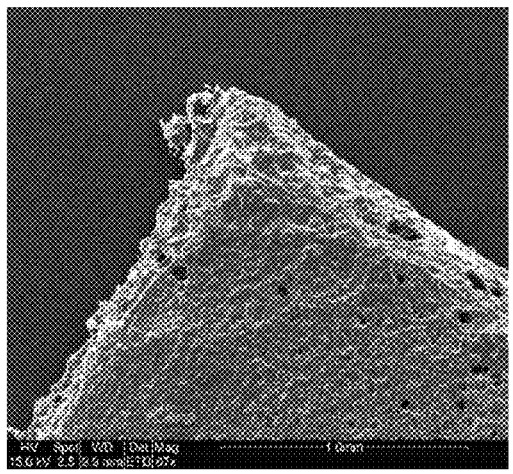
Figure 29G:
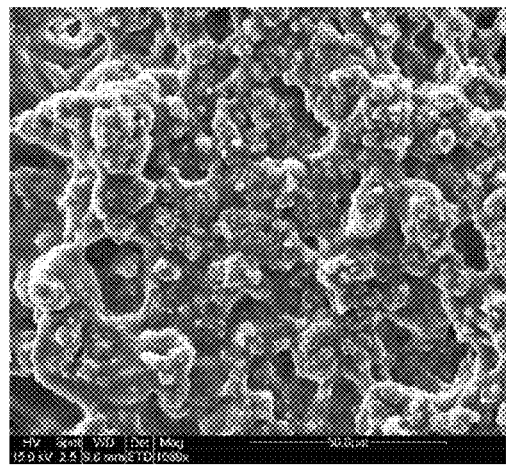

FIG. 29A-FIG. 29G. Scanning electron microscopy (SEM) for the carbon sheet (FIG. 29A & FIG. 29B), P-Dendrimer/PEI polymer (FIG. 29C) and composite material (FIG. 29E-FIG. 29G).

Figure 30:
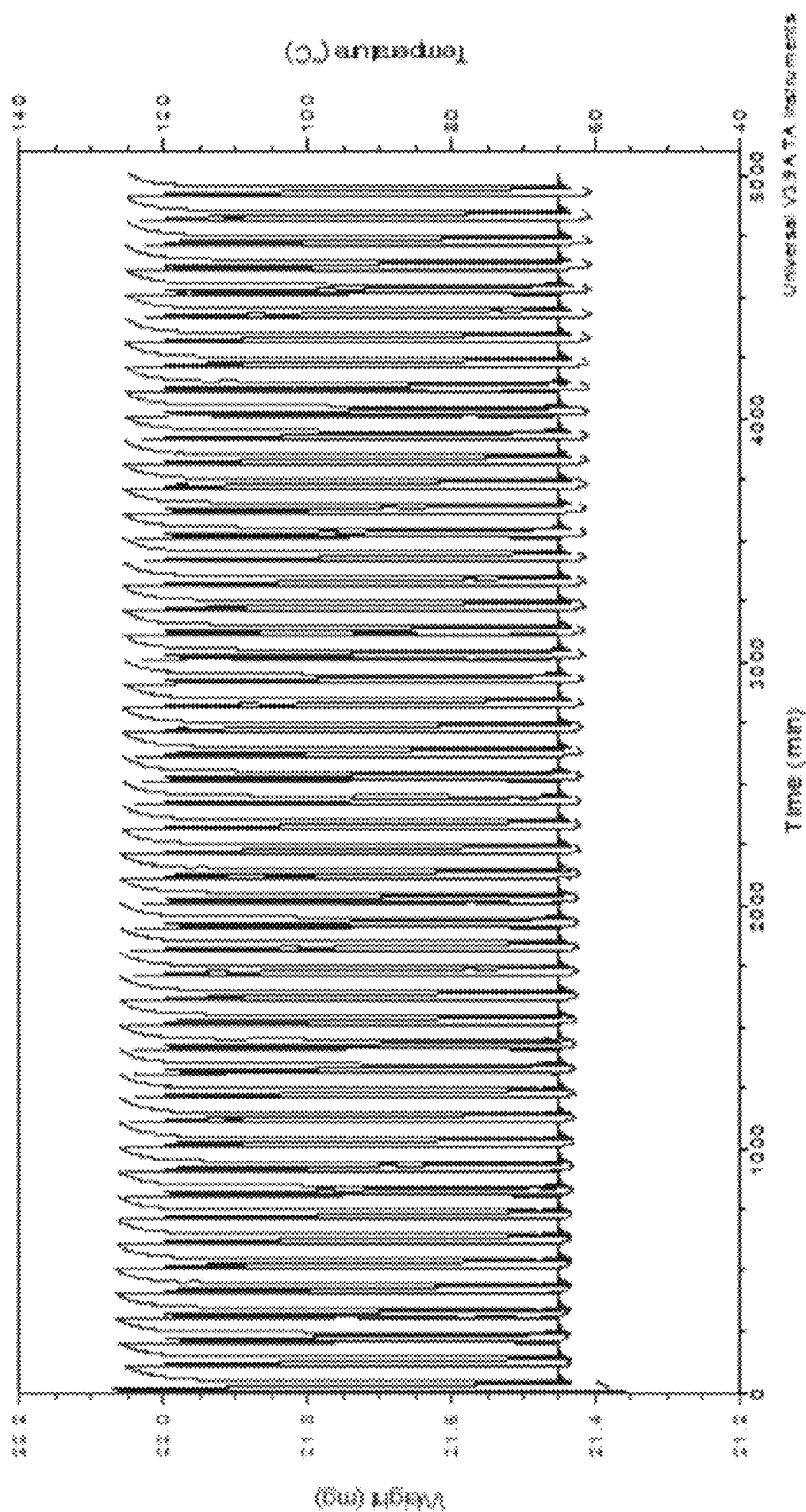

FIG. 30. Composite Material TGA profile over 50 cycles.

Figure 31:
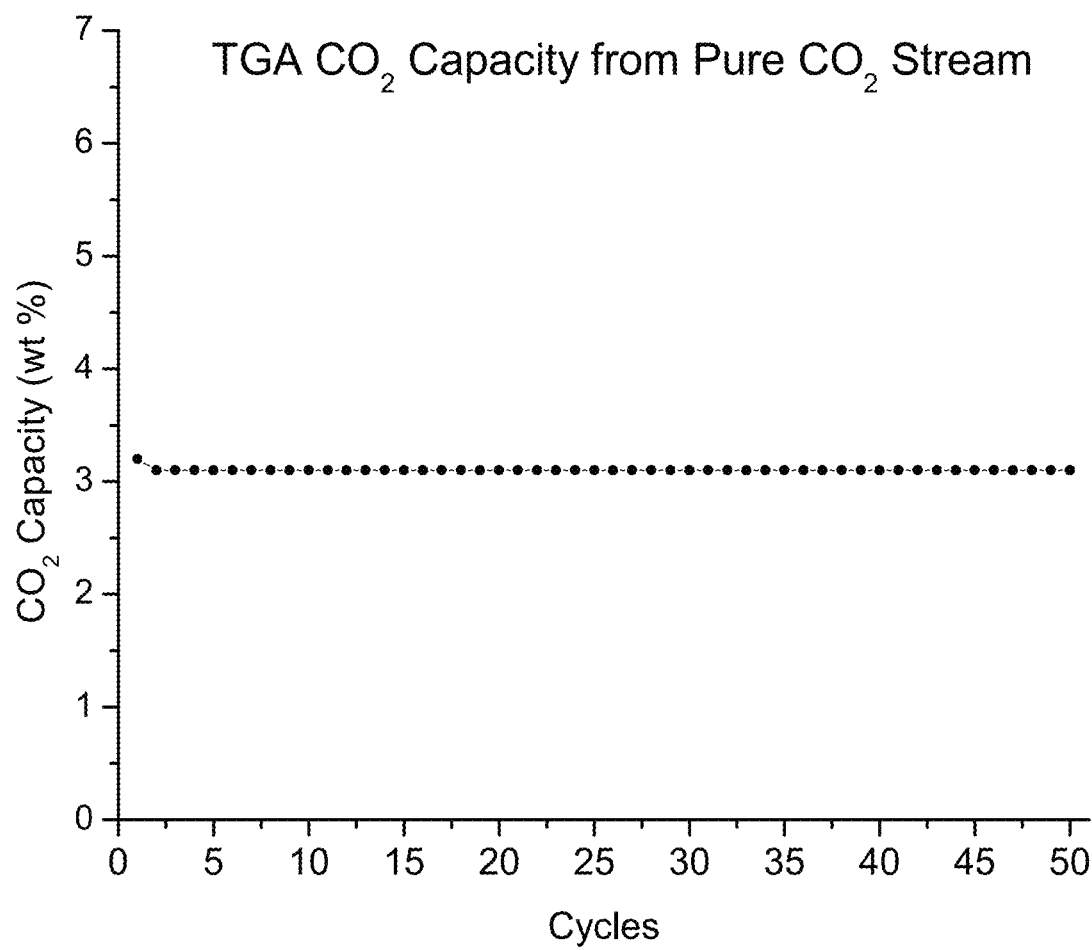

FIG. 31. $CO_2$ capacity of composite material from TGA cycle test.

Figure 32:
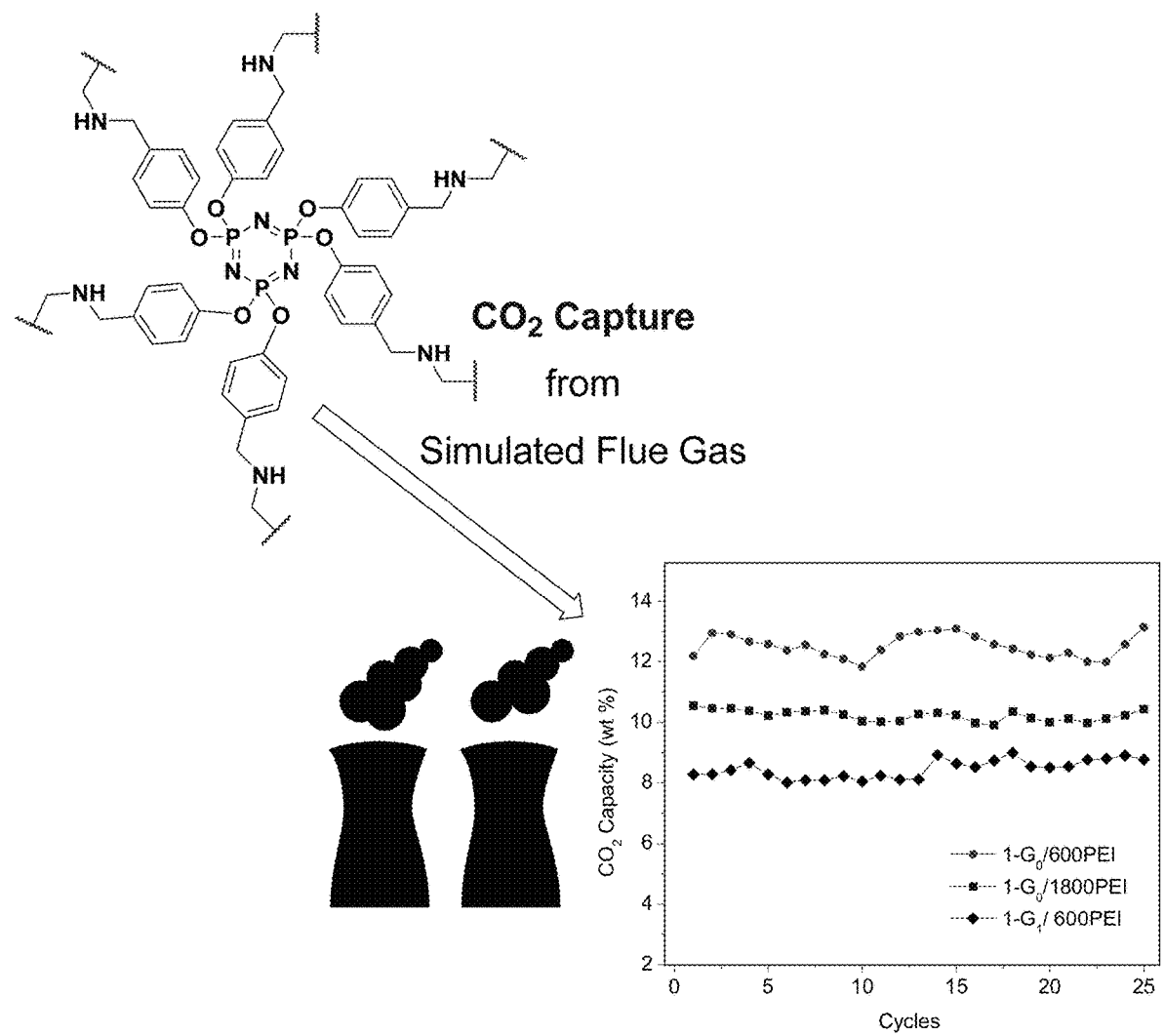

FIG. 32. Graphical summary of $CO_2$ capture using selected examples of P-dendrimers.

5. DETAILED DESCRIPTION OF THE DISCLOSURE

This disclosure provides a method for the synthesis of novel solid sorbents for gas capture and separation, at low and high concentrations, based on the solidification of polyethyleneimine (PEI), as well as other amines, with polyaldehyde containing phosphorous dendrimers. These sorbents possess rapid kinetics and high capacities with both the capture and release of $CO_2$ at various pressures and temperatures. The solid sorbent can be coated onto a support or structural surfaces to afford additional pathways for gas capture.

P-dendrimers, which are polymer star-like materials, were employed as a PEI cross-linking agent to form solid sorbents. P-dendrimers can be synthesized by straightforward means and commonly are functionalized at terminal positions by reactive end groups, such as aldehydes (Majoral, J.-P. New Aspects in Phosphorus Chemistry II. In Topics in Current Chemistry. Springer, 2004). In general, P-dendrimers are thermally stable robust compounds that can be advantageously employed for materials applications. P-dendrimers can range in size based on the number of branches emanating from the central core, with each branch being called a "generation." The use of a dense compound layered with aldehydes would provide an excellent anchor to react with many amine functionalities to rigidify and ultimately solidify polyamine compounds. To the best of our knowledge, no report has been described combining PEI with polyaldehyde P-dendrimers to produce solid sorbents.

This disclosure describes a novel synthesis linking PEI to polyaldehyde P-dendrimers via chemical means to produce new sorbents that can achieve high $CO_2$ loading capacity, shows fast adsorption and regeneration kinetics, possesses a wide range of operational temperatures, is stable under flue gas conditions, and does not suffer from PEI leaching or degradation over long term usage. The sorbent described is insoluble in both aqueous and organic media, overcoming challenges involved with water solubilization of PEI, or breaking of chemical bonds to PEI, which results in the loss of PEI from the material during testing. The novel P-dendrimer/PEI material is comprised of 20 wt % nitrogen and achieves $CO_2$ capacities of 13.1 wt % under thermogravimetric analysis (TGA) testing at 1 atm $CO_2$ and packed bed reactor (PBR) modeled flue gas conditions. The stability of this material is exemplified by its no net-loss of capacity over 350 cycles equaling 700 continuous running hours under simulated flue gas conditions capture. This material represents one of the most efficient and stable carbon capture materials reported to date.

Importantly, the sorbent preparation is highly modular to provide materials of different amine content and capacities, while maintaining the desired stability and efficiency properties. By changing the P-dendrimer component of the sorbent synthesis, the morphology of the resultant sorbent can be finely tuned. P-dendrimers of generation 0 to 12 can be employed. The use of other polyamine containing compounds (e.g. ethylenediamine (EDA), tetraethylenepentaamine (TEPA), linear PEI) can affect the overall reactive amine loading of the compound and change the physical density. Additional non-limiting examples of polyamines may be found below.

Sorbent reaction rates can also be altered to dramatically modify sorbent properties. Notably, the stability of the sorbent permits the reformulation of the compound into a composite material via resin-assisted adhesion onto support surfaces. For example, the sorbent can be adhered to the surface of carbon sheets to provide reversible $CO_2$ fixation. Thus, the sorbent preparation and applications for $CO_2$ capture are novel and can be used to prepare sorbents for many purposes both related and unrelated to carbon capture.

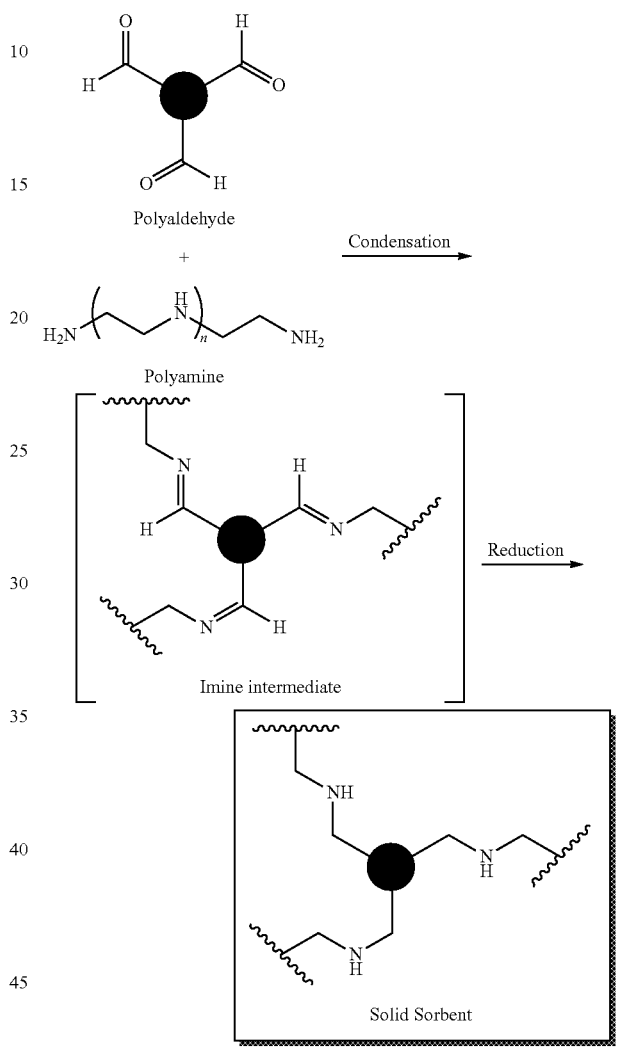

Scheme 1. General approach to forming cross-linked solid sorbent.

Non-limiting examples of the phosphorus based dendrimer core are:

Phosphorous Cores

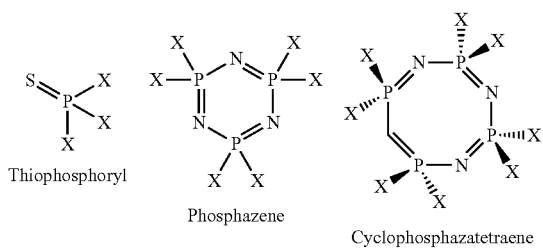

Thiophosphoryl

Phosphazene

Cyclophosphazatetraene

X = Cl, for preparation with nucleophiles
X = Incorporated Nuchleophile, for sorbent preparation -continued
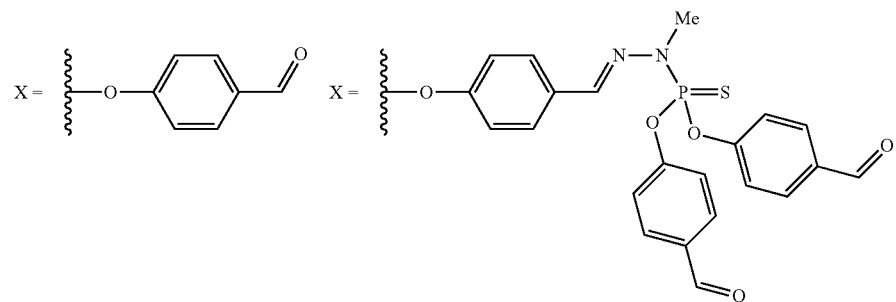
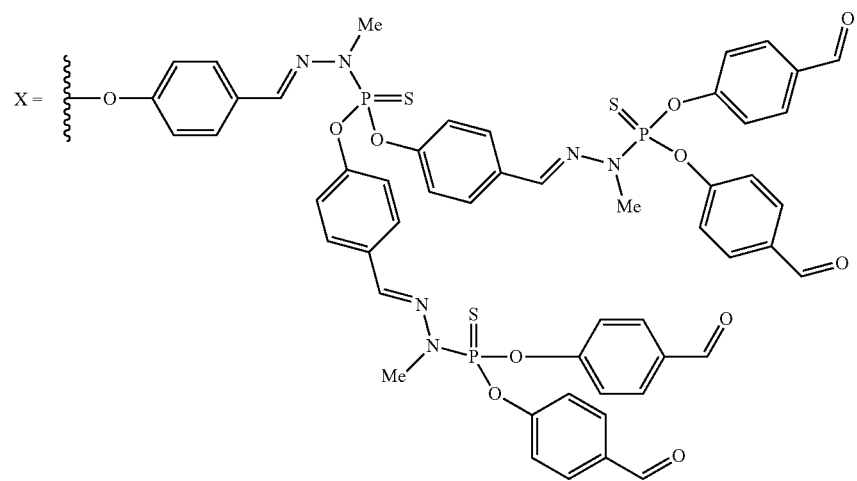
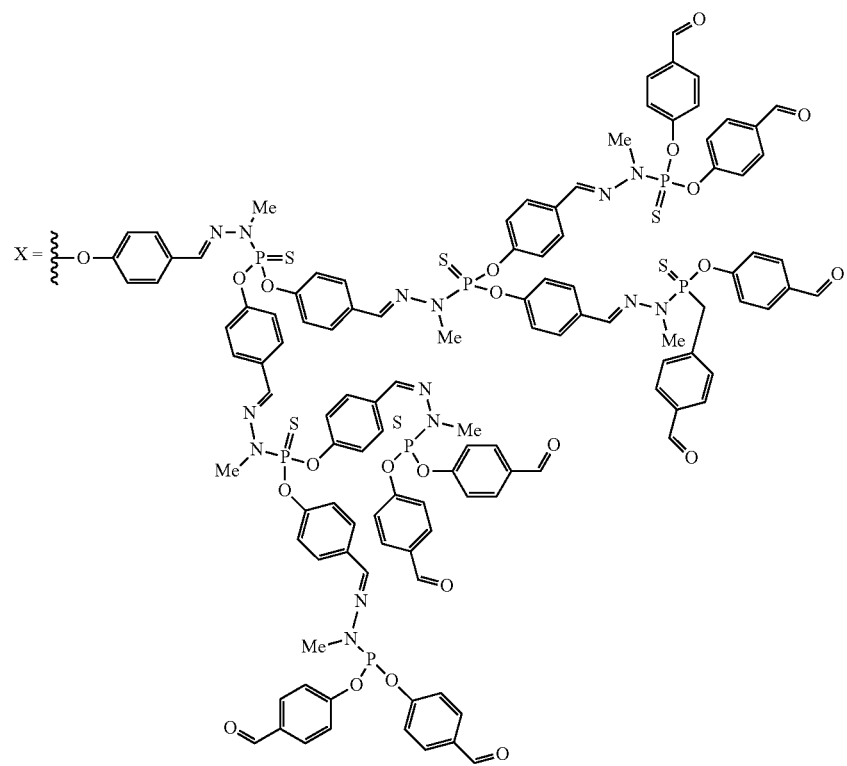

-continued

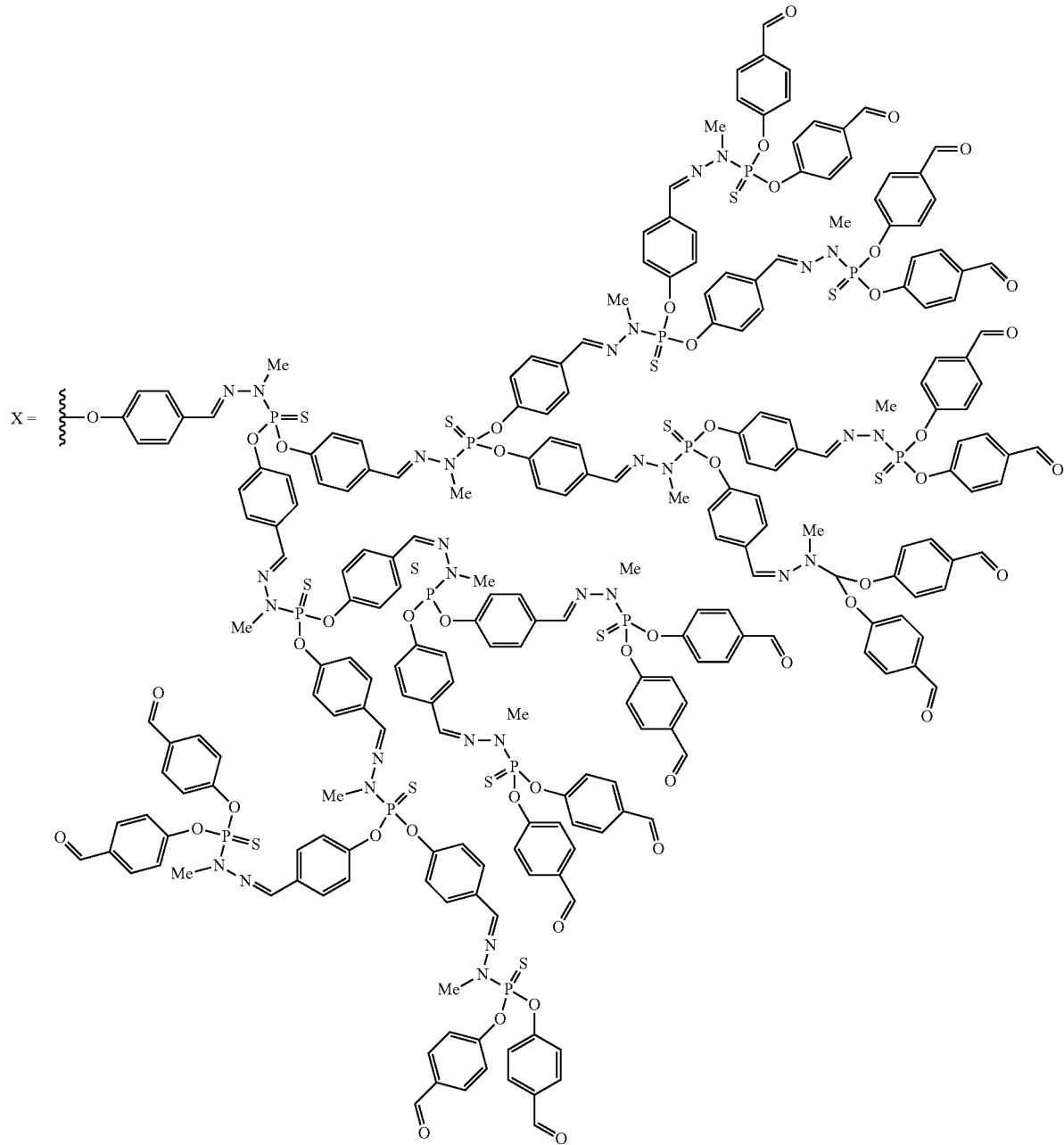

In an alternative embodiment, the thiophosphoryl, phosphazene or cyclophosphazatetraene core may be linked together with a spacer. Here, polyaldehyde P-dendrimers can also be linked together via organic spacers to increase the aldehyde count of the molecule. The spacer must have at least 2 nucleophilic sites (e.g. [1,1'-biphenyl]-4,4'-diol) that can react with the P-dendrimer cores via displacement of the chloride. This spacer serves two purposes: 1) it can increase the length of the P-dendrimer core to promote porosity in the final polymer structure and 2) it can be used to increase the number of reactive aldehyde sites in the structure without growing the generation of the P-dendrimer. The spacer could be reacted with other generations of the dendrimer or between different P-dendrimer cores (e.g. thiophosphoryl and phosphazene) to make unique polyaldehyde P-dendrimers.

In the example below shows how a linked P-dendrimer core may be prepared

Example
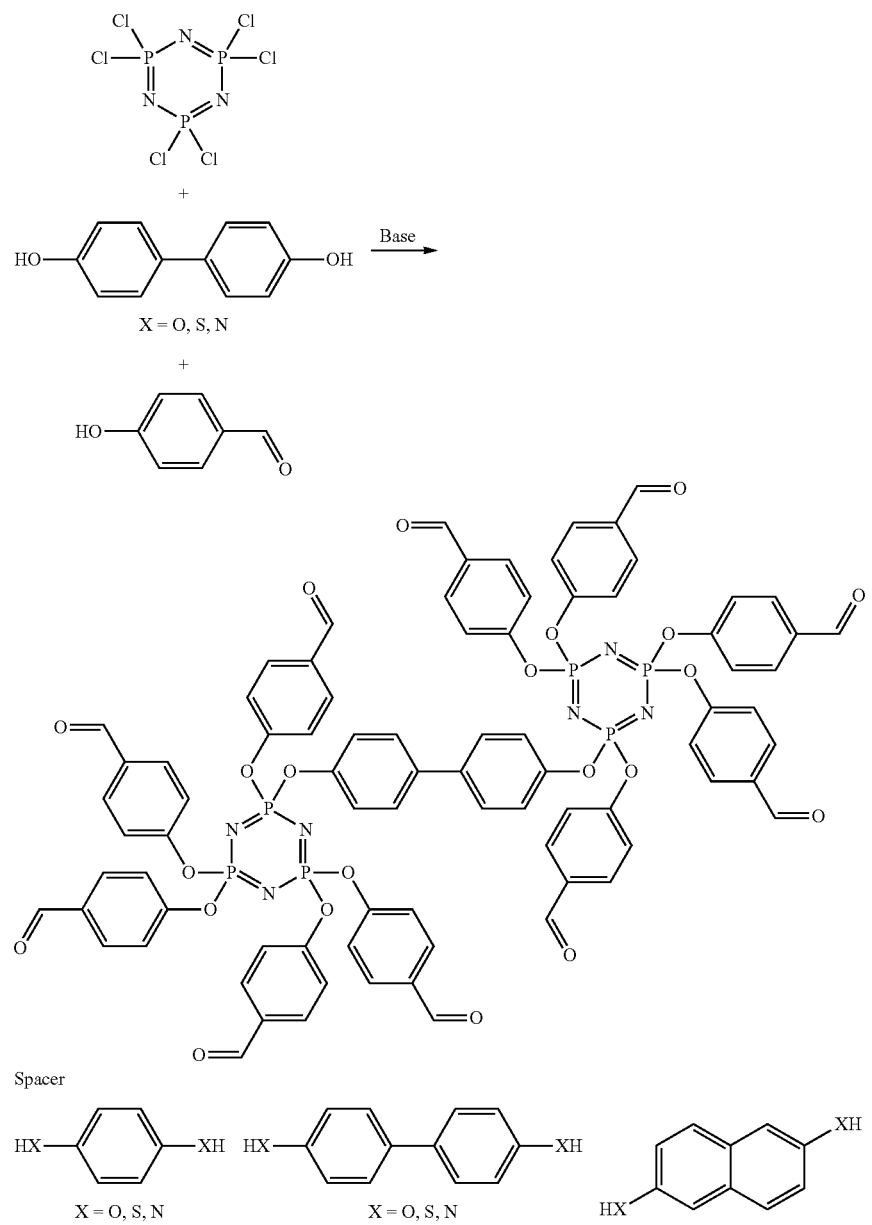
Spacer
Non-limiting examples of the starting materials for the polyfunctional aromatic linker are:
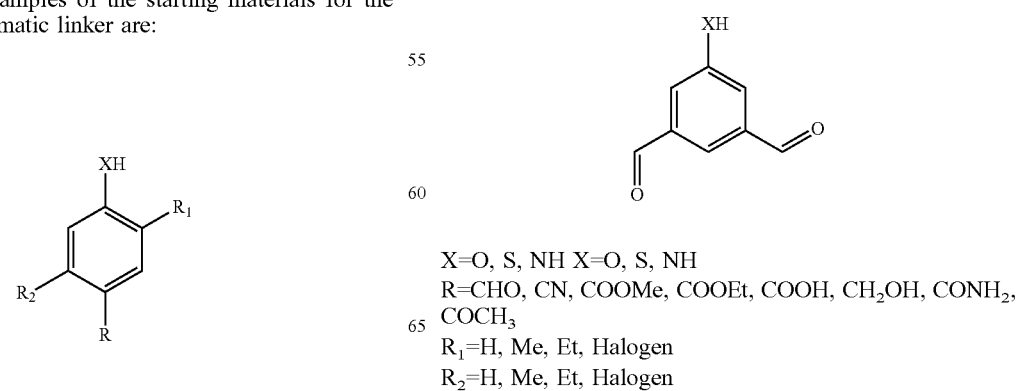
X=O, S, NH  X=O, S, NH
R=CHO, CN, COOMe, COOEt, COOH, $CH_2OH$, $CONH_2$, $COCH_3$
$R_1$=H, Me, Et, Halogen
$R_2$=H, Me, Et, Halogen Non-limiting examples of polyamines are:

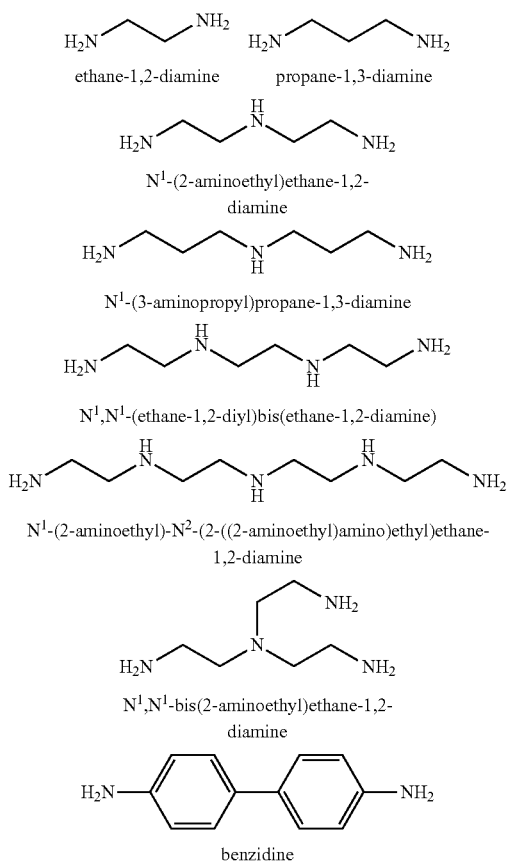

Non-limiting examples of polyethyleneimines are:

| Polyethyleneimines (PEI) - branched | Molecular weight (Mw) |
|---|---|
| | 600 |
| | 800 |
| | 1200 |
| | 1800 |
| | 10,000 |
| | 25,000 (linear) |
| | 70,000 |

Various polyamine (≥2 primary amines) could be reacted with polyaldehyde P-dendrimer compounds to form solid sorbents for $CO_2$ capture. Compounds from 2 amines to >50 amines were found to form solids when reacted with polyaldehyde P-dendrimer compounds via the reductive amination pathway. These solids all exhibited similar physical properties (insoluble in organic and aqueous media) and they could achieve $CO_2$ capacities ranging from 0.5 wt. % to 13.1 wt. % under simulated flue gas conditions at various temperatures (e.g. 65° C.).

Non-limiting examples of composite materials are described below.

Surface: Composite materials were made using different carbon sheets with or without micro-porous layers. For each of these surfaces, the Hexakis(4-formylphenoxy)cyclo(triphosphazene)-PEI Complex and Kynar UltraFlex®B Resin were used. Commercially available carbon sheets comprising micro-porous layers used in this study are: Sigracet 10BC, 24BC, 25BC, 34BC, 10BA, and 24BA. Glass and metal surfaces (stainless steel) could also be coated.

Dendrimer: Using the Sigracet 24BC surface layer and Kynar UltraFlex®B Resin, the Hexakis(4-formylphenoxy)cyclo(triphosphazene)-Tetraethylenediamine Complex was used.

Resin: Using the Sigracet 24BC surface layer and Hexakis (4-formylphenoxy)cyclo(triphosphazene)-PEI Complex, various resins were analyzed. The resins tested were: Methocel and Kynar Flex® 2801.

These sorbents were characterized via Fourier Transformed Infrared (FTIR) spectroscopy to confirm the successful reaction between the aldehyde and amine components via the reductive amination process. The organic content of the sorbent was determined through C/H/N Elemental Analysis (EA) and the thermal stability was determined with Thermogravimetric Analysis (TGA). Surface area and pore size distribution characteristics were determined by $N_2$ isotherms. The $CO_2$ capacities of these sorbents were analyzed via Thermogravimetric Analysis under pure $CO_2$ gas streams and via Packed Bed Reactor (PBR) simulated flue gas conditions. The sorbents were analyzed over multiple runs for stability measurements and at various temperatures for kinetic adsorption measurements.

The invention provides polyamine P-dendrimer and composite materials $CO_2$ adsorbents that are stable through many cycles of regeneration. These adsorbents are well-suited for $CO_2$ sequestration in industrial settings such as power plants or chemical refineries. The adsorbents are also well-suited for removing $CO_2$ from ambient air, whether outdoors or a confined setting such as buildings, planes, automobiles, submarines, space craft. Examples of possible configurations for the adsorbents described herein may be found in U.S. Pat. Publication US 2010/0263534 (Chuang, Univ. of Akron) or U.S. Pat. No. 8,500,854 (Pennline et al., US Dept. of Energy), the contents of which are hereby incorporated in their entireties.

5.1. Definitions

While the following terms are believed to be well understood by one of ordinary skill in the art, the following definitions are set forth to facilitate explanation of the presently disclosed subject matter.

Throughout the present specification, the terms "about" and/or "approximately" may be used in conjunction with numerical values and/or ranges. The term "about" is understood to mean those values near to a recited value. For example, "about 40 [units]" may mean within ±25% of 40 (e.g., from 30 to 50), within ±20%, ±15%, ±10%, ±9%, ±8%, ±7%, ±6%, ±5%, ±4%, ±3%, ±2%, ±1%, less than ±1%, or any other value or range of values therein or there below. Furthermore, the phrases "less than about [a value]" or "greater than about [a value]" should be understood in view of the definition of the term "about" provided herein. The terms "about" and "approximately" may be used interchangeably.

"Alkyl" refers to a saturated, branched or straight-chain monovalent hydrocarbon group derived by the removal of one hydrogen atom from a single carbon atom of a parent alkane. Typical alkyl groups include, but are not limited to, methyl, ethyl, propyls such as propan-1-yl, propan-2-yl, and cyclopropan-1-yl, butyls such as butan-1-yl, butan-2-yl, 2-methyl-propan-1-yl, 2-methyl-propan-2-yl, cyclobutan-1-yl, tert-butyl, and the like. The alkyl group may be substituted or unsubstituted; for example, with one or more halogens, e.g., trifluoromethyl. In certain embodiments, an alkyl group comprises from 1 to 20 carbon atoms. Alternatively, an alkyl group may comprise from 1 to 8 carbon atoms.

"Aryl" refers to a monovalent aromatic hydrocarbon group derived by the removal of one hydrogen atom from a single carbon atom of a parent aromatic ring system. Aryl encompasses 5- and 6-membered carbocyclic aromatic rings, for example, benzene or cyclopentadiene; bicyclic ring systems wherein at least one ring is carbocyclic and aromatic, for example, naphthalene, indane; or two aromatic ring systems, for example benzyl phenyl, biphenyl, diphenylethane, diphenylmethane. The aryl group may be substituted or unsubstituted, for example with a halogen.

"Halogen" refers to a fluoro, chloro, bromo, or iodo group.

The term "solid support" means materials with a hydrophilic macroporous material, of either polymer or inorganic nature, may be used in the present. The solid support may be an acrylamide derivative, agarose, carbon, cellulose, chitin, chitosan, dextran, glass, magnetite, polyacrylate, polyacrylamide, polystyrene, polyvinyl alcohol, silica, silicon, zirconia, alumina and combinations thereof. The solid support material may be in the form of porous beads, which may be spherical. Alternatively, the support may be particulate or divided form having other regular or irregular shapes. Other examples of suitable solid support materials include membranes, semi-permeable membranes, capillaries, microarrays, monoliths, multiple-well plates comprised of alumina, alumina supported polymers, or polysaccharides. Solid supports of the present invention may be rigid or non-rigid flexible materials, such as a fabric which may be woven or non-woven. Suitable non-rigid flexible materials might be membranes (cast, non-woven, or micro- or nano-fibers produced with different techniques known in the art).

Throughout the present specification, numerical ranges are provided for certain quantities. It is to be understood that these ranges comprise all subranges therein. Thus, the range "from 50 to 80" includes all possible ranges therein (e.g., 51-79, 52-78, 53-77, 54-76, 55-75, 60-70, etc.). Furthermore, all values within a given range may be an endpoint for the range encompassed thereby (e.g., the range 50-80 includes the ranges with endpoints such as 55-80, 50-75, etc.).

As used herein, the verb "comprise" as is used in this description and in the claims and its conjugations are used in its non-limiting sense to mean that items following the word are included, but items not specifically mentioned are not excluded.

Throughout the specification the word "comprising," or variations such as "comprises" or "comprising," will be understood to imply the inclusion of a stated element, integer or step, or group of elements, integers or steps, but not the exclusion of any other element, integer or step, or group of elements, integers or steps. The present disclosure may suitably "comprise", "consist of", or "consist essentially of", the steps, elements, and/or reagents described in the claims.

It is further noted that the claims may be drafted to exclude any optional element. As such, this statement is intended to serve as antecedent basis for use of such exclusive terminology as "solely", "only" and the like in connection with the recitation of claim elements, or the use of a "negative" limitation.

Unless defined otherwise, all technical and scientific terms used herein have the same meanings as commonly understood by one of ordinary skill in the art to which this disclosure belongs. Preferred methods, devices, and materials are described, although any methods and materials similar or equivalent to those described herein can be used in the practice or testing of the present disclosure. All references cited herein are incorporated by reference in their entirety.

The following examples further illustrate the disclosure and are not intended to limit the scope. In particular, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

6. EXAMPLES

6.1. P-Dendrimer/Low Molecular Weight Polyamine Sorbents

All solvents and reagents were reagent grade and used as received. Thin layer chromatography (TLC) analysis was run on silica gel plates purchased from EMD Chemical (silica gel 60, F254). $^1$H NMR and $^{31}$P NMR spectra were recorded on a Bruker Avance (300 MHz for $^1$H, 121 MHz for $^{31}$P). Chemical shifts are reported as parts per million (ppm) using residual solvent signals as internal standard (CHCl$_3$, δ=7.26 ppm for $^1$H NMR). Data for $^1$H NMR were presented as follows: chemical shifts (δ, ppm), multiplicity (s=singlet, d=doublet, t=triplet, dd=doublet of doublets, m=multiplet), coupling constant (Hz), and integration. The chemical shifts of peaks found were reported for $^{31}$P NMR spectra. Fourier transformed infrared spectra were obtained on a PerkinElmer Spectrum 100FT-IR spectrometer on neat samples (ATR FT-IR). Scanning electronic microscopy (SEM) images were obtained using an FEI Quanta 200 variable pressure scanning electron microscope. Thermal stability measurements were conducted on a Mettler Toledo thermogravimetric analyzer (TGA) using a 5° C./min step to 1000° C. under an air atmosphere. Nitrogen sorption isotherms at 77 K were obtained with a Micromeritics ASAP 2020 apparatus. Prior to measurement, the samples were degassed for 6 h at 120° C. The surface area was determined assuming a surface coverage of the nitrogen molecule estimated at 13.5 Å. Carbon dioxide sorption isotherms were obtained at 0° C. Elemental Analysis was conducted on an Elemental Analyzer Flash 2000 C/H/N/S instrument.

6.1.1. Preparation of Cross-Linked Sorbents.

Synthesis of hexa(4-formylphenoxy)cyclotriphosphazene (HAPCP)—1-$G_0$

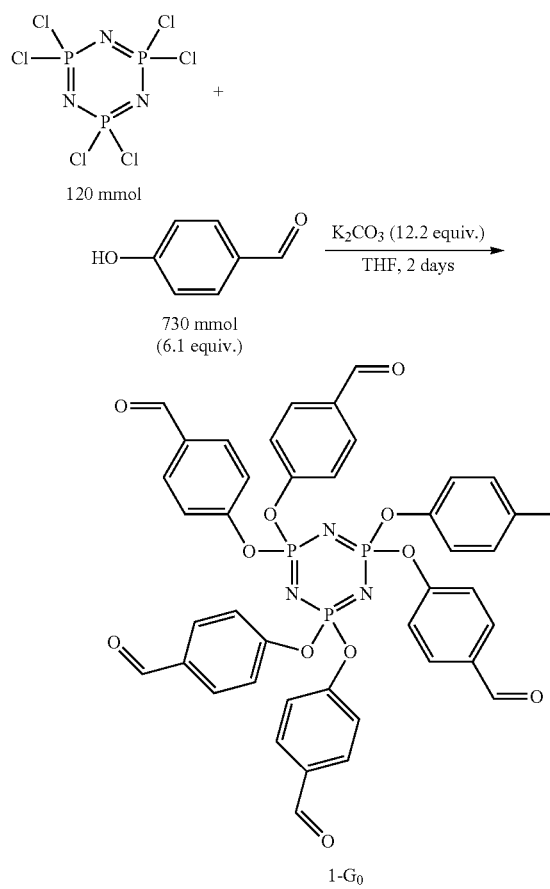

1-$G_0$

Synthesis of Generation 1 of HAPCP—1-$G_1$

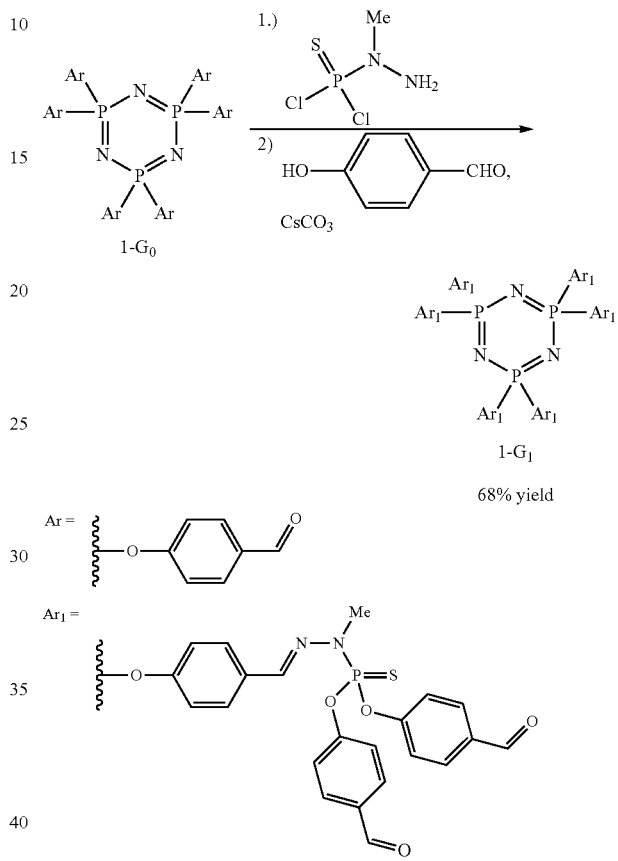

Procedure adapted from literature (C. Wang et al., *RSC Adv* 2015, 5, 88382) and prepared as follows: To a dry 2 L 3-neck round bottomed flask was added potassium carbonate (202 g, 1.5 mol, 12.2 equiv.) and 4-hydroxybenzaldehyde (89.4 g, 0.73 mol, 6.1 equiv.). The solids were dissolved in HPLC grade tetrahydrofuran (1.3 L, 0.1 M) and heated to reflux via a heating mantle for 4 hours under a nitrogen atmosphere with stirring conditions. Afterwards the flask was removed from the heat and while warm, hexachlorophosphazene (42 g, 0.12 mol, 1 equiv.) was added portion wise over 10 minutes and the mixture was left to stir under nitrogen for 48 hours. The solvent was then removed under rotary evaporation and the remaining solids were dissolved with 200 mL of chloroform and 300 mL of an aqueous 3 N NaOH solution. The organic layer was separated, and the aqueous layer was extracted 3× with chloroform (100 mL). The combined organic layers were concentrated under rotary evaporation to form a yellow solid. The solid was dissolved with 500 mL of hot ethyl acetate and left to recrystallize overnight. The product was isolated via vacuum filtration, washing with 100 mL of ethyl acetate, to yield white crystals of hexa(4-formylphenoxy)cyclotriphosphazene 1-$G_0$ (90.5 g, 105 mmol, 88% yield). $^1$H NMR (300 MHz, CDCl$_3$) δ 9.94 (s, 6H), 7.74 (d, J=9.0 Hz, 12H), 7.14 (t, J=9.0 Hz, 12H). $^{31}$P NMR (121 MHz, CDCl$_3$) δ 7.07 (s). Anal. Found: C, 57.78; H, 3.41; N, 4.98. C$_{42}$H$_{30}$N$_3$O$_{12}$P$_3$ Calc.: C, 58.55; H, 3.51; N, 4.88%.

Synthesis of Generation 1 of HAPCP—1-$G_1$

Procedure adapted from literature (N. Launay et al., *J. Organometal. Chem.* 1997, 529, 51) and prepared as follows: To a dry round bottomed flask was added 1-$G_0$ (7.76 g, 9.0 mmol, 1 equiv.) and chloroform (90 mL, 0.1 M). The mixture was cooled to 0° C. under a nitrogen atmosphere and while stirring, dichlorophosphonomethylhydrazide (M. L. Lartigue, et al., *Bull Soc Chim Fr* 1997, 134, 981) (10.47 g, 58.5 mmol, 6.5 equiv.) was added dropwise. The reaction was allowed to stir overnight and warm to room temperature. After judging the reaction complete via TLC analysis, the solvent was removed under rotary evaporation to afford a thick white oil. The condensed hydrazine complex was obtained as an off-white solid (~16 g) after precipitation in hexanes and vacuum filtration, while washing with hexanes. The intermediate compound was added to a dry round bottomed flask with 4-hydroxybenzaldehyde (15.4 g, 126 mmol, 14 equiv.) and the solids were dissolved in tetrahydrofuran (450 mL, 0.02 M). To the stirring mixture was added anhydrous cesium carbonate (82.2 g, 252 mmol, 28 equiv.) and the reaction was left to stir overnight. After judging the reaction complete via TLC analysis, the solvent was removed under rotary evaporation and the remaining solids were dissolved with 100 mL of chloroform and 100 mL of an aqueous 1 N NaOH solution. The organic layer was separated, and the aqueous layer was extracted 3× with chloroform (50 mL). The combined organic layers were concentrated under rotary evaporation to give 1-$G_1$ (17.55 g, 6.1 mmol, 68% yield) as a white solid. $^1$H NMR (300 MHz, CDCl$_3$) δ 9.87 (s, 12H), 7.80 (d, J=8.5 Hz, 24H), 7.67-7.52 (m, 12H), 7.32 (d, J=7.6 Hz, 24H), 7.01 (d, J=8.5 Hz, 12H), 3.32 (d, J=10.5 Hz, 18H). $^{31}$P NMR (121 MHz, CDCl$_3$) δ 60.43 (s), 7.97 (s). Anal. Found: C, 53.23; H, 3.71; N, 7.37; S, 6.60. $C_{132}H_{108}N_{15}O_{30}P_9S_6$ Calc.: C, 55.52; H, 3.81; N, 7.36; S, 6.74%.

Synthesis of Generation 2 of HAPCP—1-$G_2$

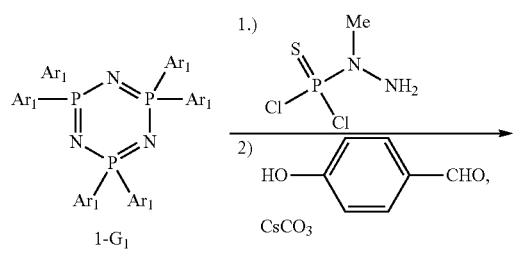

Procedure followed the synthesis pathway for 1-$G_1$ using the modified conditions: for condensation step was used 1-$G_1$ (4.5 g, 1.6 mmol, 1 equiv.), chloroform (30 mL, 0.05 M), and dichlorophosphonomethylhydrazide (3.7 g, 20.7 mmol, 13 equiv.); for the addition step was used 4-hydroxybenzaldehyde (4.87 g, 40 mmol, 26 equiv.), tetrahydrofuran (250 mL, 0.006 M), and anhydrous cesium carbonate (26.1 g, 80 mmol, 52 equiv.). The desired compound 1-$G_2$ (9.26 g, 1.35 mmol, 85% yield) was obtained as a white powder. $^1$H NMR (300 MHz, CDCl$_3$) δ 9.88 (s, 24H), 7.80 (d, J=5.9 Hz, 48H), 7.58 (m, 54H), 7.28 (m, 48H), 7.17 (d, J=8.1 Hz, 24H), 6.93 (m, 12H), 3.49-3.26 (m, 54H). $^{31}$P NMR (121 MHz, CDCl$_3$) δ 62.32 (s), 60.28 (s), 8.20 (s). Anal. Found: C, 50.73; H, 3.66; N, 7.59; S, 7.83. $C_{312}H_{264}N_{39}O_{66}P_{21}S_{18}$ Calc.: C, 54.76; H, 3.89; N, 7.98; S, 8.43%.

Synthesis of
o,o,o-tris(4-formylphenyl)phosphorothioate
(TPPT)—2-$G_0$

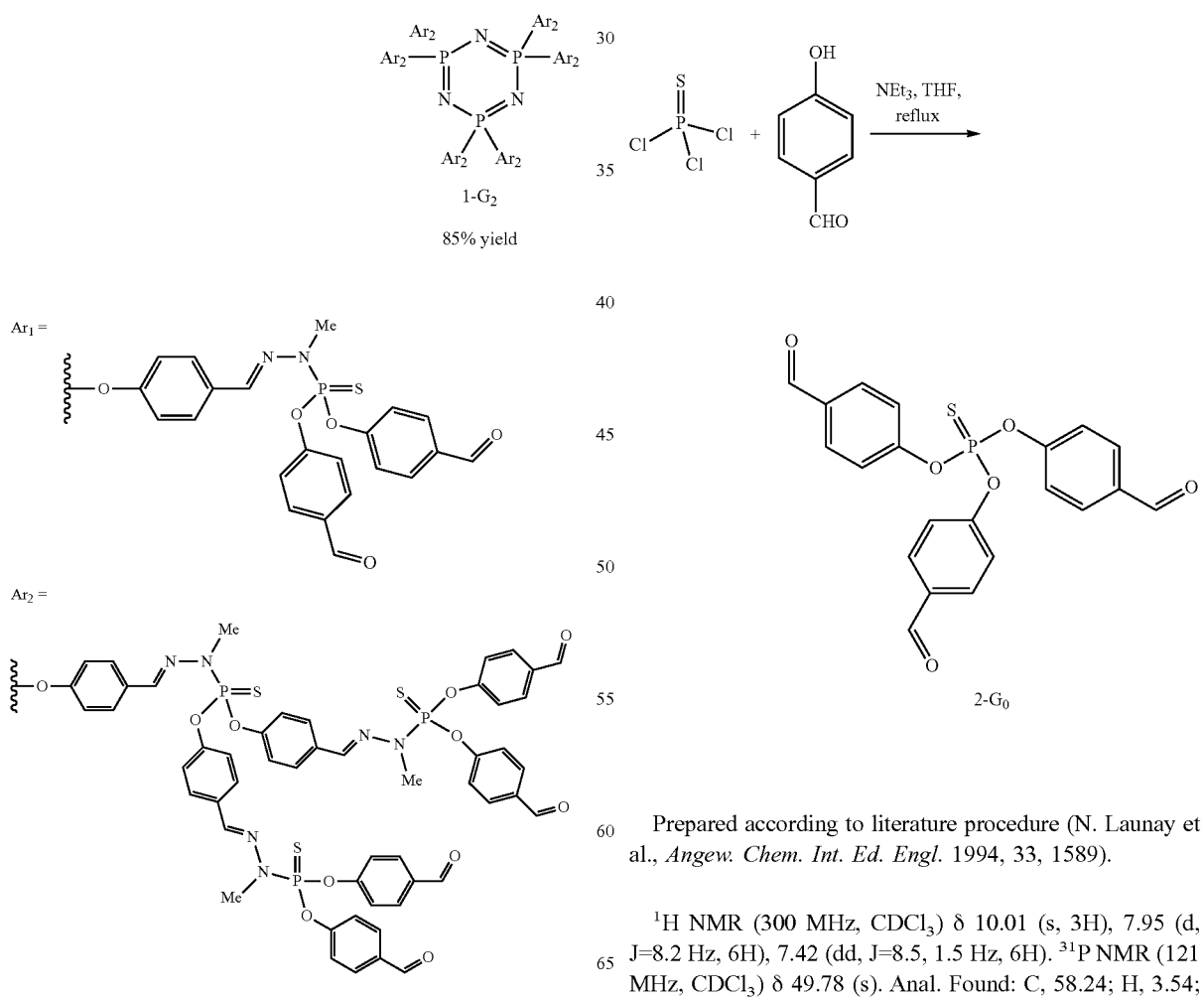

Prepared according to literature procedure (N. Launay et al., *Angew. Chem. Int. Ed. Engl.* 1994, 33, 1589).

$^1$H NMR (300 MHz, CDCl$_3$) δ 10.01 (s, 3H), 7.95 (d, J=8.2 Hz, 6H), 7.42 (dd, J=8.5, 1.5 Hz, 6H). $^{31}$P NMR (121 MHz, CDCl$_3$) δ 49.78 (s). Anal. Found: C, 58.24; H, 3.54; S, 7.30. $C_{21}H_{15}O_6PS$ Calc.: C, 59.16; H, 3.55; S, 8.7.52%.

Synthesis of Generation 1 of TPPT—2-$G_1$

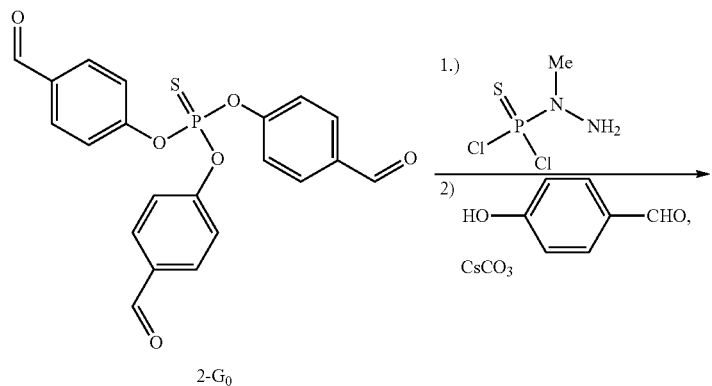

2-$G_0$

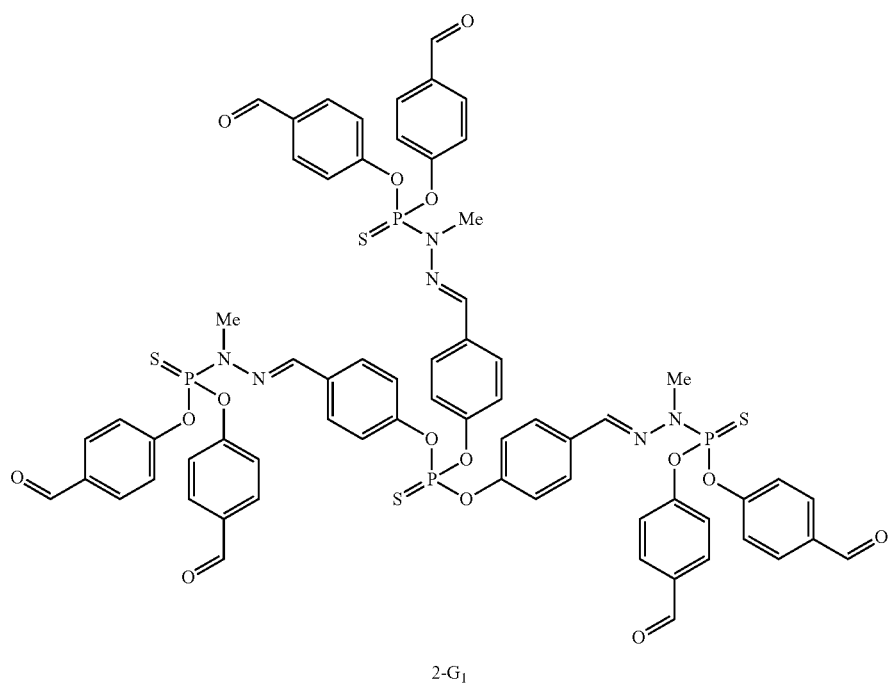

2-$G_1$

Prepared according to literature procedure (Launay 1994). $^1$H NMR (300 MHz, CDCl$_3$) δ 9.90 (s, 6H), 7.80 (d, J=9.0 Hz, 12H), 7.61 (m, 6H), 7.31 (d, J=7.5 Hz, 12H), 7.26 (m, 6H), 3.35 (dd, J=15.8, 9.2 Hz, 9H). $^{31}$P NMR (121 MHz, CDCl$_3$) δ 60.18 (s), 52.38 (s). Anal. Found: C, 54.08; H, 4.05; N, 7.86; S, 8.26. C$_{66}$H$_{54}$N$_6$O$_{15}$P$_4$S$_4$ Calc.: C, 55.70; H, 3.82; N, 5.90; S, 9.01.

Example preparation of a cross-linked sorbent with TEPA: The sorbent preparation was carried out in round-bottom flasks under air atmosphere with commercially available polyamines. The sorbent preparation for each P-dendrimer and polyamine was optimized. For example, the synthesis of a sorbent prepared from 1-G$_0$ and TEPA (termed 1-G$_0$-TEPA) proceeds as follows: To a 50 mL round bottom flask was added hexa(4-formylphenoxy)cyclotriphosphazene 1-G$_0$ (0.5 g, 0.58 mmol, 1 equiv.) and tetrahydrofuran (10 mL, 0.06 M). The flask was heated until all solids were dissolved and left to stir open to air. While warm, a solution of TEPA (0.55 g, 2.9 mmol, 5 equiv.) in 3 mL tetrahydrofuran was added rapidly (under 5 s) to the above stirring mixture. In under 10 s, a white solid formed and was allowed to stir (or sit if the stir bar was frozen) for 1 hour. Then, the solids were isolated via vacuum filtration, washed with tetrahydrofuran (50 mL), crushed with a mortar and pestle, and placed in a new 100 mL round bottomed flask. The solids were suspended in 40 mL of tetrahydrofuran and 20 mL of methanol while stirring open to air. To this mixture was added anhydrous sodium borohydride (430 mg, 12 mmol, 20 equiv.) at room temperature and the reaction was left to stir for 14 hours under nitrogen. The mixture was then filtered under vacuum and the solid obtained was washed with 50 mL of distilled water, 50 mL of methanol, and 25 mL of diethyl ether. The washings produced a white powder that was further dried under reduced pressure, resulting in 470 mg of 1-G$_0$-TEPA as a white powder.

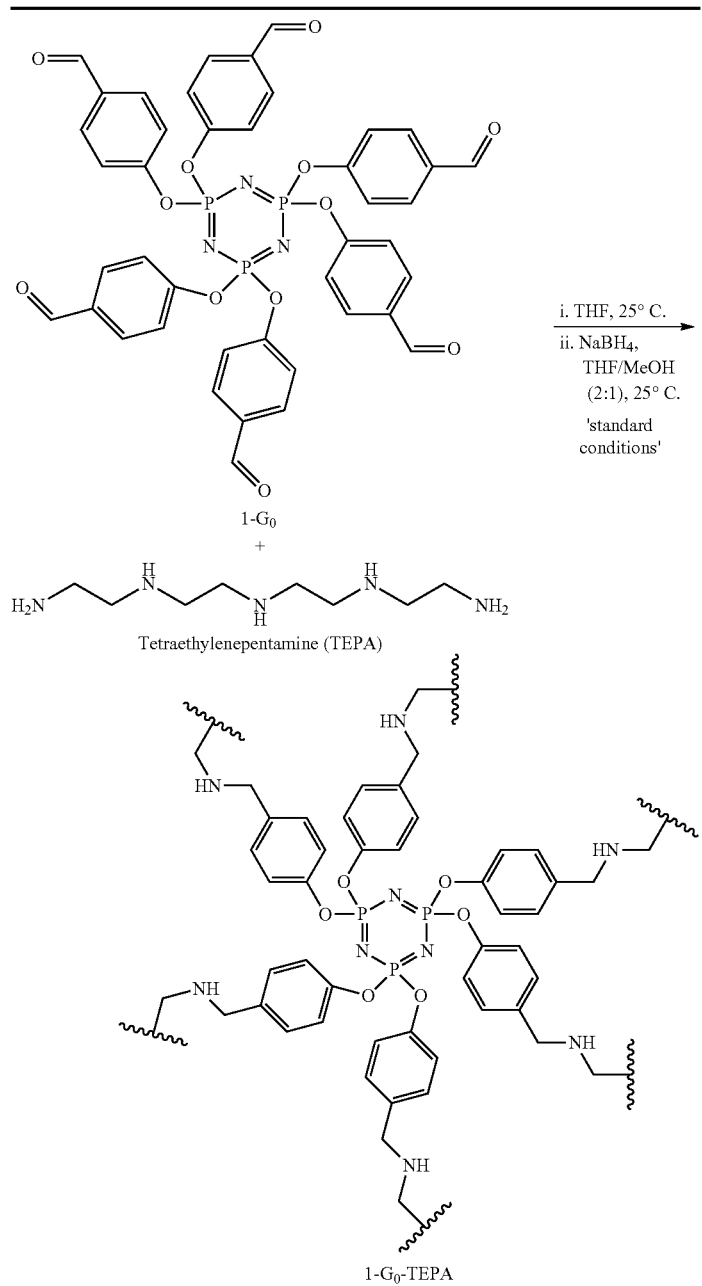
| Entry | Deviation from 'standard' conditions | 1-G$_0$-TEPA CO$_2$ Capacity (wt %)* |
|---|---|---|
| 1 | none | 6.9 |
| 2 | no NaBH$_4$ | 1.6 |
| 3 | Toluene instead of THF | 3.2 |
| 4 | Dioxane instead of THF | 0 |
| 5 | CHCl$_3$ instead of THF | 0 |
| 6 | MeOH instead of THF | 0 |
| 7 | add 2 drops H$_2$SO$_4$ | 5.4 |
| 8 | 0° C. instead of 25° C. | 4.2 |
| 9 | 40° C. instead of 25° C. | 3.5 |
| 10 | step 1 at 2x dilution with THF | 1.2 |
| 11 | step 1 at 0.5x dilution with THF | 4.6 |
| 12 | slow addition of TEPA | 3.2 |
*Adsorption over 50 minutes

6.1.2. Adsorption from Pure $CO_2$ Gas.

All $CO_2$ capture analyses from pure $CO_2$ gas streams were conducted with a thermogravimetric analyzer (TGA) from Mettler Toledo. The capacity of the sorbent was determined by the weight change of the sorbent after switching the carrier gas from a pure helium stream to a pure $CO_2$ stream. In a typical experiment: a solid sorbent (5-30 mg) is placed on a pre-weighed platinum pan which is lowered into the TGA reactor. Under a helium atmosphere with a flow rate of 60 mL/min, the sample was heated to 120° C. for 10 minutes, at which point no more weight loss was observed. The reactor temperature was adjusted to 65° C. and then pure $CO_2$ was introduced at a flow rate of 60 mL/min for 50 minutes. For multiple cycles, the sample would be reheated to 120° C. for 10 minutes to desorb $CO_2$ and the remaining procedure would be followed as described for as many cycles as was desired.

6.1.3. Adsorption from 15 Vol % $CO_2$ from Simulated Flue Gas.

The $CO_2$ capture analyses were performed on a packed-bed reactor (PBR) system designed and constructed by RTI International (RTI, North Carolina, USA) (FIG. 1). The use of this packed-bed reactor system has previously been reported for simulating flue gas conditions, specifically of flue gas derived from a coal fired power plant (SCF) (see D. V. Quang et al., *Powder Technol.* 2016, 301, 449-462). The feed gas composition was adjusted by changing the flow rate of individual gases controlled by mass flow controllers. Water vapor was introduced to the gas stream by flowing the mixture of air and $N_2$ to the temperature controlled humidifier (A) to the preset moisture content. The $CO_2$ stream combined with the $N_2$/Air/$H_2O$ mixed gas at the outlet of the humidifier to avoid the $CO_2$ from dissolving in the water in the humidifier, which would result in an increased acidity of the water and inaccurate $CO_2$ content in the simulated flue gas stream. The effluent of the PBR (B) entered a condenser (C) and water collector (D) to remove water vapor prior to entering the $CO_2$ analyzer. The $CO_2$ concentration in the PBR effluent was analyzed using a Horiba $CO_2$ analyzer (VA-3000). The PBR was operated autonomously by National Instruments Lookout program coupled with customized PLC control developed by RTI's engineers.

In a typical experiment, approximately 1.5 g of adsorbent was mixed with silicon carbide beads, a filler and heat transfer material, then loaded into the PBR, which was made of a stainless steel column (1.27 cm inner diameter and 20 cm length). The test undergoes 5 stages: 1) feed test, 2) purge, 3) adsorption, 4) regeneration, and 5) cooling. The feed test stage allows the system to adjust the temperature of the process lines, humidifier, and reactor to defined values for the adsorption stage and to analyze and adjust the feed gas composition at the same flow rate being used in the adsorption stage. The feed gas was tailored to simulated flue gas conditions of flue gas from a coal fired power plant (SCF). The SCF flue gas has following composition: $CO_2$=15 vol %, $O_2$=4.5 vol %, and water=5.65 vol % in balance with $N_2$. When the $CO_2$ concentration in the feed gas is stable, the system will enter the purge stage by flowing $N_2$ through the system until no $CO_2$ is detected in the outlet gas of the reactor. The adsorption stage is initiated by switching a valve to allow $CO_2$-laden feed gas to enter the reactor with a flow rate of 150 mL/min. The end of the adsorption process was determined by the breakthrough point for $CO_2$ which occurs when $CO_2$ concentration in outlet gas reached 99.95% of that in the feed gas. The end of the adsorption stage may also be determined by the minimum and maximum adsorption times, which was defined as 30 and 35 min. The regeneration stage follows the adsorption and is carried out by flowing humidified $N_2$ through the reactor at the flow rate of 150 mL/min at a desired temperature. The regeneration end point was determined by the minimum or maximum desorption times of 20 and 25 min, respectively. The cooling of the system is performed by flowing $N_2$ at the flow rate of 350 mL/min to reduce reactor temperature to either the temperature of the adsorption stage or to room temperature (if the tests are complete). The $CO_2$ loading (wt. %) was calculated from regeneration data by dividing the total amount of $CO_2$ desorbed by the mass of the adsorbent and multiplying with 100. The $CO_2$ loading is defined as the amount of $CO_2$, which desorbs at a specific regeneration condition and does not include $CO_2$ lean loading. Each test consisted of 25 adsorption-regeneration cycles and the $CO_2$ loading that is reported was taken as the average between all cycles.

6.1.4. Results and Discussion (P-Dendrimer/Polyamine Sorbents)

6.1.5. Sorbent Design and Synthesis

A priority in our sorbent design was to covalently tether amines to a solid network or support to prevent leaching when exposed to moisture present in flue gas. We believed that a compound with multiple electrophilic sites could react with a polyamine compound to covalently bind the amines as a cross-linked product. With this idea in mind, we became interested in electrophilic dendridic monomers because they can be designed to have an assortment of terminal reactive sites. Dendridic molecules have been successfully grafted onto solid supports with free amine functionalities to provide $CO_2$-capturing solid sorbents (see B. Fadhel et al., *Microporous Mesoporous Mater.* 2009, 123 (1), 140-149; P. Bollini et al., *J. Mater. Chem.* 2011, 21 (39), 15100-15120; X. Zhang et al., *Mater. Res. Bull.* 2014, 56, 12-18.). In 2013, two unsupported solid dendrimers, one with deposited Mg/Al ions on tethered hydroxyl groups and one with rigid triazene repeating units, were successful for capturing $CO_2$ but suffered from poor capacities and regeneration properties (Z. Azzouz et al., *Adsorption* 2013, 19 (5), 909-918; C.-H. Lee et al., *Chem.—Eur. J.* 2013, 19 (32), 10573-10579).

Figure 2:
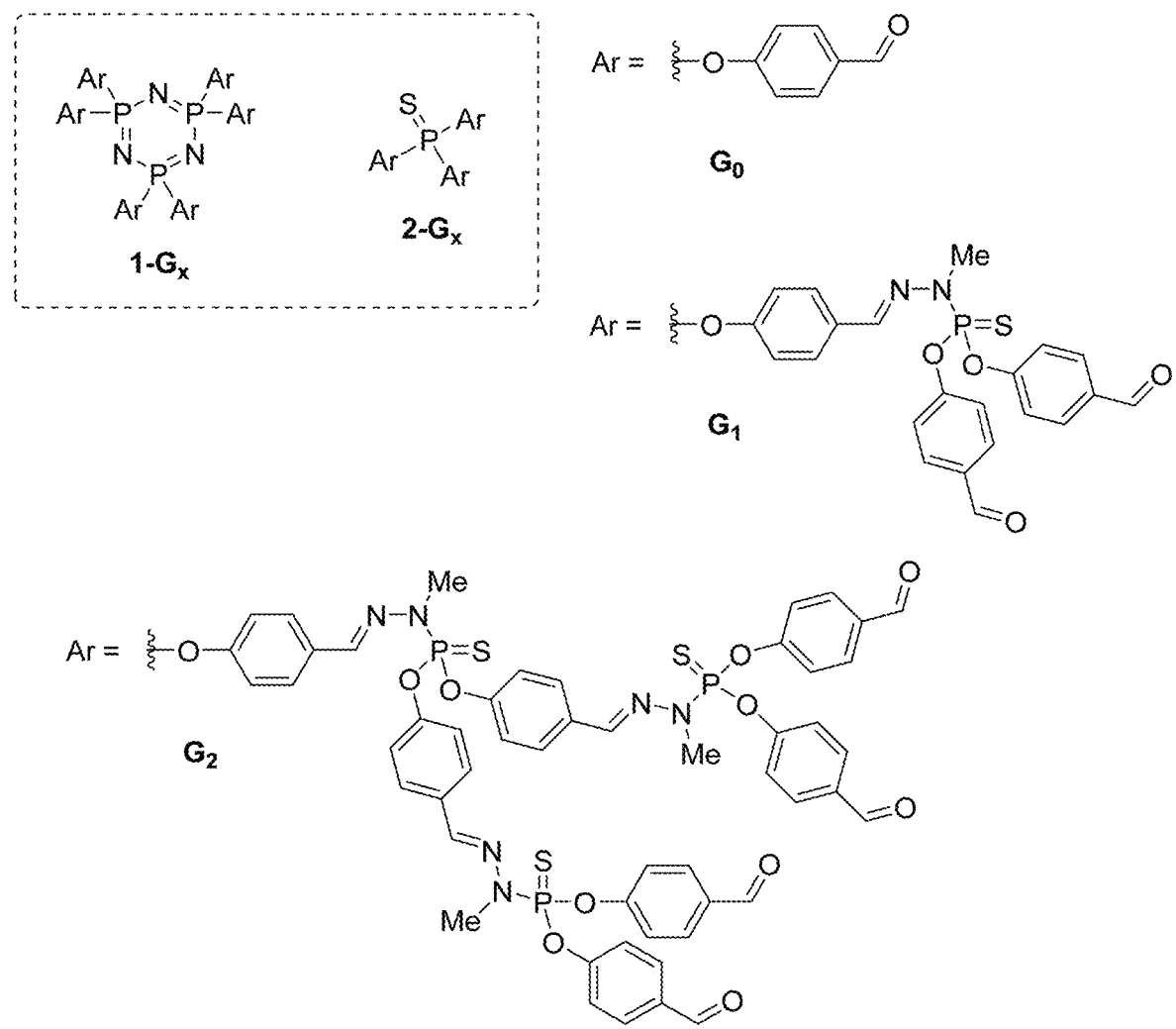

P-dendrimers are comprised of phosphorous atoms in the structural building blocks of the molecule and tend to make thermally robust materials (FIG. 2). There are only two reports, so far, using P-dendrimer materials for $CO_2$ capture. In 2016, Muhammed and coworkers reported a P-dendrimer with a melamine hemiaminal repeating unit that could achieve 18.9 wt % $CO_2$ at 25° C. under inert conditions (R. Muhammad et al., *RSC Adv.* 2016, 6 (21), 17100-17105). In the same year, Majoral, Caminade, and coworkers reported silica grafted P-dendrimers which attained low $CO_2$ capacities, that is less than 2 wt. %, when adsorbing at 30° C. (D. Riegert et al., *Eur. J. Inorg. Chem.* 2016, 2016 (19), 3103-3110). Neither report disclosed desorption kinetics with $CO_2$, extended stability analysis, or the capture of $CO_2$ under simulated flue gas conditions. As a continuation of our ongoing effort to develop a novel sorbent for $CO_2$ capture, we react terminal aldehyde containing P-dendrimers as cross-linking agents with polyamine compounds to directly form a solid sorbent. The P-dendrimer repeating unit would allow for multi-reactive sites to promote cross-linking, as well as helping to improve the thermal stability of the sorbent.

Our evaluation began with P-dendrimer hexakis(4-formylphenoxy)cyclo(triphosphazene) (1-$G_0$) for its ease of synthesis, scalability, and 6 reactive sites (see Wang 2015). Tetraethylenepentamine (TEPA) was used as the polyamine component. The installation and solidification of TEPA was accomplished through a 1-pot, 2-step reductive amination procedure (Scheme 2). Addition of TEPA to 1-$G_0$ instantaneously resulted in the formation of a white solid as a result of imine formation between the aldehydes and primary amines. The intermediate was separated, suspended in a mixture of THF/MeOH, and the imine bonds were reduced with sodium borohydride to yield sorbent 1-$G_0$-TEPA as a white powder in 91% yield. Infrared spectroscopic evidence showed the disappearance of the aldehyde CO=stretch at 1695 cm$^{-1}$ with a gain at 1645 cm$^{-1}$ for the imine C=N stretch, which upon reduction disappeared, supporting that the imine intermediates were successfully reduced in the solid state (FIG. 3).

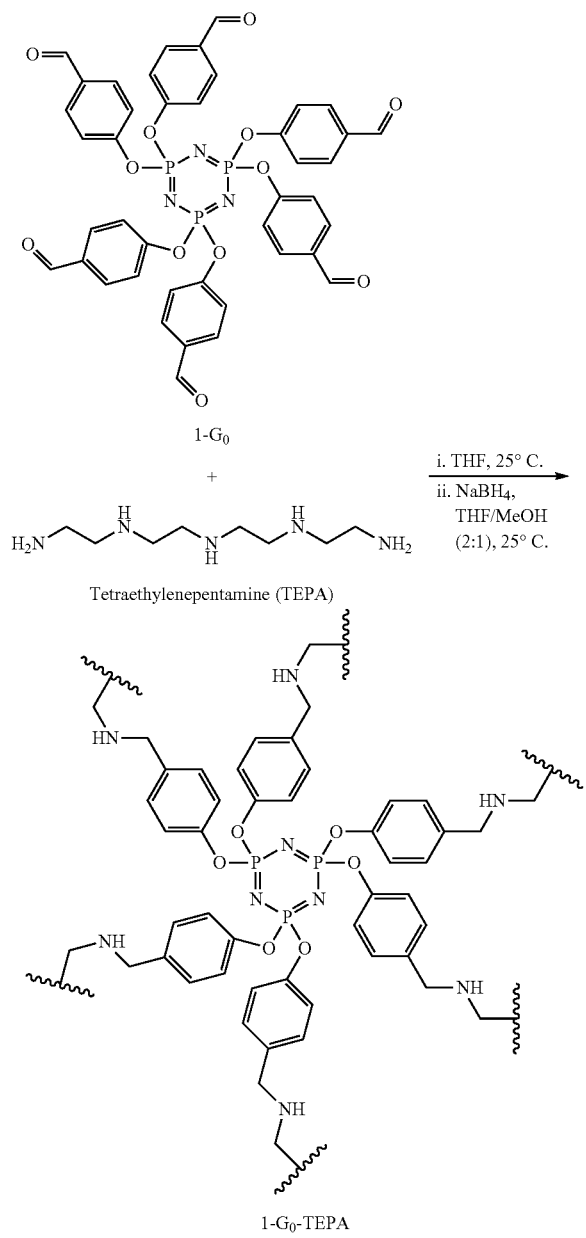

Scheme 2. Synthesis of 1-$G_0$-TEPA solid sorbent.

6.1.6. Temperature Effect on Adsorption Capacity

The $CO_2$ capacity of 1-$G_0$-TEPA sorbent was analyzed via thermogravimetric analysis (TGA) with an adsorption temperature of 65° C. at 1 atm of $CO_2$. 1-$G_0$-TEPA was found to adsorb 6.9 wt. % $CO_2$ over 50 minutes at 65° C. (FIG. 4). After 300 minutes of exposure to pure $CO_2$ stream, saturation of the sorbent was attained with 7.3 wt. % $CO_2$ adsorbed. The adsorption kinetics with $CO_2$ were fast, with 90% capacity achieved within the first 5 minutes of $CO_2$ exposure (FIG. 5a). Regeneration of sorbent proceed smoothly, with complete removal of $CO_2$ realized within the first 5 minutes of heating at 120° C. Impressively, this sorbent maintained full activity over 45 repeated cycles of adsorption and regeneration, with no degradation observed (FIG. 5b). The complete removal of adsorbed $CO_2$ in the regeneration cycle suggests that the amines react with $CO_2$ via carbamate intermediates, not through irreversible urea formation.

The temperature effect on the adsorption was then examined. The sorbent was found to adsorb 8.9 wt. %, 8.05 wt. %, and 6.07 wt. % $CO_2$ at 25° C., 45° C., and 85° C. respectively (FIG. 4). Breakthrough at 25° C. from 300 minutes of exposure attained a maximum capacity of 10.7 wt. % $CO_2$. The high capacity of 1-$G_0$ can be explained by the 14.9% nitrogen incorporation into the material. The kinetics for $CO_2$ capture were increased as the temperature was increased, as observed in FIG. 4. However, the adsorption capacity decreases with elevated temperatures due to the exothermic adsorption of $CO_2$ to amines.

6.1.7. Effect of P-Dendrimer on Sorbent Capacity

A parametric study was performed to improve on the $CO_2$ capacity, the number of reactive aldehyde functionalities was increased by step-wise increasing the size of the P-dendrimer to give larger, polymeric type compounds, with each step termed a generation. Two expanded P-dendrimers of the first (1-$G_1$) and second (1-$G_2$) generations were prepared, providing compounds with 12 and 24 terminal aldehydes respectively (FIG. 2). Those generations attained capacities at 65° C. of 4.0 wt. % for 1-$G_1$-TEPA and 2.1 wt. % for 1-$G_2$-TEPA (FIG. 6a). The sorbents made from 1-$G_1$ and 1-$G_2$ were stable over repeated cycle testing, with no decrease of $CO_2$ capacity observed over 10 cycles (FIG. 6b). Notably, as the P-dendrimer generation was increased, the overall $CO_2$ capacity was observed to decrease due probably to an intramolecular bonding interaction which prevents the amines from being available to react with $CO_2$.

P-dendrimer 2-$G_0$ and its first generation (2-$G_1$) were synthesized to examined the effect of the P-dendrimer precursor. These molecules have terminal aldehydes that are more localized in space than 1-$G_0$, which should affect the cross-linking reaction. The optimized $CO_2$ capacities for these sorbents were 1.2 wt. % and 1.7 wt. % $CO_2$ at 65° C., dramatically lower than 1-$G_0$ and 1-$G_1$ (FIG. 6a-6b). Both 1-$G_0$ and 2-$G_1$ have 6 terminal reactive sites, with 1-$G_0$ shaped like an hourglass and 2-$G_1$ pyramidal shaped (see B. R. Patil et al., *J. Mol. Struct.* 2011, 1003 (1-3), 52-61). The geometry of 2-$G_0$ potentially inhibits polymer growth by acting as an end-cap to oligomers, which is supported by lower 11.4% nitrogen content of 2-$G_1$-TEPA.

The structural morphology of these sorbents was examined from their $N_2$ adsorption-desorption isotherms (Table 1). Due to a non-ordered cross-linking polymerization, the sorbents have low surface areas of 12.7-19.5 m$^2$/g (measured by BET analysis). These materials appear to be microporous, possessing pore volumes on average of 5.0-6.9 mm$^3$/g and pore sizes between 11.3-17.1 Å. Notably, the nitrogen content of the material is similar between the best performing sorbents from each P-dendrimer generation. As the P-dendrimer generation was increased from 1-$G_0$ to 1-$G_2$, the surface areas and pore sizes decrease in the bulk material, highlighting that the amines are less to the $CO_2$ in the later for 1-$G_1$ and 1-$G_2$ in comparison with 1-$G_0$.

TABLE 1

Textural and physical analysis of 1-$G_x$-TEPA sorbents.

| Name | Pore diameter (Å)[a] | Pore volume $V_p$ [mm³/g][a] | Surface area, $S_{BET}$ [m²/g][a] | Nitrogen content [wt %][b] |
|---|---|---|---|---|
| 1-$G_0$-TEPA | 14.1 | 6.9 | 19.5 | 14.9 |
| 1-$G_1$-TEPA | 17.1 | 5.4 | 12.7 | 15.1 |
| 1-$G_2$-TEPA | 11.3 | 5.0 | 17.7 | 14.7 |

[a]Values determined from nitrogen adsorption-desportion isotherms.
[b]Values determined from CHN Analysis.

Scanning electron microscopy (SEM) was used to gain a textural analysis understanding of the polymer network and bulk molecule organization. SEM revealed that the molecules pack in both small and large aggregates (FIG. 7). No crystallinity or structural order was observed up to 2 µm. The aggregates appear to stack as flakes and no major textural difference was observed between the other prepared sorbents. The random and rapid polymerization with polyamines unsurprisingly forms a microporous and unordered material.

6.1.8. Effect of Amine Component on Sorbent Capacity

Sorbents could be prepared from other polyamine compounds as well, such as, diethylenetriamine (DETA) and ethylenediamine (EDA), each reacting with 1-$G_0$ to form solid sorbents. The capacities obtained were 1.4 wt. % and 2.6 wt. % $CO_2$ for 1-$G_0$-DETA and 1-$G_0$-EDA respectively over the course of 10 cycles (FIG. 8). A branched-amine derivative, tris(2-aminoethyl)amine (termed Triamine), underwent the polymerization to afford a sorbent with 1.4 wt. % $CO_2$ capacity. The capacity decrease for sorbents prepared from smaller amine compounds is a result of fewer amines present in the formed sorbent. In contrast to the cross-linked sorbents produced herein, previously reported silica-supported amine functionalized P-dendrimers had capacities of 1.2 wt. % $CO_2$ from pure gas streams (FIG. 8) (Riegert 2016). The increase in capacity and stability of the cross-linked P-dendrimer material highlights its potential for carbon capture.

6.1.9. Sorbent Physical Properties

In general, the solid sorbents prepared from P-dendrimers were stable, maintaining full $CO_2$ capacity over 10 cycles of the temperature swing measurements. The stability is largely attributed to the covalent linking of amine compounds via C—N bonds to the P-dendrimer from the reductive amination procedure. These sorbents were examined for thermal stability and the TGA curves show two weight loss events at 240° C. and 510° C. (FIG. 9). From 240-400° C., the carbon-carbon bonds begin fragmenting alongside the oxidation of the amines, and after 510° C. the organics begin burning off leaving behind the P-dendrimer core. The resistance of these materials to thermal decomposition is notable. The oxidative degradation of amine impregnated sorbents occurs above 150° C. (see X. Xu et al., *Energy Fuels* 2002, 16 (6), 1463-1469; M. B. Yue et al., *Adv. Funct. Mater.* 2006, 16 (13), 1717-1722). Only grafted amine sorbents, which have lower $CO_2$ capacities, have comparative thermal stabilities above 200° C. (N. Mittal et al., *Energy Sci. Eng.* 2015, 3 (3), 207-220; V. Zelenak et al., *Microporous Mesoporous Mater.* 2008, 116 (1-3), 358-364). The P-dendrimer sorbents are also insoluble in both organic and aqueous media, a trait common among cross-linked polymers. Moreover, the sorbents are stable to both strong acids and strong bases. Exposure of 1-$G_0$-TEPA to either a 12 N HCl or 50 wt % NaOH solution over the course of 3 months did not dissolve or degrade the sorbent.

6.1.10. Cyclic Adsorption/Desorption Testing on Under Simulated Flue Gas

After the cumulation of P-dendrimer sorbents screening, the highest performing sorbents, 1-$G_0$-TEPA and 1-$G_1$-TEPA, were selected for simulated flue gas $CO_2$ capture testing. Carbon capture from flue gas is particularly challenging due to: a) the low concentration of $CO_2$ in the gas stream (~15 vol %); b) the necessity for the selective adsorption of $CO_2$ over other molecules; c) stability requirement with oxygen and water; and d) an operating temperature range of 50-75° C. for adsorption and 100-120° C. for regeneration (see D. M. D'Alessandro et al., *Angew. Chem. Int. Ed.* 2010, 49 (35), 6058-6082). Using a packed-bed reactor (FIG. 1), 1-$G_0$-TEPA was exposed to a gas stream consisting of 14.77% $CO_2$, 5.65% $H_2O$, and 4.5% $O_2$ balanced by nitrogen at 65° C. and regeneration at 120° C. using 5.65% $H_2O$ balanced by nitrogen. The adsorption/desorption process was carried out over 25 cycles, with 1-$G_0$-TEPA maintaining an average capacity of 7.4 wt. % $CO_2$ (FIG. 10). The capacity was preserved over 25 cycles, highlighting the stability of this sorbent. However, 1-$G_1$-TEPA captured only 4.2 wt. % $CO_2$ over 25 cycles. Notably, both 1-$G_0$-TEPA and 1-$G_1$-TEPA reached higher capacities under the flue gas conditions than from the pure gas stream. The reaction between the sorbents' amines with $CO_2$ and water may result in both bicarbonate and carbamate formation as well as preventing urea formation, providing an increase in adsorption capacity. The trend of increasing capacity under humid conditions with amine-based sorbents has been previously observed (see D. Wang et al., *Ind. Eng. Chem. Res.* 2012, 51 (7), 3048-3057).

Example preparation of a cross-linked sorbent with PEI: To a 50 mL round bottom flask was added 600 MW branched PEI (2.78 g, 4.63 mmol, 2 equiv.) and tetrahydrofuran (20 mL, 0.12 M). The flask was heated until the solution was homogeneous. While warm, a solution of hexa(4-formylphenoxy)cyclotriphosphazene 1-$G_0$ (2.0 g, 2.32 mmol, 1 equiv.) in 5 mL tetrahydrofuran was added rapidly to the above stirring mixture. In under 10 s, a white solid formed and was allowed to stir for 1 hour. Then, the solids were isolated via vacuum filtration, washed with tetrahydrofuran (50 mL), crushed with a mortar and pestle, and placed in a new 250 mL round bottomed flask. The solids were suspended in 80 mL of tetrahydrofuran and 40 mL of methanol and anhydrous sodium borohydride (1.7 g, 46 mmol, 20 equiv.) was added at room temperature. The reaction was left to stir for 14 hours under nitrogen and then was then filtered under vacuum and the solid obtained was washed with 100 mL of distilled water, 100 mL of methanol, and 50 mL of diethyl ether. The washings produced a white powder that was further dried under reduced pressure, resulting in 4.22 g (90% yield) of 1-$G_0$/600PEI as a white powder.

Optimization Conditions for P-Dendrimer/PEI Sorbents 1-$G_x$+PEI (600 MW)

| P-Dendrimer | PEI MW | Amine Equivalence | TGA $CO_2$ Capacity (wt %) | # of Cycles |
|---|---|---|---|---|
| 1-$G_0$ | 600 | 1 | 7.8 | 10 |
|  |  | 2 | 13.1 | 75 |
|  |  | 3 | 5.6 | 10 |
|  |  | 4 | 6.5 | 3 |
|  |  | 5 | 3.3 | 3 |

-continued

| P-Dendrimer | PEI MW | Amine Equivalence | TGA $CO_2$ Capacity (wt %) | # of Cycles |
|---|---|---|---|---|
| 1-$G_1$ | 600 | 2 | 3.7 | 3 |
|  |  | 4 | 6.8 | 3 |
|  |  | 6 | 5.2 | 3 |
|  |  | 8 | 7.8 | 10 |
|  |  | 9 | 6.2 | 3 |
| 1-$G_2$ | 600 | 8 | 3.3 | 10 |
|  |  | 9 | 4.2 | 75 |
|  |  | 10 | 4.5 | 10 |
|  |  | 11 | 3.7 | 3 |

2-$G_x$+PEI (600 MW)

| P-Dendrimer | PEI MW | Amine Equivalence | TGA $CO_2$ Capacity (wt %) | # of Cycles |
|---|---|---|---|---|
| 1-$G_0$ | 600 | 0.5 | 5.6 | 10 |
|  |  | 1 | 4.7 | 10 |
|  |  | 2 | 2.7 | 3 |
| 1-$G_1$ | 600 | 2 | 4.3 | 3 |
|  |  | 3 | 5.4 | 10 |
|  |  | 4 | 6.1 | 10 |
|  |  | 5 | 2.5 | 10 |

1-$G_0$+PEI (Various MW)

| P-Dendrimer | PEI MW | Amine Equivalence | TGA $CO_2$ Capacity (wt %) | # of Cycles |
|---|---|---|---|---|
| 1-$G_0$ | 800 | 1.5 | 7.2 | 3 |
|  |  | 1.7 | 8.4 | 10 |
|  |  | 1.8 | 8.2 | 10 |
|  |  | 2.0 | 8.8 | 10 |
|  |  | 2.2 | 8.0 | 10 |
| 1-$G_0$ | 1200 | 0.9 | 5.4 | 10 |
|  |  | 1.0 | 6.1 | 10 |
|  |  | 1.2 | 2.5 | 10 |
| 1-$G_0$ | 1800 | 0.8 | 8.3 | 3 |
|  |  | 0.9 | 8.5 | 10 |
|  |  | 1.0 | 9.5 | 10 |
|  |  | 1.1 | 7.9 | 10 |
| 1-$G_0$ | 10,000 | 0.2 | 1.1 | 10 |
|  |  | 0.3 | 1.0 | 10 |
| 1-$G_0$ | 25,000 (linear) | 0.1 | 0.7 | 10 |
|  |  | 0.2 | 0.7 | 10 |
| 1-$G_0$ | 70,000 | 0.05 | 0.05 | 3 |

6.2. Results and Discussion P-Dendrimer/PEI Sorbents

6.2.1. Effect of Adsorption Temperature

The experiments above report using polyaldehyde-containing P-dendrimers as a cross-linking agent in a reductive amination reaction with low molecular weight amines (MW<200) to afford solid sorbents with capacities up to 7.4 wt. % $CO_2$ from simulated flue gas. We were encouraged by the moderate capacity and excellent stability of these materials to further examine higher molecular weight amines to increase the sorbent capacity. We initiated this study using 600 MW PEI as a polyamine. To maximize our capacity, we first tested six equivalence of 600 MW PEI with our best performing P-dendrimer, hexakis(4-formylphenoxy)cyclo (triphosphazene) (1-$G_0$) (FIG. 11). To our surprise, the reaction between these two compounds produced a viscous oil, not a solid which formed in our previous process. This compound showed no capacity for $CO_2$ capture when measured via TGA. Further optimization uncovered that two equivalents of PEI led to the formation of 1-$G_0$/600PEI a white solid in 91% yield, which was composed of 20.0% nitrogen.

Exposing 1-$G_0$/600PEI to 1 atm of $CO_2$ at 65° C. adsorbed 13.1 wt. % capacity over 50 minutes. This sorbent performed excellently under cycle testing, showing no capacity loss over 75 cycles on the TGA using 120° C. as the regeneration temperature for 20 minutes. Extended contact to pure $CO_2$ over 300 minutes saturated the sorbent with 13.6 wt. % $CO_2$ and was repeated over 5 cycles (FIG. 12). The sorbent reaches 90% capacity within the first 10 minutes of exposure to $CO_2$ and 95% capacity at 50 minutes (13.1 wt. %). The rapid adsorption of $CO_2$ is a critical property an effective sorbent must possess. The sorbent is easily regenerated at 120° C., with complete desorption achieved from the saturated material in 5 minutes (FIG. 13). The temperature reaches only 90° C. by the time desorption is complete.

Interestingly, the sorbent reached higher capacities with increasing adsorption temperatures. At 25° C. and 45° C., the sorbent obtained capacities of 4.1 wt. % and 9.3 wt. % respectively (FIG. 14). Due to the exothermicity of carbamate formation between amines and $CO_2$, amine sorbent capacities are normally highest at low temperatures. This material is very dense in amine functionality and is structurally rigid, therefore increased temperatures may allow for greater molecular mobility to increase the number of reactive amines, similar to findings by Xu and coworkers with a MCM-41/PEI sorbent (see Xu 2002). Lastly, at 85° C. the adsorption is dominated by the exothermic binding and decreases the capacity to 11.3 wt. %.

6.2.2. Effect of P-Dendrimer and PEI Variation on Sorbent Capacity

The reductive amination process with PEI was explored with other polyaldehyde P-dendrimers as well as with several molecular weights of PEI to optimize the capacity of the sorbent. It was found that as the number of aldehydes were increased on the P-dendrimer, from 1-$G_0$ to 1-$G_2$, the capacity was decreased when adsorbing at 65° C. (FIG. 15). Using 2-$G_0$ and 2-$G_1$, P-dendrimers with a different molecular geometry (see FIG. 11), the capacity was also lower. This trend was previously reported with TEPA and small polyamines, where the increased number of reactive sites may lead to more dense cross-linking—preventing amine accessibility to gaseous $CO_2$. PEIs ranging from 600 to 70,000 MW were investigated in the cross-linking reaction with 1-$G_0$, and it was found that only low molecular weights provided efficient sorbents (FIG. 16). Other than 600 MW PEI, 1800 MW PEI formed a material with a capacity of 9.1 wt. %, higher than 800 and 1200 MW PEIs whose capacities were 8.8 wt. % and 6.1 wt. % respectively.

6.2.3. Cyclic Adsorption/Desorption Performance Testing

To assess the practical applicability of these sorbents for $CO_2$ capture, the most effective P-dendrimer/PEI solid sorbents were tested in a packed-bed reactor (PBR) under simulated flue gas conditions. Adsorption studies were conducted at 65° C. for 35 minutes with a regeneration step at 120° C. for 25 minutes in the PBR setup. After 25 cycles in the PBR, the 1-$G_0$/600PEI sorbent yielded 12.5 wt. % capacity on average (FIG. 17). Two other sorbents tested, 1-$G_0$/1800PEI and 1-$G_1$/600PEI, gave average capacities of 10.2 wt. % and 8.5 wt. %. None of these materials showed any appreciable degradation over this cycle span.

The sorbent 1-$G_0$/600PEI was put through an extensive 350 long-term cycle tests, which accounts for 700 contiguous running hours (FIG. 18). Over the 350 cycles, the sorbent maintained an average capacity of 13.1 wt. %. The material was impressively attrition resistant, with no capacity loss observed over the entire testing period.

6.2.4. Heat of Adsorption

To gain a better understanding of the adsorption characteristics of this sorbent, the isosteric heat of adsorption was calculated from $CO_2$ adsorption isotherms on a Micromeritics ASAP-2020 apparatus. Adsorption isotherms were measured at temperatures of 273 K, 284 K, and 295 K and fitted into the isosteric heat of adsorption by applying a variant of the Clausius-Claperyron equation (FIG. 19). At low adsorption values, 1-$G_0$/600PEI shows a heat of adsorption value of 103 kJ mol$^{-1}$. The relatively high heat of adsorption for 1-$G_0$/600PEI is representative of the exothermic reaction between $CO_2$ and alkyl amines to form carbamates. The heat of adsorption for 1-$G_0$/600PEI falls in line with many other solid amine sorbents reported (see Gray 2009).

The simulated flue gas cycle testing disclosed the stability of 1-$G_0$/600PEI to oxygen and water, however, there are much more reactive contaminants that commonly pollute flue gas streams (F. Rezaei, et al., *Energy Fuels* 2015, 29 (9), 5467-5486). Subjecting 1-$G_0$/600PEI to 50 ppm of $SO_2$ in the simulated flue gas decreased the sorbent's capacity by 39% to 8.0 wt. % over 100 cycles (FIG. 20). Increasing the $SO_2$ concentration to 200 ppm resulted in a more dramatic inhibition effect on the sorbent's $CO_2$ capacity, dropping the capacity by 58% to 5.7 wt. % after 50 cycles. Sulfur dioxide most likely reacts with the amines via sulfonamide formation. Evidence for sulfonamide incorporation into the sorbent was observed through infrared spectroscopy (FIG. 21). The large N—H stretching signals at 3500-3200 cm$^{-1}$ and bending signals at 1650-1580 cm$^{-1}$ significantly decreased after $SO_2$ exposure. A gain in absorbance was observed at 1140-1130 cm$^{-1}$ and 620-600 cm$^{-1}$, which are in accordance with literature reported S=O stretching and bending vibrations of sulfonamides (R. Tailor et al., *Environ. Sci. Technol.* 2014, 48 (3), 2025-2034). While $CO_2$ binds faster than $SO_2$ to amines, the sulfamate complex reacts irreversibly thus blocking amine active sites throughout the adsorption phase (see Q. Liu et al., *Energy Fuels* 2014, 28 (10), 6494-6501).

The adsorption capacity was much less affected by $NO_X$ contamination in the simulated flue gas. After 100 cycles of 200 ppm $NO_X$, blended as a 90:10 ratio of NO to $NO_2$, 1-$G_0$/600PEI showed a capacity of 11.5 wt. %, representing a capacity loss of just 12%.

6.2.5. Adsorption of $CO_2$ from Sour Gas

Sour gas sweetening is an industrial process by which the $H_2S$ and $CO_2$ components are selectively removed in stages (commonly by aqueous amine solutions) to help purify the gas downstream (Kohl, A. L.; Nielsen, R. B. In *Gas Purification (Fifth Edition)*; Gulf Professional Publishing: Houston, 1997). Due to the robust nature of 1-$G_0$/600PEI, we believed there was an opportunity for this sorbent to be utilized for the removal of $CO_2$ from a gas stream enriched with $H_2S$. The sour gas was imitated in the PBR system with a composition of 14.77% $CO_2$, 5.65% $H_2O$, and 10,000 ppm $H_2S$ balanced by hydrogen. Cyclic adsorption/desorption testing was undertaken at 65° C. for 100 cycles over 200 hours, showing a 5% decrease in overall capacity to 12.5 wt. % (FIG. 22). Only minimal degradation occurred, making this a promising sorbent for natural gas purification.

6.2.6. Material Physical Properties

The sorbent synthesis binds the amines of PEI to the polyaldehyde P-dendrimers through covalent C—N bonds. Infrared spectroscopy measurements show the aldehyde C=O stretches (1695 cm$^{-1}$) of 1-$G_0$ convert to imine C=N stretches (1640 cm$^{-1}$) upon addition of PEI, and disappear after the $NaBH_4$ reduction (data not shown). The solid prepared from this reaction was insoluble in organic, aqueous, acidic, and basic media. Further evidence for the cross-linking reductive amination taking place was obtained with $^{13}$C CP/MAS solid-state NMR spectroscopy (FIG. 23). The CP/MAS spectrum showed a variety of alkyl (24-40 ppm) and aryl (102-134 ppm) carbon peaks, with no appreciable C=N imine peaks (>160 ppm). The strong covalent C—N bonds provides a thermally robust material which were found to be stable up to 210° C., measured by thermogravimetric analysis (FIG. 24). 1-$G_0$/600PEI undergoes a 20 wt. % loss event at 210° C. that eventually leads to 87 wt. % loss up to 1000° C.

The physical properties of 1-$G_0$/600PEI were determined using $N_2$ adsorption/desorption isotherms, giving a BET surface area of 11.0 m$^2$ g$^{-1}$, a pore volume of 5.0 mm$^3$ g$^{-1}$, and a pore diameter of 18.1 Å. Solid sorbents produced from PEI showed lower surface areas than sorbents made from TEPA, while the pore volumes and diameters were similar. The decreased surface area may be a result of length and flexibility of PEI, creating a denser material. Scanning electron microscopy (SEM) was used to view the particles, revealing that the molecules pack disorderly into aggregates with no crystalinity observed (FIG. 25 Panels a and b). Using transmission electron microscopy (TEM), very small micropores (<50 nm) were observed on the surface of 1-$G_0$/600PEI (FIG. 25 Panels c and d). The TEM evidence combined with the $N_2$ adsorption/desorption isotherms supports microporosity in 1-$G_0$/600PEI.

6.2.7. Conclusions (P-Dendrimer/PEI Sorbents)

This work has evaluated the scope and capabilities of solid amine sorbents derived from P-dendrimers and polyethyleneimines. Extensive cyclic adsorption/desorption testing was conducted with 1-$G_0$/600PEI, the best performing sample produced in this study, revealing an average $CO_2$ capacity of 13.1 wt. % over 350 cycles running for 700 contiguous hours. A heat of adsorption value of 103 kJ mol$^{-1}$ was determined from $N_2$ isotherms, providing evidence for the binding of $CO_2$ via chemisorption. The effect of common contaminants of flue gas ($SO_2$, NO, and $NO_2$) were investigated with 1-$G_0$/600PEI. The sorbent was significantly impacted by $SO_2$ exposure, binding the $SO_2$ irreversibly and blocking active amine sites. The impact of $NO_X$ contaminants, NO and $NO_2$, was less influential—with only a small decrease over 100 cycles presumably from the binding of $NO_2$ as a nitrite species. The use of 1-$G_0$/600PEI to remove $CO_2$ from sour gas was also disclosed, with only a minimal effect observed over 100 cycles from a gas stream with 10,000 ppm of $H_2S$. The use of P-dendrimer derived solid sorbents for the purification of sour gas is ongoing.

6.3. $CO_2$ Capture from Surface Coated Composite Materials

The material described herein can be reformulated into an innovative composite material, in which the sorbent is coated onto a support surface for the reversible capture of $CO_2$. The novel application of the material via dispersion of the polyamine sorbent onto a support or structural surface allows for $CO_2$ capture outside of bulk particle-based processes and expands the scope of possible $CO_2$ fixation usages. For example, the walls of a reactor or structural surfaces inside a reactor can be coated with the polyamine sorbent for reversible $CO_2$ fixation. Amine materials have commonly been coated onto surfaces in membrane applications (R. RajabKhalilpour et al., *J. Clean. Prod.* 2015, 103, 286-300.), but to the best of our knowledge, this is the first instance of coating a non-porous surface with an amine material for $CO_2$ capture and storage.

Reynolds and Yazici of Graftech Inc., reported carbonaceous material was adhered to graphite sheets with various binders for use in electrodes or gas diffusion layers in fuel cells (Patent US 20040121122 A1). The polyamine P-dendrimer sorbent can be adhered to surfaces through a variety of methods, with a convenient method employing the use of a binder mixed with a solvent to aid in the physical binding. Both hydrophobic (e.g. polyvinyldiene fluoride [PVDF]) and hydrophilic (e.g. cellulose ethers) polymeric binders can be combined with the polyamine sorbent for adhesion to a surface. A PVDF resin available commercially is Kynar UltraFlex®B as well as Kynar Flex® 2801, and other derivatives sold by Arkema Inc. Cellulose ethers can be bought in a variety of formulations, with one of the most widely available sold as METHOCEL™ from the Dow Chemical Company. The binder can be added in various weight ratios, and typically the binder is combined in 1 to 30 wt % concentration with the polyamine P-dendrimer sorbent. Additionally, the binder may include other compounds to adjust the chemical and physical nature of the binder as desired. The surface upon which the material may be coated can vary, with examples being an organic support, plastic, carbon, and a metal surface. The material can also be adhered to either one or both faces of the support or surface.

Surface coating of the polyamine P-dendrimer sorbent with a binder to form a composite material may be accomplished by thoroughly mixing the binder and polyamine sorbent in solution, with one or more solvents, followed by layering the mixture onto the desired surface by any conventional method (pipetting, roll coating, spray coating, etc.) and removal of the solvent (FIG. 26). The polyamine P-dendrimer sorbent can be applied in bulk particle form or sieved to a desired particle size prior to solvent dispersion. The solvent can be at least one or a mixture of acetone, methanol, dimethyl formamide, isopropanol, ethanol, water, dichloromethane, chloroform, or any solvent that dissolves the binder since the polyamine P-dendrimer sorbent is insoluble. Upon evaporation of the solvent, the coated polyamine P-dendrimer sorbent may be dried at 25° C. slowly or quickly at 120° C. The dried composite material can have additional coats of the polyamine P-dendrimer sorbent/resin mixture added or it can be pressed or formed for the desired application. Layering multiple coats of the resin/polyamine P-dendrimer sorbent mixture can be accomplished with different loadings of the resin and alternatively with different resins entirely (e.g. PVDF for the first layer followed by a Methocel second layer). Layering the polyamine P-dendrimer sorbent/resin mixture can increase the thickness of the surface from 0.5 mm to greater than 5.0 mm, depending of the number of layers and polyamine P-dendrimer sorbent particle size used.

6.3.1. Example Procedure

Example preparation of a cross-linked sorbent composite material: A solution containing 2 mL of acetone and 4.0 mg of PVDF resin Kynar UltraFlex®B was sonicated in a water bath until the resin was completely dissolved. Then, 40 mg of the polyamine P-dendrimer sorbent was added and sonicated for 10 minutes for complete dispersion. The viscous mixture (comprised of 10 wt % binder) was then applied to the surface of a 12.4 mg carbon rectangular sheet in portion wise layers. Once the acetone had evaporated, further coatings were applied until a thick white layer of polymer was obtained. The final material was air dried for one hour to ensure complete dryness before testing. The total amount of polymer/resin bound to the carbon sheet totaled 5.2 mg. The composite material was adhered well to the carbon sheet, with an applied thickness of 4.49 mm in this instance. The thickness is directly related to the number of layers of the polyamine sorbent/resin mixture applied to the carbon sheet.

6.3.2. Characterization of Solid Composite Sorbents

The amine content of the sorbent was determined through C/H/N Elemental Analysis (EA) and the thermal stability was determined with Thermogravimetric Analysis (TGA). The particle size distribution (PSD) was measured with a Sympatec HELOS system using an R6 lens with a size range of 1.8-350 µm and a VIBRI feeder in conjunction with a RODOS/M with a 4-mm dispersing line operated at 1.0 bar dispersion pressure. The surface and morphology integrity of the material was examined with Scanning Electron Microscopy (SEM). The thickness of the polymer layer added onto the carbon sheet was indirectly measured with a Mitutoyo caliper by subtracting the thickness of the unfunctionalized carbon sheet from the thickness of the final composite material. Although one solid sorbent is described in this invention disclosure, similar characterization data was obtained for other composite materials produced.

6.3.3. Example Composite Material of this Invention: Carbon sheet layered with Hexakis(4-formylphenoxy)cyclo(triphosphazene)-PEI Complex and Kynar UltraFlex®B Resin Example Composite Material of this Invention: Carbon sheet layered with Hexakis(4-formylphenoxy)cyclo(triphosphazene)-PEI Complex and Kynar UltraFlex®B Resin Particle Size Distribution (PSD)

The polymer material was sieved through a 25 µm mesh. Measurements were made in triplicate and showed good reproducibility. See FIG. 27 and the table below.

|  | $X_{50}$ (µm) |
| --- | --- |
| Sample 1 | 15.18 |
| Sample 2 | 15.78 |
| Sample 3 | 16.06 |

Coating Thickness

The carbon sheet upon which the coating was added was 3.31 mm. The composite material was measured multiple times, displaying an average thickness of 7.80 mm. The polymer coating applied measured 4.49 mm in thickness from the surface.

C/H/N Elemental Analysis (EA)

The results for the C/H/N Elemental Analysis are as follows:

| Nitrogen | Carbon | Hydrogen |
| --- | --- | --- |
| 3.89 | 75.68 | 2.4 |

Thermogravimetric Analysis (TGA)

The composite material was found to be stable up to 200° C., where upon it underwent a slow 15.0 wt % loss event and gradually lost 37.3 wt % up to 560° C. The composite material is stable under regeneration conditions below 200° C. See FIG. 28.

Scanning Electron Microscopy (SEM)

Images were obtained on an SEM of the carbon sheet, polymer powder, and polymer-resin coated composite material. The polymer material post-sieving was spherical in shape and packed disorderly into aggregates. The composite material maintained the spherical shape of the polymer, which was dispersed over the carbon sheet surface. Amorphous points on the composite material indicate the mixing of the resin with the polymer powder to act as a binding agent. The results are shown in FIG. 29A-FIG. 29G.

6.3.4. CO$_2$ Capacity of Composite Material from Pure CO$_2$ Gas Streams

The CO$_2$ capacity of the composite material was analyzed through similar TGA CO$_2$ capture procedures described above for the powder form of the material. The TGA preset cycle conditions consisted of: 1) drying/degassing of the sample at 120° C. under a constant flow of helium atmosphere totaling 40 minutes, 2) equilibration of the temperature to 65° C., 3) adsorption of 1 atm CO$_2$ at 65° C. for 60 minutes, 4) regeneration of the sorbent at 120° C. for 40 minutes, and 5) repetition of steps 2-4 for the desired cycle count.

Using the TGA instrument, the composite material achieves a capacity of 3.1 wt. % of CO$_2$ under 1 atm pressure at 65° C. over 60 minutes (FIG. 30). The kinetics for adsorption were fast, with 90% capacity achieved in 8 minutes of adsorption. The composite material can be regenerated within 5 minutes to regain full activity for CO$_2$ capture. The composite material was stable under cyclic testing, with no degradation observed over 50 cycles alternating between 65-120° C. for adsorption and regeneration studies (FIG. 31). The capacity of the composite material was directly proportional to the loading of the P-dendrimer polyamine material onto the carbon sheet. For this example, 5.2 mg of the polymer material containing 10 wt. % PVDF resin was loaded onto 12.4 mg of carbon sheet. Removal of the resin weight accounts for 4.7 mg of polymer sorbent, representing 26.6 wt. % of the composite material. This sorbent amount would equate to 3.48 wt. % CO$_2$ at maximum CO$_2$ capacity in the powder form. The composite material reaches 3.1 wt. % capacity, or 89% efficiency. The efficiency decrease can be attributed to the binding of the resin to the polymer material, making some amine sites inaccessible.

FIG. 32 shows a graphical summary of CO$_2$ capture with the P-dendrimers disclosed herein.

It should be understood that the above description is only representative of illustrative embodiments and examples. For the convenience of the reader, the above description has focused on a limited number of representative examples of all possible embodiments, examples that teach the principles of the disclosure. The description has not attempted to exhaustively enumerate all possible variations or even combinations of those variations described. That alternate embodiments may not have been presented for a specific portion of the disclosure, or that further undescribed alternate embodiments may be available for a portion, is not to be considered a disclaimer of those alternate embodiments. One of ordinary skill will appreciate that many of those undescribed embodiments, involve differences in technology and materials rather than differences in the application of the principles of the disclosure. Accordingly, the disclosure is not intended to be limited to less than the scope set forth in the following claims and equivalents.

INCORPORATION BY REFERENCE

All references, articles, publications, patents, patent publications, and patent applications cited herein are incorporated by reference in their entireties for all purposes. However, mention of any reference, article, publication, patent, patent publication, and patent application cited herein is not, and should not be taken as an acknowledgment or any form of suggestion that they constitute valid prior art or form part of the common general knowledge in any country in the world. It is to be understood that, while the disclosure has been described in conjunction with the detailed description, thereof, the foregoing description is intended to illustrate and not limit the scope. Other aspects, advantages, and modifications are within the scope of the claims set forth below. All publications, patents, and patent applications cited in this specification are herein incorporated by reference as if each individual publication or patent application were specifically and individually indicated to be incorporated by reference.

What is claimed is:

1. A polyamine phosphorus dendrimer (P-dendrimer) having the formula I

wherein W is a phosphorus based dendrimer core; X is a polyfunctional aromatic linker; Y may be present or absent and if present is a polyfunctional amino phosphoryl group linked to a polyfunctional aromatic linker; Z is an diamino alkyl group, a polyalkyl amino group, a polyethyleneimine, or a polypropyleneimine; j and k are numerical values corresponding to the branch point multiplicity and whose values independently range from 1 to 10; and l is a numerical value corresponding to the branch point multiplicity and whose values ranges from 2 to 10.

2. The P-dendrimer of claim 1, wherein
W is a phosphazene, thiophosphoryl, or a cyclophosphazatetraene group;
X is

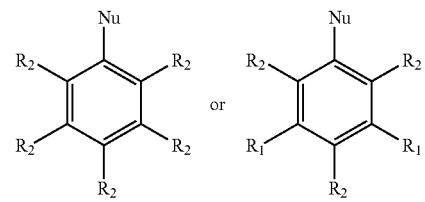

wherein Nu is —OH, —SH, or —NH$_2$; each R$_1$ is independently —CHO, —CN, —COOMe, COOEt, COOH, CH$_2$OH, CONH$_2$, or COCH$_3$; each R$_2$ is independently H, Me, Et or halogen;
Y is

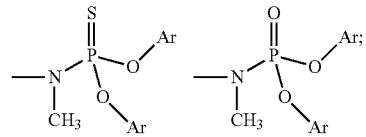

Z is

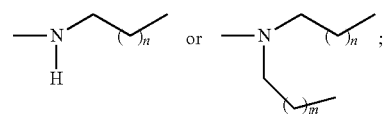

and each n or m if present is independently an integer from 1-6.

3. The polyamine P-dendrimer of claim 1, having a $CO_2$ capacity of greater than 2 weight percent.

4. The polyamine P-dendrimer of claim 1, having a $CO_2$ capacity of greater than 5 weight percent.

5. The polyamine P-dendrimer of claim 1, having a $CO_2$ capacity of greater than 10 weight percent.

6. A composite material which comprises a solid support and a surface coated with the polyamine P-dendrimer of claim 1 having Formula I.

7. The composite material of claim 5, wherein the solid support is a polymeric material, carbon, glass, or a metal support.

8. The composite material of claim 6, wherein the polymeric material is natural or a synthetic polymer.

9. The composite material of claim 7, wherein the natural polymer is a cellulose acetate, a silk protein, a soy protein, or a starch.

10. The composite material of claim 7, wherein the synthetic polymer is petroleum pitch, polyacrylonitrile, polyamide, polyethylene, polypropylene, polystyrene, polyvinyl chloride or a mixture thereof.

11. A method of removing $CO_2$ from a gaseous fluid stream which comprises contacting the gaseous fluid stream with the polyamine P-dendrimer of claim 1 having Formula I.

12. A method of adsorbing, separating, storing or sequestering carbon dioxide ($CO_2$), comprising contacting the polyamine P-dendrimer of claim 1 having Formula I with a gaseous fluid stream comprising carbon dioxide ($CO_2$).

13. A method of removing $CO_2$ from a gaseous fluid stream which comprises contacting the gaseous fluid stream with a polyamine phosphorus dendrimer (P-dendrimer) having the formula I

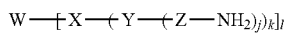

at a temperature in the range of about 20° C. to about 90° C.; wherein W is a phosphorus based dendrimer core; X is a polyfunctional aromatic linker; Y may be present or absent and if present is a polyfunctional amino phosphoryl group linked to a polyfunctional aromatic linker; Z is an diamino alkyl group, a polyalkyl amino group, a polyethyleneimine, or a polypropyleneimine; j and k are numerical values corresponding to the branch point multiplicity and whose values independently range from 1 to 10; and l is a numerical value corresponding to the branch point multiplicity and whose values ranges from 2 to 10.

14. The method of claim 13, wherein the gaseous fluid stream is a flue gas.

15. The method of claim 14, wherein the flue gas is flue gas from a natural gas power plant, a coal-fired power plant, a cement plant or other industrial process.

16. The method of claim 14, wherein the flue gas stream has a $CO_2$ content of about 3 mole % to about 45 mole % $CO_2$.

17. The method of claim 13, wherein the gaseous fluid stream is a post-combustion stream.

18. The method of claim 13, wherein the gaseous fluid stream is ambient air.

19. The method of claim 18, wherein the gaseous fluid stream has a $CO_2$ content of about 350 to about 450 parts per million (PPM) $CO_2$.

20. The method of claim 18, wherein the gaseous fluid stream has a $CO_2$ content of about 450 to about 1000 parts per million (PPM) $CO_2$.

21. The method of claim 18, wherein the gaseous fluid stream has a $CO_2$ content of about 1000 to about 4000 parts per million (PPM) $CO_2$.

22. The method of claim 13, further comprising regenerating the polyamine P-dendrimer of formula I by heating the P-dendrimer to a temperature in the range of about 50° C. to about 150° C.

23. A process for the capture and removal of $CO_2$ from a $CO_2$-containing stream the process comprising:
  (a) providing a housing having dispersed therein a sorbent comprising the polyamine P-dendrimer of claim 1;
  (b) passing a $CO_2$-containing stream through the housing such that the $CO_2$-containing stream contacts the sorbent;
  (c) flushing the housing with steam to cause the sorbent to desorb an $CO_2$ retained therein as a result of contact of the sorbent with the $CO_2$-containing stream; and
  (d) flushing the housing with air to remove the steam from the housing.

24. A method of making a polyamine phosphorus dendrimer (P-dendrimer) having the formula I

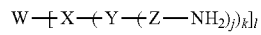

wherein W is a phosphorus based dendrimer core; X is a polyfunctional aromatic linker; Y may be present or absent and if present is a polyfunctional amino phosphoryl group linked to a polyfunctional aromatic linker; Z is an diamino alkyl group, a polyalkyl amino group, a polyethyleneimine, or a polypropyleneimine; j and k are numerical values corresponding to the branch point multiplicity and whose values independently range from 1 to 10; and l is a numerical value corresponding to the branch point multiplicity and whose values ranges from 2 to 10;
which method comprises:
  (a) reacting a phosphoryl chloride starting material for the phosphorus based dendrimer core with a nucleophilic aldehyde starting material for the polyfunctional aromatic linker so as to form a polyphosphoryl ester aldehyde compound;
  (b) condensing the polyphosphoryl ester aldehyde compound with an polyalkyl amine to form a polyalkyl imine polyphosphoryl ester; and
  (c) reducing the a polyalkyl imine polyphosphoryl ester to form the polyamine phosphorus dendrimer (P-dendrimer).

* * * * *